(12) United States Patent
Kall et al.

(10) Patent No.: US 8,069,071 B2
(45) Date of Patent: Nov. 29, 2011

(54) SUITE OF CONFIGURABLE SUPPLY CHAIN INFRASTRUCTURE MODULES FOR DEPLOYING COLLABORATIVE E-MANUFACTURING SOLUTIONS

(75) Inventors: Jonathan J. Kall, Glenmoore, PA (US); Thomas A. Troy, Lansdale, PA (US); Robert J. McCarthy, Downingtown, PA (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 3188 days.

(21) Appl. No.: 10/424,847

(22) Filed: Apr. 29, 2003

(65) Prior Publication Data

US 2003/0200130 A1  Oct. 23, 2003

Related U.S. Application Data

(63) Continuation of application No. 10/358,305, filed on Feb. 5, 2003, now abandoned.

(60) Provisional application No. 60/354,151, filed on Feb. 6, 2002.

(51) Int. Cl.
*G06Q 10/00* (2006.01)

(52) U.S. Cl. .................... 705/7.12; 705/7.11; 700/97

(58) Field of Classification Search .................. 705/7.11, 705/7.12; 700/97
See application file for complete search history.

(56) References Cited

U.S. PATENT DOCUMENTS

| | | | | |
|---|---|---|---|---|
| 5,089,970 A | * | 2/1992 | Lee et al. | 700/96 |
| 5,311,438 A | * | 5/1994 | Sellers et al. | 700/96 |
| 5,463,555 A | * | 10/1995 | Ward et al. | 700/96 |
| 6,032,121 A | | 2/2000 | Dietrich et al. | |
| 6,041,267 A | | 3/2000 | Dangat et al. | |
| 6,049,742 A | | 4/2000 | Milne et al. | |
| 6,141,647 A | | 10/2000 | Meijer et al. | |
| 6,256,676 B1 | * | 7/2001 | Taylor et al. | 709/246 |
| 6,345,259 B1 | * | 2/2002 | Sandoval | 705/7.11 |
| 6,366,824 B1 | | 4/2002 | Nair et al. | |
| 6,470,227 B1 | | 10/2002 | Rangachari et al. | |
| 6,810,429 B1 | * | 10/2004 | Walsh et al. | 709/246 |
| 2001/0044740 A1 | | 11/2001 | Hoffman | |
| 2002/0049622 A1 | * | 4/2002 | Lettich et al. | 705/7 |
| 2002/0138316 A1 | * | 9/2002 | Katz et al. | 705/7 |
| 2002/0174000 A1 | * | 11/2002 | Katz et al. | 705/7 |

(Continued)

OTHER PUBLICATIONS

Aspect 1997 Annual Report—CSM Solution, Aspect CSM: the only one-stop solution, web.archive.org, 2000, p. 1-3.*

(Continued)

*Primary Examiner* — Justin Pats
(74) *Attorney, Agent, or Firm* — Turocy & Watson, LLP

(57) ABSTRACT

A suite of configurable supply chain infrastructure modules provides the "collective manufacturing management infrastructure" necessary to support a high velocity e-business initiative. At the core of the collaboration scheme is the Business Process Modeling Module. The Business Modeling Module consists of two components: Business Process Event Coordinator, and Business Process Modeler. To further support the collaborative scheme, a suite of highly configurable application templates and pre-configured industry applications provide an interface or wrapper around the business rules. The application templates are designed to be used as stand-alone components, or can be assembled/configured into a cohesive solution to provide a basic foundation layer for a Collaborative Manufacturing Execution System (CMES). To address the connectivity of the CMES layer to the business layer and the shop floor automation layer, an Extensible Markup Language (XML) Business Connector and Optical Photo Conductor (OPC) Shop Floor Connector fulfill the interface needs required to support a collaborative infrastructure.

25 Claims, 61 Drawing Sheets

U.S. PATENT DOCUMENTS

| | | | |
|---|---|---|---|
| 2002/0178077 A1* | 11/2002 | Katz et al. | 705/26 |
| 2002/0188486 A1* | 12/2002 | Gil et al. | 705/7 |
| 2002/0188513 A1* | 12/2002 | Gil et al. | 705/22 |
| 2003/0033179 A1* | 2/2003 | Katz et al. | 705/7 |
| 2003/0046130 A1* | 3/2003 | Golightly et al. | 705/7 |
| 2003/0120502 A1* | 6/2003 | Robb et al. | 705/1 |
| 2003/0155415 A1* | 8/2003 | Markham et al. | 235/376 |

OTHER PUBLICATIONS

Upin et al., B2B: Building Technology Bridges Outside the Four Walls of the Enterprise, Aug. 15, 2000, online reprint p. 1-15.*

Ward, Controllers and systems integrated automation, Manufacturing Computer Solutions, col. 6, No. 6, Jun. 2000, p. 128-30.*

Sep. 9, 2003, Form PCT/ISA/220 from PCT International Application No. PCT/US03/01087, filed Feb. 6, 2003.

Manufacturing Systems, vol. 16, iss. 5, "Do More With Less," p. 70 (May 1998).

Nuala Moran, "Exchanging data," Financial Times p. 9 (Sep. 2, 1998).

PR Newswire, "Omron & Rockwell Form Strategic Relationship," (Apr. 3, 2000).

Ashu Suri, "Extending the Enterprise," Bus. Comm. Rev., vol. 28, iss. 7, p. 43 (Jul. 1998).

Andrew Ward, "Controllers and systems integrated automation," Manuf. Comp. Solutions, vol. 6, iss. 6, p. 128 (Jun. 2000).

* cited by examiner

Legend:
ERP - Enterprise Resource Planning
PLM - Product Life Cycle Management
PDM - Product Data Management
SCM - Supply Chain Management
CRM - Customer Relations Management
Automation - PLC, DCS, etc.
APS - Advanced Planning & Scheduling

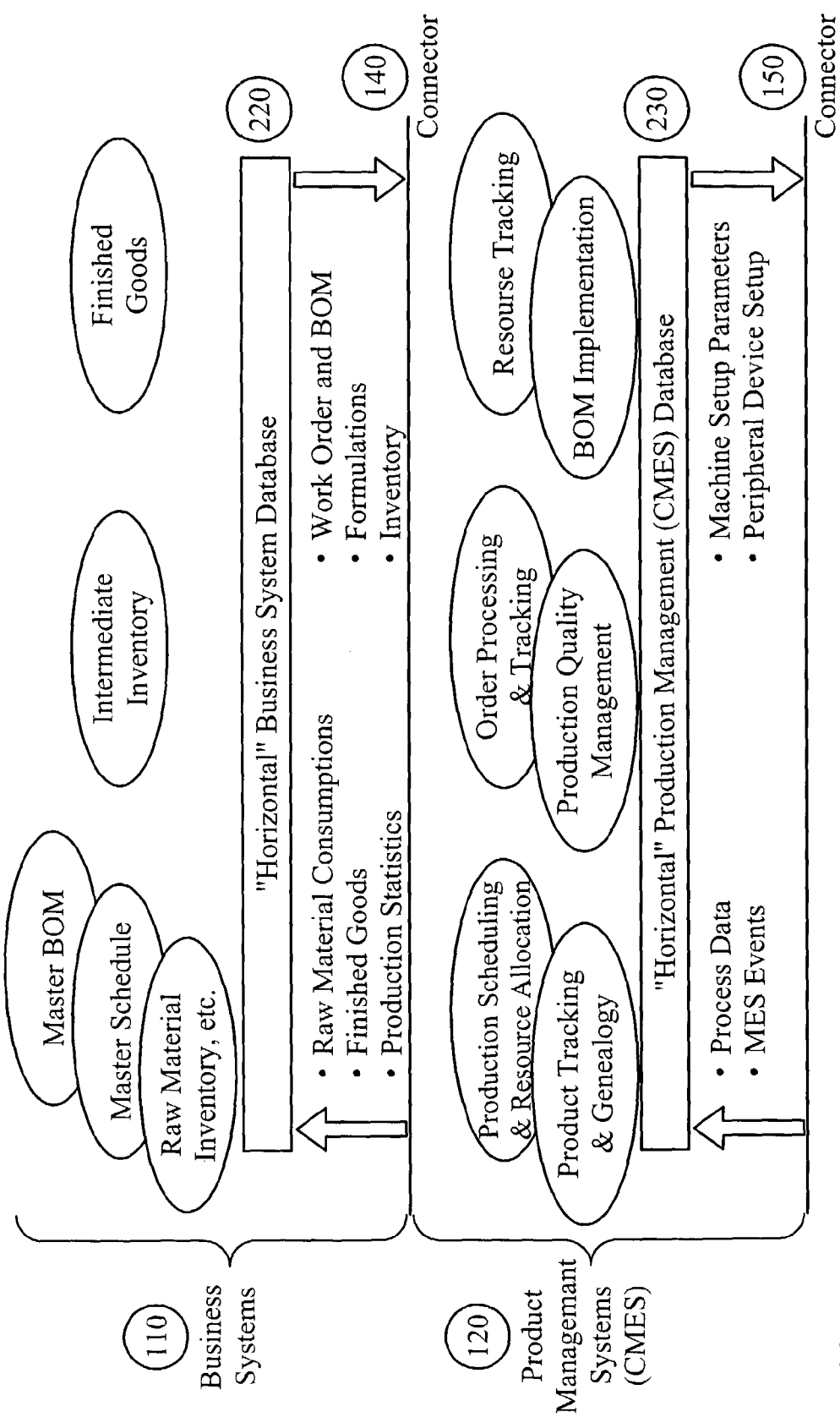
Fig. 4A  Manufacturing Information System Architecture

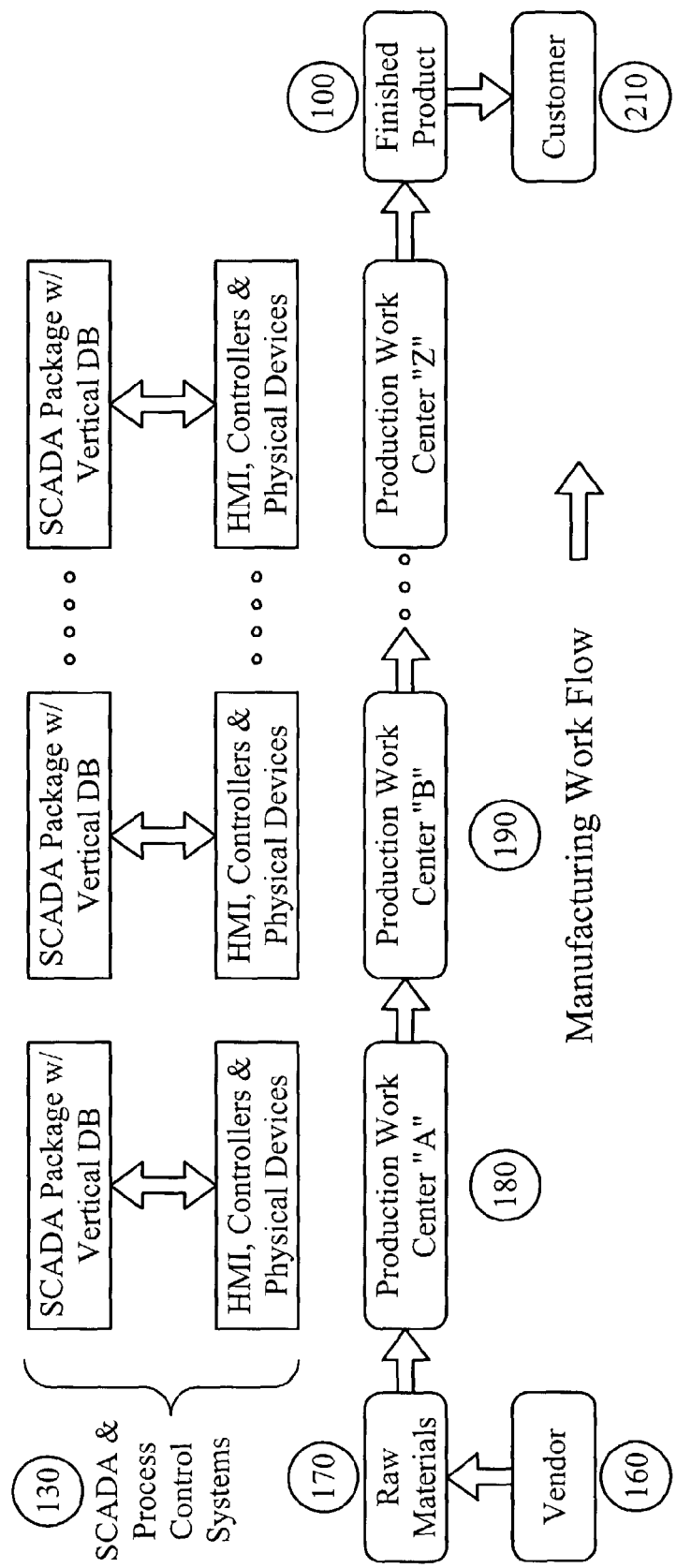
Fig. 4B  Manufacturing Information System Architecture

Interwave Coordinator - Material Maintenance

| | |
|---|---|
| Part No | 1578150-05M |
| Unit of Measure | m |
| Description | 39oz Reg Master Roll |
| Lot Type | WIP |
| Part Family | |

Primary
Route Name
Printing

Interwave Coordinator - Operation Maintenance

| | |
|---|---|
| Department | Extrusion |
| Operation | Extruding |
| Description | Polyethlene Extrusion |

Tracking Requirement
○ Complete Only ⊙ Sta

| Scrap Reason | Descrip |
|---|---|
| SC008 | Gel Ma |
| SC009 | COF O |
| SC010 | Treater |
| SC011 | Optic D |
| SC011 | Basis W |

| Rework Reason | Descr |
|---|---|

Interwave Coordinator - Route Maintenance

| | |
|---|---|
| Route Name | Extrusion |
| Department | Extrusion |

| Item | Check-In Step (Y/N) | From |
|---|---|---|
| 1 | Y | Extru |

[Add Item] [Delete Item]

Interwave Coordinator - Data Collection Template Maintenance

Process Area: Print/Lam
Operation: Printing
Template: Printing01
Description: Printing Template 01
Data File Path:

Data File
Extension:

d: [Local Disk]
D:\
  Projects
    Interwave Connections
    Source Code
    Main - Config Part Options: ● All Parts  ○ Selected Parts Selected Parts
Part Number

[Add Item]
[Delete Item]

Data Collection Parameters

| Item | Active (Y/N) | Req'd (Y/N) | Parameter Name | Parameter Type | Data Mask | Low Limit | High Limit | Parameter Description |
|---|---|---|---|---|---|---|---|---|
| 10 | Y | Y | RewTempOp | Analog | | 80 | 105 | Rewing Temp |
| 20 | Y | Y | RewTempGr | Analog | | 80 | 105 | Rewind Temp |
| 30 | Y | Y | Speed | Analog | | 85 | 175 | Line Speed |
| 40 | Y | Y | FoilOrientation | Select String | | | | Foil Orientation |
| 50 | Y | Y | RepeatLength | Analog | | | | Repeat Length |
| 60 | Y | Y | WebAlign | Select String | | | | Web Alignment |
| 70 | Y | Y | LamWidth | Analog | | | | Lamination Width |
| 80 | Y | Y | CoatReg | Select String | | | | Coat Reg |

[Add Item]
[Modify Item]
[Delete Item]

[Save Template]   [Close]

WIP Status Report

Select Criteria

| | |
|---|---|
| Department | |
| Operation | |
| Part No | |
| Location | Dept2_LocationWIP |
| Status | |

| LotID | Material Name | Lot Type | UDA Route | Route Name | Route Version | Route Step Name | Work State | Location | Queued Qty | Started Qty | Priority | WorkOr |
|---|---|---|---|---|---|---|---|---|---|---|---|---|
| 11111 | MaterialP | WIP | RoutePrimary | 2000OperationA | NONE | 1 | QUEUED | Dept2_LocationWIP | 222 | 0 | 1 | TestWor |
| 121802Lot | MaterialP | WIP | RoutePrimary | 2000OperationA | NONE | 1 | QUEUED | Dept2_LocationWIP | 250 | 0 | 0 | 121802 |
| 12344 | MaterialP | WIP | RoutePrimary | 2000OperationA | NONE | 1 | QUEUED | Dept2_LocationWIP | 2 | 0 | 1 | TestWor |
| 222 | MaterialP | WIP | RoutePrimary | 2000OperationA | NONE | 1 | QUEUED | Dept2_LocationWIP | 222 | 0 | 1 | TestWor |
| 33333 | MaterialP | WIP | RoutePrimary | 2000OperationA | NONE | 1 | QUEUED | Dept2_LocationWIP | 1 | 0 | 1 | TestWor |
| L000000N1 | MaterialP | WIP | RoutePrimary | 2000OperationB | NONE | 1 | QUEUED | Dept2_LocationWIP | 8 | 0 | 1 | WO0000 |
| L000001-01 | MaterialP | WIP | RoutePrimary | 2000OperationA | NONE | 1 | IN PROCESS | Dept2_LocationWIP | 0 | 2 | 1 | WO0000 |
| L000000N2-01 | MaterialP | WIP | ReworkRoute | 2000OperationRework1 | NONE | 1 | QUEUED | Dept2_LocationWIP | 2 | 0 | 1 | WO0000 |
| TestLot1 | MaterialP | WIP | RoutePrimary | 2000OperationA | NONE | 1 | IN PROCESS | Dept2_LocationWIP | 2 | 1 | 1 | TestWor |
| TestWorkOrder5_Lot-02 | MaterialP | WIP | | | | | | | | | 0 | TestWor |
| TestWorkOrder5_Lot-03 | MaterialP | WIP | | | | | | | | | 0 | TestWor |
| TestWorkOrder5_Lot-04 | MaterialP | WIP | | | | | | | | | 0 | TestWor |
| TestWorkOrder5_Lot-05 | MaterialP | WIP | | | | | | | | | 0 | TestWor |
| WO000000N2_Lot-02 | MaterialP | WIP | | | | | | | | | 1 | WO0000 |
| WO000000N2_Lot-03 | MaterialP | WIP | | | | | | | | | 1 | WO0000 |
| WO000000N2_Lot-04 | MaterialP | WIP | | | | | | | | | 1 | WO0000 |
| WO000000N2_Lot-05 | MaterialP | WIP | | | | | | | | | 1 | WO0000 |

Interwave Coordinator - Data Collection

Selected Lot(s):
L-111001-3

Department: Print/Lam
Operation: Printing

Part Number: 1578150-05M
Data Collection Template: Printing01

Data Collection Options
○ Capture (1) Sample for each Lot  ⦿ Capture (1) Sample for all Lots <=Prev Item    Next Item =>    Selected Item Retrieve Data Save Sample Data Collection Items

| Parameter | Required (Y/N) | Data Type | Actual Value | UOM |
|---|---|---|---|---|
| Rewind Temperature Open | Y | Analog | | degF |
| Rewind Temperature Far S | Y | Analog | | degF |
| Line Speed | Y | Analog | | m/min |
| Foil Orientation | Y | String Select | | |
| Repeat Length | Y | Analog | | mm |
| Web Alignment | Y | String Select | | |
| Lamination Width | Y | Analog | | mm |
| Coat Reg | Y | String Select | | |
| Lift | Y | Boolean | | |
| Curl | Y | Boolean | | |
| UPC Grade | Y | String Select | | |
| Peel Seal | Y | Analog | | g/15mm |

Close

Fig. 24

Interwave Coordinator - Defect Entry

Work Order No [WO-111001]  LotID [L-111001-3]  Part No [1578150-05M]

Category 1 Defects

| [0] Registration | [0] Streaks |
| [0] Screening | [0] Tailing |

Category 2 Defects

| [0] Fogging | [0] Color |
| [0] Ink Laydown | [0] COF Out |

[Commit Data]  [Reset All]  [Close]

Fig. 26

Interwave Coordinator - Downtime Event Entry

| Field | Value |
|---|---|
| Department | Production |
| Operation | Injection Molding |
| Machine | IM_001 |
| Reason Code | Part jammed in machine |
| Date/Time | 29-OCT-2002 9:01:34 AM |
| Comments | This happens frequently with this part - need to look at reworking tooling to address problem |

[ Save ]  [ Cancel ]

Interwave Coordinator - Downtime Event Reconciliation

| Field | Value |
|---|---|
| Department | Production |
| Operation | Injection Molding |
| Machine | IM_001 |
| Event Code | Part jammed in machine |
| Initiation Date/Time | 29-OCT-2002 9:01:34 AM |
| Resolution Code | Removed part from machine |
| Resolution Date/Time | 29-OCT-2002 9:03:55 AM |
| Comments | Called maintenance to remove jam |

[ Save ]  [ Cancel ]

Interwave Coordinator - Module Evaluation and Repair

Serial Number: L0000001-03
Issue Type: Customer Return
Failure Description: Connector damaged
Issue Status: ⊙ Open  ○ Resolved

Evaluation
Diagnosis Description:

Repair
Root Cause:
Failure Code:
Repair Code:
Repair Details:

View Signature Analysis

Disposition
Module Disposition:
Disposition Location:

Save    Cancel

MACHINE SCHEDULE - Packing Machine No 1 - Microsoft Internet Explorer

Web View of Dispatch Record

MACHINE SCHEDULE - Packing Macine No 1

| WO No | Batch No | Begin Time | End Time | Qty | Status |
|---|---|---|---|---|---|
| 200 | 1 | 1/30/02 9:06:00 AM | 1/30/02 9:07:00 AM | 1 | SCHEDULED |
| 200 | 2 | 1/30/02 9:07:00 AM | 1/30/02 9:08:00 AM | 1 | SCHEDULED |
| 200 | 3 | 1/30/02 9:08:00 AM | 1/30/02 9:09:00 AM | 1 | SCHEDULED |
| 200 | 4 | 1/30/02 9:09:00 AM | 1/30/02 9:10:00 AM | 1 | SCHEDULED |
| 200 | 5 | 1/30/02 9:10:00 AM | 1/30/02 9:11:00 AM | 1 | SCHEDULED |
| 200 | 6 | 1/30/02 9:11:00 AM | 1/30/02 9:12:00 AM | 1 | SCHEDULED |
| 200 | 7 | 1/30/02 9:12:00 AM | 1/30/02 9:13:00 AM | 1 | SCHEDULED |
| 200 | 8 | 1/30/02 9:13:00 AM | 1/30/02 9:14:00 AM | 1 | SCHEDULED |
| 200 | 9 | 1/30/02 9:14:00 AM | 1/30/02 9:15:00 AM | 1 | SCHEDULED |
| 200 | 10 | 1/30/02 9:15:00 AM | 1/30/02 9:16:00 AM | 1 | SCHEDULED |
| 200 | 11 | 1/30/02 9:16:00 AM | 1/30/02 9:17:00 AM | 1 | SCHEDULED |
| 200 |  | 1/30/02 9:17:00 AM | 1/30/02 9:18:00 AM | 1 | SCHEDULED |
| 200 |  | 1/30/02 9:18:00 AM | 1/30/02 9:19:00 AM | 1 | SCHEDULED |
| 200 |  | 1/30/02 9:19:00 AM | 1/30/02 9:20:00 AM | 1 | SCHEDULED |

Return

Interwave Coordinator - Shipping Overview

Sales Orders:

| Sales Order No | Line Item | Customer | Item No | Description |
|---|---|---|---|---|
| ☑ SO-0000001 | SO-0000001-01 | Acme | Liner-40 | 40" Liner Roll |
| ☑ SO-0000001 | SO-0000001-02 | Acme | Face-40 | 40" Face Roll |
| ☐ SO-0000002 | SO-0000002-01 | Trident | Face-40 | 40" Face Roll |
| ☐ SO-0000002 | SO-0000002-02 | Trident | Liner-40 | 40" Liner Roll |

Refresh    Set Filter

Shipment Header | Shipment Items | Shipment Details

Selected Orders:
SO-0000001, SO-0000001-01
SO-0000001, SO-0000001-02

Order Detail:
Sales Order No
Customer
Line Item No
Item Number
Description
Promised Date
Shipment Qty    0

Save Shipment

Close

SUITE OF CONFIGURABLE SUPPLY CHAIN INFRASTRUCTURE MODULES FOR DEPLOYING COLLABORATIVE E-MANUFACTURING SOLUTIONS

CROSS REFERENCE TO RELATED APPLICATIONS

This application is a continuation of commonly assigned, application Ser. No. 10/358,305, filed Feb. 5, 2003 now abandoned, which claims benefit under 35 USC 119(e) to U.S. provisional application Ser. No. 60/354,151, filed Feb. 6, 2002.

BACKGROUND OF THE INVENTION FIELD OF THE INVENTION

The present invention relates to Manufacturing Executive Systems (MES). Particularly, the present invention relates to Collaborative Manufacturing Executive Systems (CMES), which can be defined as "collaborative manufacturing management infrastructure."

DISCUSSION OF THE BACKGROUND

U.S. Pat. No. 6,470,227 (hereinafter 227 patent) discloses a method for automating a manufacturing process including configuring application objects embodied in a computer program. The inventors recognized that the '227 patent does not provide any solution to synchronize key supply chain modules (ERP, PLM, and APS etc.) and production support systems (LIMS and FCS etc.) with events and activities that occur on the factory floor, and that the '227 patent fails to disclose the ability to synchronize and coordinate activities across multiple manufacturing sites.

SUMMARY OF THE INVENTION

A MES system means a software application that provides a real-time view of manufacturing operations. These systems perform the task of integrating corporate or plant business systems information with shop floor data systems. The resulting values provided by MES are data that can be automatically converted into "actionable information" that can then be used for improved decision making at all levels of the manufacturing enterprise. For example, MES provides values derived from data obtained from operations, manufacturing management, engineering, IT, planning, materials management, etc.

A CMES system is about information, and how to get your data from the plant floor, from production control, from inventory and quality control, from purchasing, from engineering, from marketing and sales, and turn that data into information that can be used by managers at all levels of the enterprise to make mission-critical decisions. To summarize. CMES is about communication, and how to optimize the bi-directional flow of information to and from the operating units in a manufacturing enterprise.

Therefore, it is the object of the present invention to provide a collaborative manufacturing execution system (CMES) and method. The CMES is designed in the form of a collaborative software system infrastructure that interfaces with business systems, the supply chain modules, such as Enterprise Resource Planning (ERP) and Advanced Planning & Scheduling (APS), production support systems, such as Laboratory Information Management Systems (LIMS), Finite Capacity Scheduling (FCS) Systems, and plant floor systems, such as Supervisory Control and Data Acquisition Systems (SCADA), Distributed Control Systems (DCS), and Programmable Logic Controllers (PLC).

This collaborative infrastructure, which is a collaborative manufacturing execution system (CMES), supports and enables high velocity e-business initiatives for manufactures in many different market segments, e.g., automotive, consumer products, food and beverage, pharmaceutical, electronic. Furthermore, this collaborative infrastructure is able to coordinate and synchronize business systems, production support systems and plant floor systems across multiple manufacturing sites through an enterprise intranet or the Internet.

FIG. 1 illustrates a commercial embodiment of a CMES application of this invention, named Interwave Coordinator. Interwave Coordinator is used to reduce time and expense spent in understanding process and product flow in manufacturing environments and provide real-time integration among them. Interwave Coordinator is also utilized by enterprises to make business objectives decision and determine the requirements for manufacturing and designing products using quantitative information regarding defects, downtime, rework requirements, and resulting quality.

Furthermore, FIG. 1 illustrates how Interwave Coordinator provides all of the coordination and synchronization with the external entities (ERP, PLM, PDM, etc.) at a business level that are impacted by the events and activities that occur on the plant floor. This coordination and synchronization is provided via business process modeling modules, such as the Business Process Event Coordinator, along with a supporting communication connector module, such as the XML Business Connector. In addition, Interwave Coordinator provides the internal coordination and synchronization to support typical plant floor production management functions, such as Work Order Management, WIP Management, Inventory Management, etc. This coordination and synchronization is provided via another supporting communication connector module, such as the OPC Shop Floor Connector. These two types of coordination and synchronization provide a completely synchronized information system to support the tremendous information demands of a CMES model. As a result, there will be no overlapping and disconnected segments in various levels of manufacturing work flow and among remote manufacturing sites. The CMES of this invention includes a suite of universal application templates, utilities and pre-configured solutions that leverage Microsoft technology such as Visual Basic, COM+ and SQL Server.

The universal application templates are configurable, scalable, and maintainable application templates that can be deployed in a stand-alone mode, or can be assembled into a fully functional solution, that is a custom application, based on specific business needs. Specifically, the universal application templates are configurable because they are configurable through a user friendly Graphical User Interface panel or panels to designate a particular business specification by way of selecting parameters in various entries. Further, the universal application templates are scalable because each and every one of them can function independently or in combination with other application template or templates. Enterprises can design a custom application to fit special business needs in manufacturing simply by selecting at least one appropriate application template. This is the reason why the present invention is capable of operating in a stand-alone mode or being packaged into a fully functional business solution. Finally, the universal application templates are maintainable because it is easy to maintain these templates. Due to the independence nature of each application template, it is less costly, less time-consuming and easy-access to fulfill maintenance needs, such as debugging and updating.

These application templates provide capabilities, such as Work Order Management, WIP Management, Inventory Management, Material Management, Tool Management, Quality Management, Quality Data Collection, Defect Tracking, Downtime Tracking, Specification Management, Receiving and Inspection, Shipping, Return Merchandise Authorization, Engineering Change Order, Work Instructions and Electronic Notebook.

Pre-configured solutions are also provided to address specific vertical industries. These market available pre-configured solutions utilize and extend the basic functionality in the universal application templates to address the unique information requirements of a particular manufacturing industry. These solutions include Roll Tracker, which provides basic roll tracking functions for manufacturers in the roll goods industry; Discrete Assembler, which provides discrete assembling and tracking functions for customers in the discrete manufacturing sector; Pharma Manager, which provides specification management, batch execution, on-line data collection, and genealogy for preweigh and dispensing operations under FDA control; MedDevice Tracker, which provides basic tracking, genealogy, quality management, and data collection functions for manufacturers in the medical device industry under FDA control; and Food Processor, which provides basic tracking, genealogy and quality control of inventory and product in the regulated food industry.

This new CMES application, Intewave Coordinator, also includes a plurality of support applications, such as Shop Scheduler and Lab Manager, providing basic functionality for scheduling and laboratory management. Utility modules are also included in the invention to address common functions such as label printing, event messaging, data archiving, auto tracking, auto data collection and work traveler printing. Furthermore, the invention provides modules to interface to the business systems and shop floor systems, such as the Extensible Markup Language (XML) and Ole for Process Control (OPC) technologies to provide open and standardized interfaces.

The Interwave Coordinator embodiment also provides a visualization module that provides standard or ad-hoc reporting capability through Microsoft Excel. This module provides visibility into the performance of the manufacturing enterprise by analyzing and reporting Key Performance Indicators (KPIs) and Overall Equipment Efficiency (OEE), such as performance to schedule, downtime, scrap, utilization and efficiency. Because of the visibility of manufacturing performance, enterprises are able to adjust and make better business objectives and, therefore, increase overall enterprise achievements based on the received analysis and report. Moreover, some of the business rules are automatically adjusted based on the visibility feedback.

There are many advantages of this inventive CMES application. First, the invention decreases time-to-deployment, which accelerates payback and Return On Investment (ROI). Secondly, this invention enables easy, rapid, and cost effective pilots or proof-of-concept. This CMES application is cost-effective and provides affordable industry-based solutions that reduce total cost of ownership (TCO) and increase return on investment. Furthermore, this CMES application reduces project risk and utilizes modular approach that accommodates phased implementations and scalable point solutions. Based on extensive domain expertise, this CMES application contains proven knowledge of market best practices, operational and business processes and enhances lean manufacturing initiatives.

In one aspect, the invention provides a system and method for providing a work flow from a business decision making layer to a production line and decision making layer; and implementing a real-time integration of said work flow. In additional aspects, the invention provides systems and methods for determining business objectives at said business decision making layer; performing said business objectives at said production line and decision making layer; and carrying out said real-time integration of said business decision making layer, said production line and decision making layer by a collaborative infrastructure, analyzing a result from said production line and decision making layer; and reporting said analyzed result to said business decision making layer; receiving a report containing analyzed result from said reporting process; and adjusting said business objectives according to said report; wherein said report comprises a plurality of formats, including Spreadsheet and GANTT Chart; wherein said collaborative infrastructure further comprises a first coordinator connector providing interface for said collaborative infrastructure and said business decision making layer; wherein said first coordinator connector is a web-based open technology for electronic data interchange; wherein said first coordinator connector is the Extensible Mark-up language (XML) Business Connector; wherein said collaborative infrastructure further comprises a second coordinator connector providing interface for said collaborative infrastructure and said production line and decision making layer; wherein said second coordinator connector is an Application Programming Interface (API); wherein said second coordinator is the Ole Process Control (OPC) Shop Floor Connector; integrating said business decision making layer, production line and decision making layer by said collaborative infrastructure through an Intranet or the Internet; wherein said production line and decision making layer further comprises a plurality of business rules; analyzing a result from said production line and decision making layer; reporting said analyzed result to said business decision making layer; receiving a report containing analyzed result from said reporting process; and automatically adjusting said business rules based on said report; wherein said collaborative infrastructure further comprises a plurality of configurable module templates; wherein said collaborative infrastructure further comprises a graphical user interface capable of configuring and modifying said plurality of business rules; wherein said configurable application templates are capable of synchronizing and optimizing execution activities at said production line and decision layer; wherein said infrastructure is a Manufacturing Executive System (MES); wherein said infrastructure is a Collaborative Manufacturing Executive System (CMES); wherein said collaborative infrastructure further comprises a plurality of scalable application templates; wherein said collaborative infrastructure comprises at least one custom application constructed with at least one scalable application template; wherein said collaborative infrastructure further comprises a plurality of maintainable application templates; wherein said maintainable application templates increase the updating and debugging abilities of said collaborative infrastructure.

BRIEF DESCRIPTION OF THE DRAWINGS

The foregoing and other objects of the invention are described with reference to the following figures in which like elements are referred to by the same or similar reference numerals.

FIGS. 4A and 4B are illustrations of an embodiment of the manufacturing information system architecture of the present invention shown in FIG. 1.

FIGS. 11A, 11B, 12A and 12B are illustrations of the GUI for the Work Order Management application template.

FIG. 13 is an illustration of the GUI for the WIP, Management application template.

FIGS. 14A and 14B are illustrations of the GUI for the Business Process Modeler module.

FIGS. 15A, 15B, and 16-21 are displays of reports generated by the Digital Dashboard/visualization module.

FIG. 22 is an illustration of the GUIs for the Material Management application template.

FIG. 23 is an illustration of the GUIs for the ECO application template.

FIG. 24 is an illustration of the GUI for the Quality Data Collection application template.

FIG. 26 is an illustration of the GUT for the Defect application template.

FIG. 27 is an illustration of the GUT for the Downtime Tracker application template.

FIGS. 28A and 28B are illustrations of the GUI for the RMA application template.

FIG. 29 is an illustration of the GUI to support sample management within the Lab Manager support application.

FIG. 30 is an illustration of the GUI to support test data collection within the Lab Manager support application.

FIG. 31 is an illustration of the GUI to support test template maintenance Within the Lab Manager support application.

FIG. 32 is an illustration of the GUI to support instrumentation management within the Lab Manager support application.

FIG. 42 is an illustration of a Web View of a Dispatch Report.

FIG. 43 is an illustration of the GUIs that support formulation functions within the Food Processor industry application.

FIG. 44 is an illustration of the GUIs that support production and packaging functions within the Food Processor industry application.

FIG. 45 is an illustration of the GUIs that support receiving and inventory control functions within the Inventory Management application template.

FIG. 46 is an illustration of the GUI for the Shipping application template.

FIG. 47 is an illustration of the GUIs that support QA lab product evaluation functions within the Food Processor industry application.

FIG. 48 is an illustration of the GUIs that support QA lab product test functions within the Food Processor industry application.

FIG. 49 is an illustration of the GUIs that support QA lab environmental test functions within the Food Processor industry application.

FIG. 50 is an illustration of the GUIs for the Quality Management application template.

FIG. 51 is an illustration of the GUIs that support QA product retention functions within the Food Processor industry application.

FIG. 52 is an illustration of the GUIs that support QA production checklist functions within the Food Processor industry application.

FIG. 53 is an illustration of the GUIs that support HACCP enforcement functions within the Food Processor industry application.

FIG. 55 is an illustration of the GUIs that support Tool Management application template.

DETAILED DESCRIPTION OF A PREFERRED EMBODIMENT OF THE INVENTION

Figure 1:
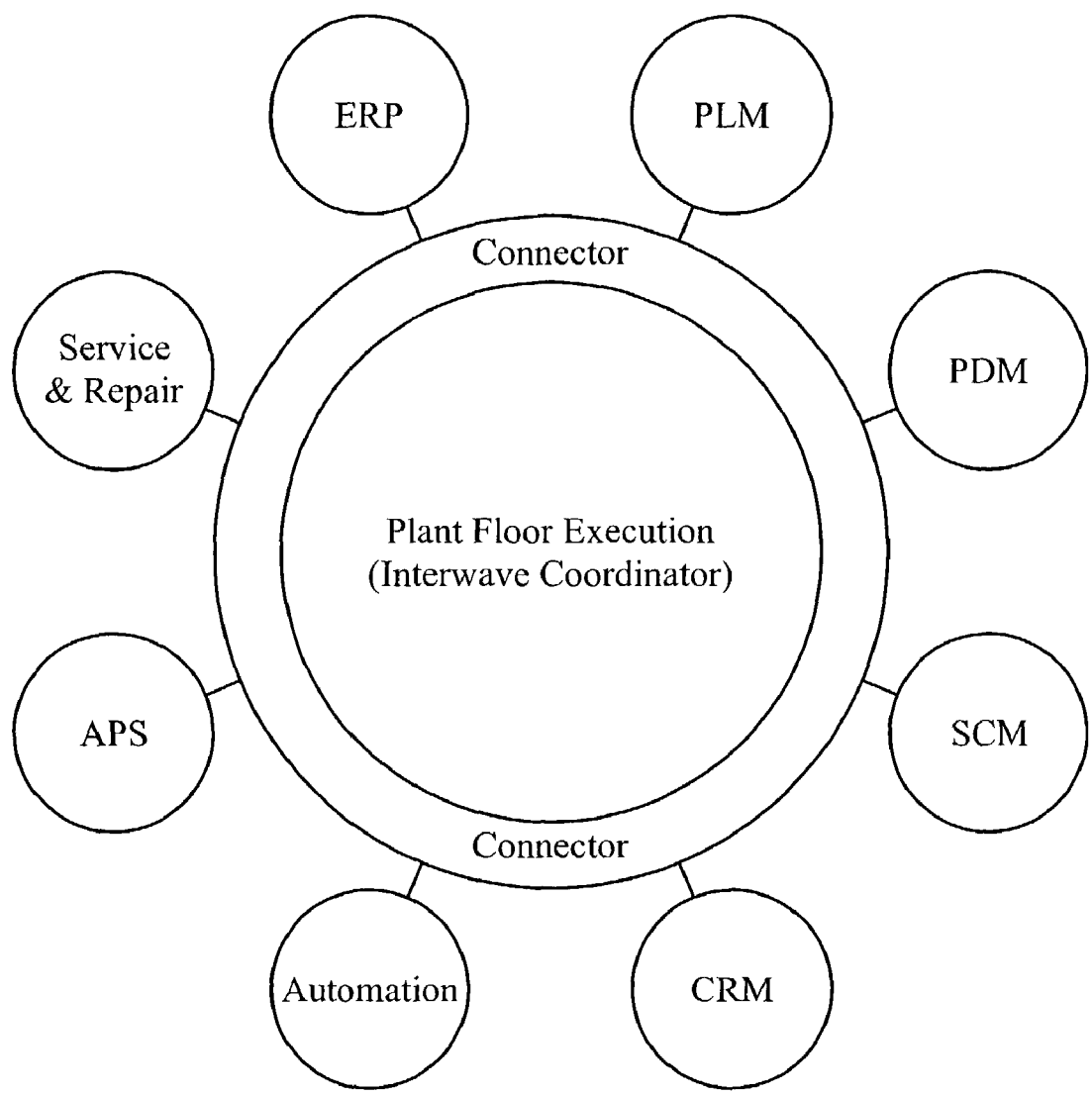
FIG. 1 is a diagram demonstrating how Interwave Coordinator supports a CMES model.

FIG. 1 illustrates all of the coordination and synchronization provided by this invention with respect to the decision support systems (ERP, APS, CRM, etc.) and production control systems (i.e. automation/plant floor production systems) employed by a typical manufacturing enterprise. The coordination and synchronization provided by this invention is key in supporting a collaborative execution model.

Collaborative Manufacturing Executive Systems (CMES) are the key to extending the principles of e-business throughout the enterprise. The extended enterprise is the core business, and the web of suppliers, partners, alliances, and customers in which the business participates. At the heart of this extended enterprise is the value chain from raw material to user. The business will have to optimize this value chain in order to be competitive in the future. An example of optimization is using the least raw material and going through most efficient process to produce the best possible products. Hence, open, maintainable, and scalable manufacturing solutions are required to be able to optimize the value chain in the extended enterprise. Collaborative MES pertains to information and how to get data from the plant floor, production control, inventory and quality control, purchasing, engineering, marketing, and sales, and turning that data into information that can be used by management at all levels in the extended enterprise to make mission-critical decision.

Figure 9:
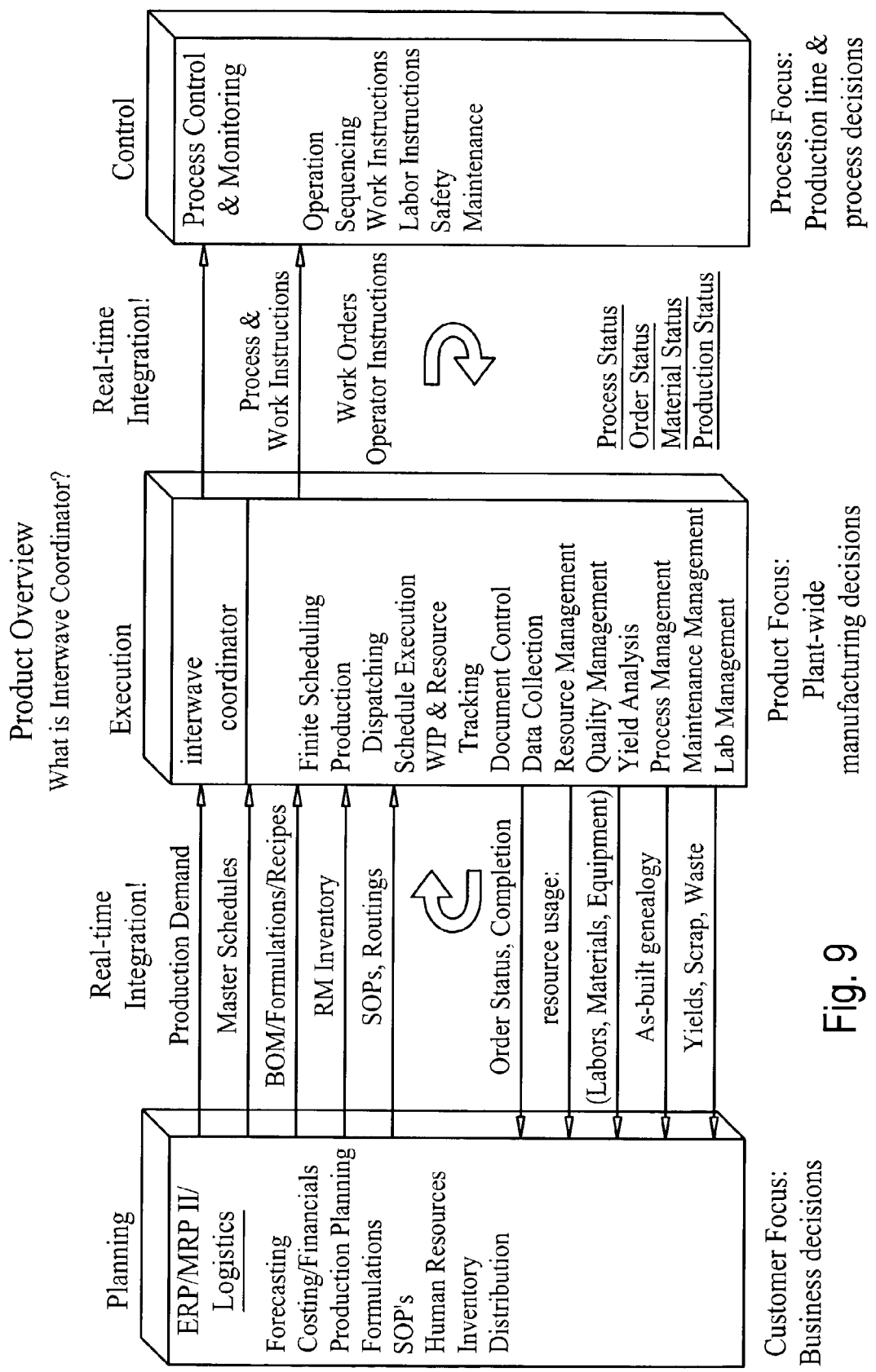
FIG. 9 is an illustration of a product overview of the present invention, depicting the relationship among business decisions, manufacturing decisions, and production line and process decisions.

Further, CMES deals with communication, and how to optimize the bi-directional flow of that information to and from the operating units of an enterprise. Collaborative MES opens that bi-directional flow of information to the entire strategic value chain of the extended enterprise. Because CMES enables most of the value-add in of an enterprise derived from the factory floor, CMES becomes the vital link that makes enterprise-wide integration possible. As shown in FIG. 9, in an extended enterprise, real-time integration with the business decision making sector and the production line and process decision sector is made possible utilizing a CMES application. Thus, CMES greatly improves the return on applied assets for any given enterprise by increasing on-time delivery, shortening inventory turn time, increasing gross margin and, most of all, improves the cash flow performance. A CMES application synchronizes key supply chain modules (ERP, PLM, PDM, APS, CRM, SCM) in a manufacturing enterprise with events and activities that occur on the factory floor.

Figure 2:
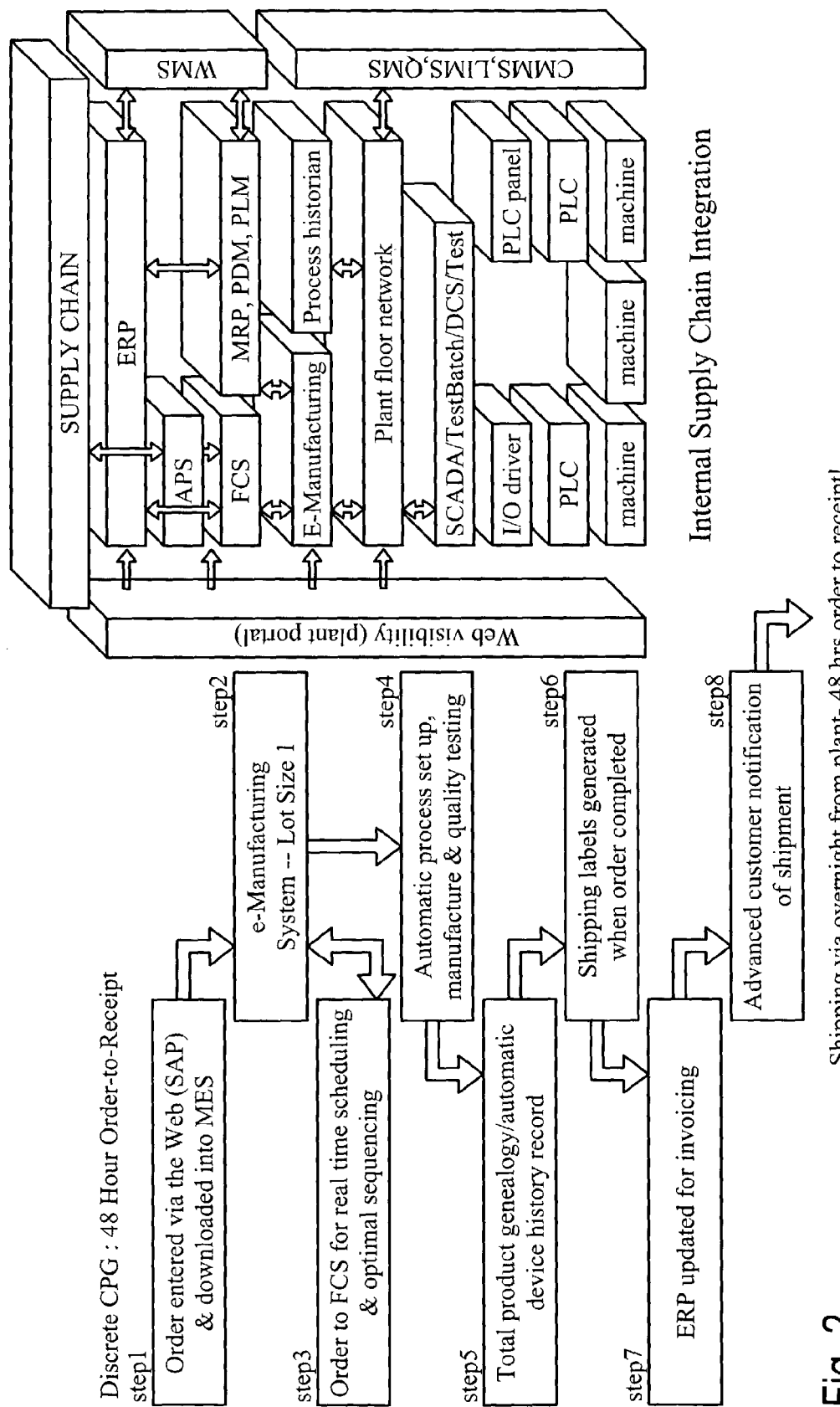
FIG. 2 is a diagram showing the Internal Supply Chain Integration of one of the preferred embodiment of the present invention.

FIG. 2 shows an overview of an example of internal supply chain integration using a CMES system of the invention including steps 1-8.

In step 1, an order is entered via the Web and then downloaded into the MES.

In step 2, once the download is finished, BOM (Bill of Materials) and order specifications are transmitted to the e-Manufacturing System. Step 2 also includes transmitting order information to devices performing step 3 and step 4.

In step 3, the order is sent to FCS for real time scheduling and optimal sequencing, and the result is then feed back to step 2.

In step 4, an automatic process is set up which performs the manufacturing and quality testing and transmits information to the structure performing step 5.

In step 5, the system generates total product genealogy and automatic device history record, and then sends the generated information to step 6.

In step 6, shipping labels are generated when the order is completed.

Step 7 is responsible for ERP updates and invoicing.

In step 8, advanced customer notification of shipment is generated along with shipping instructions. As a result, product is shipped via overnight from the plant.

Figure 3:
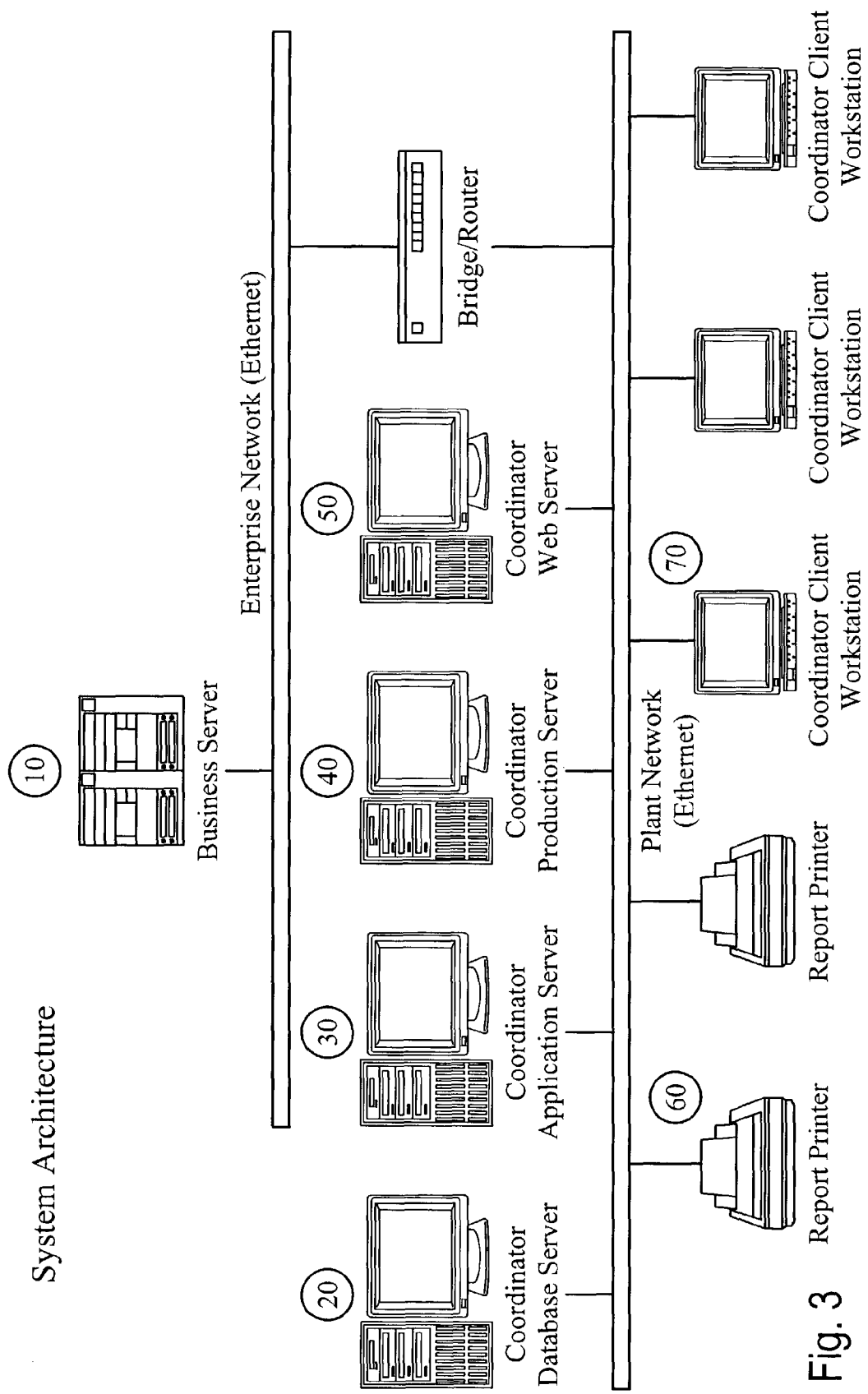
FIG. 3 is an illustration of a preferred embodiment of the system architecture of the present invention.

FIG. 3 shows a preferred embodiment of a system architecture of the CMES disclosed by the present invention. The business server 10 provides the decision support functions for the manufacturing enterprise, the Interwave Coordinator Database Server 20 provides the RDBMS for the Interwave Coordinator suite of modules, the Interwave Coordinator Application Server 30 serves up the Interwave Coordinator application templates and support applications, the Interwave Coordinator Production Server 40 provides the business process modeling and event coordination. The Interwave Coordinator Web Sever 50 provides web services for report printing, the Report Printer 60 is used for printing system reports and labels, the Interwave Coordinator Client Work Station 70 provides the GUI interface for the system user. All system components are connected via a local area and/or wide area network.

FIGS. 4A and 4B illustrate a manufacturing information system architecture in which there are deployed a plurality of information packages, and is based upon the system architecture illustrated by FIG. 3. More specifically, FIGS. 4A and 4B illustrate the flow of information between the three tiers of systems that support a manufacturing enterprise, along with the material flow that is typical for a manufacturing entity.

At the business level, the business system 110 is equipped with a business system database 220. Various pieces of information are passed between the business system 110 and the production management system (CMES). The business system 110 requires key information from the production management system (CMES) 120 in order to fulfill the informational needs (i.e. raw material consumption, production order status, finished good quantities) of the decision support systems that execute within the business system 110. Furthermore, the production management system requires information from the business system 110 to execute manufacturing orders on the plant floor. This invention provides a XML business system connector module 140 to fulfill the interface needs between the business system 110 and the production management system (CMES) 120.

At the production management system (CMES) level, a production management (CMES) database 230 is employed to provide a common data repository for all plant execution functions. Various pieces of information are passed between the production management system (CMES) 120 and the SCADA & Process Control System 130. The SCADA & Process Control System 130 requires information, such as machine setup parameters, from the production management system (CMES) 120 to manufacturer the product to the proper specification. Furthermore, the production management system (CMES) 120 requires information, such as process alarms and production events, from the SCADA & Process Control System 130 in an effort to manage the production process. This invention provides an OPC shop floor connector module 150 to fulfill the interface needs between the production management system (CMES) 120 and the SCADA & Process Control System 130.

The basic manufacturing work flow demonstrated in FIGS. 4A and 4B is that raw materials 170 are received from a plurality of raw material vendors 160. These raw materials 170 are processed through a sequence of production work centers 180/190 until a semi-finished or finished product 100 is produced. Upon completing the manufacturing process, the finished product 100 is shipped to the customer 210. At each production work center 180/190, vertical databases and dedicated process control systems are employed to control and manage the manufacturing process.

Figure 5:
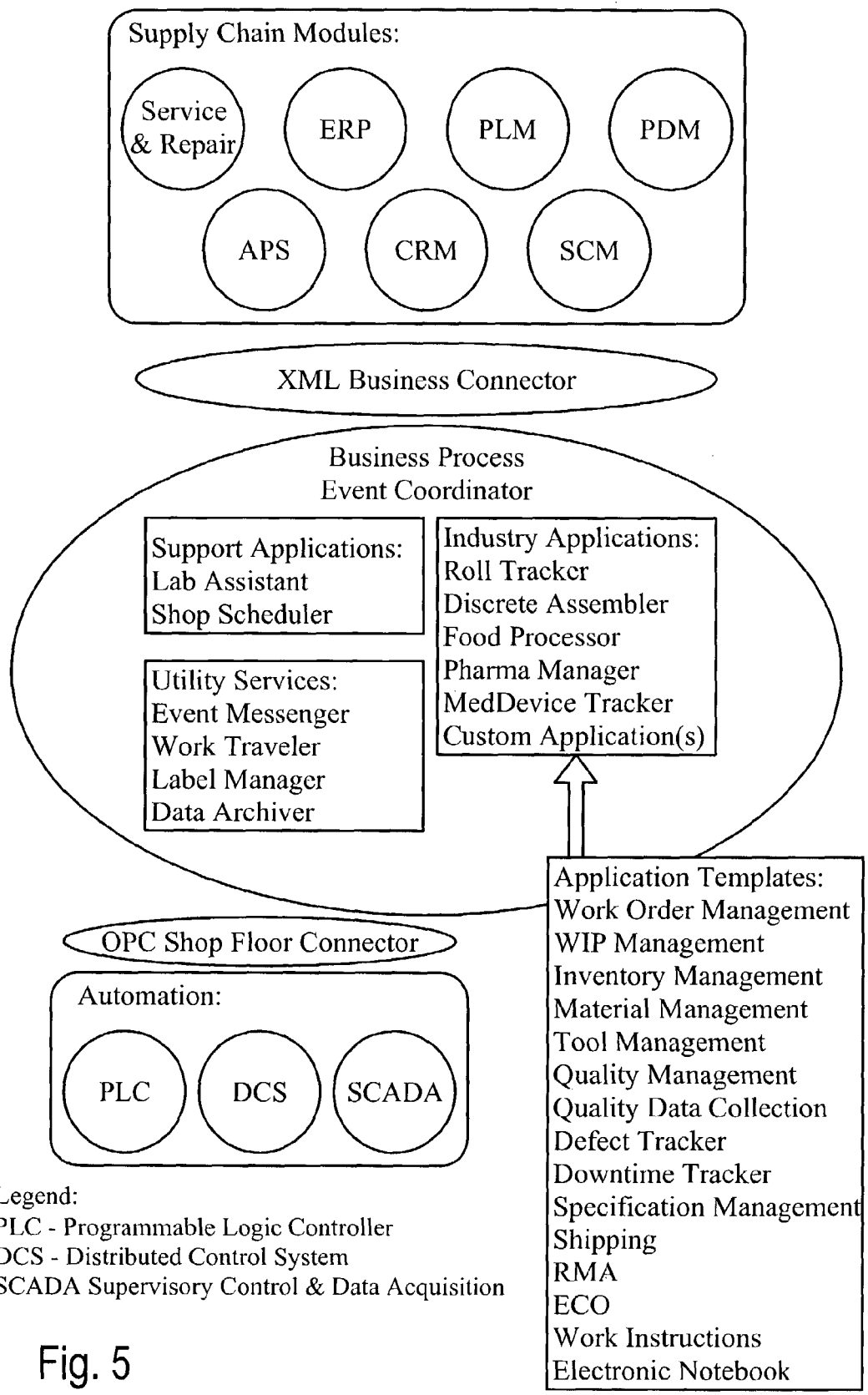
FIG. 5 is an illustration of a collaborative e-manufacturing solution model of the present invention.

FIG. 5 shows an embodiment of a system of deployed modules of the invention. At the core of the Collaborative e-Manufacturing Solution Model is the Business Process Event Coordinator. This module synchronizes and coordinates activities at the supply chain/business system level, at the automation/plant floor level, and with the production support systems such as Laboratory Information Management Systems (LIMS), Computerized Maintenance Management Systems (CMMS), Finite Capacity Scheduling Systems (FCS), Time and Attendance Systems, etc. An XML Business System Connector and Ole Process Control (OPC) Shop Floor Connector are leveraged to provide standardized interfaces to the respective systems, wherein the industry standard API called OPC (OLE for Process Control) is used to communicate with hardware PLC devices, OPC can be directly accessed using the simple Data Socket component accesses, and the Extensible Markup Language (XML) is a new format designed to bring structured information to the Web. It is a Web-based language for electronic data interchange. XML is an open technology standard of the World Wide Web Consortium (W3C), which is the standards group responsible for maintaining and advancing HTML and other Web-related standards.

Application templates are leveraged to build industry specific solutions, or custom solutions that provide typical production management functions such as work order management, WIP management, inventory management, material management, tool management, quality management, etc. These templates operate together in a seamless fashion to provide a cohesive and integrated solution. Some of the benefits realized as a result of the execution of this model are waste reduction, higher process excellence, greater throughput, accurate capability, accurate inventory levels. This feature can be better illustrated by FIG. 6.

Figure 6:
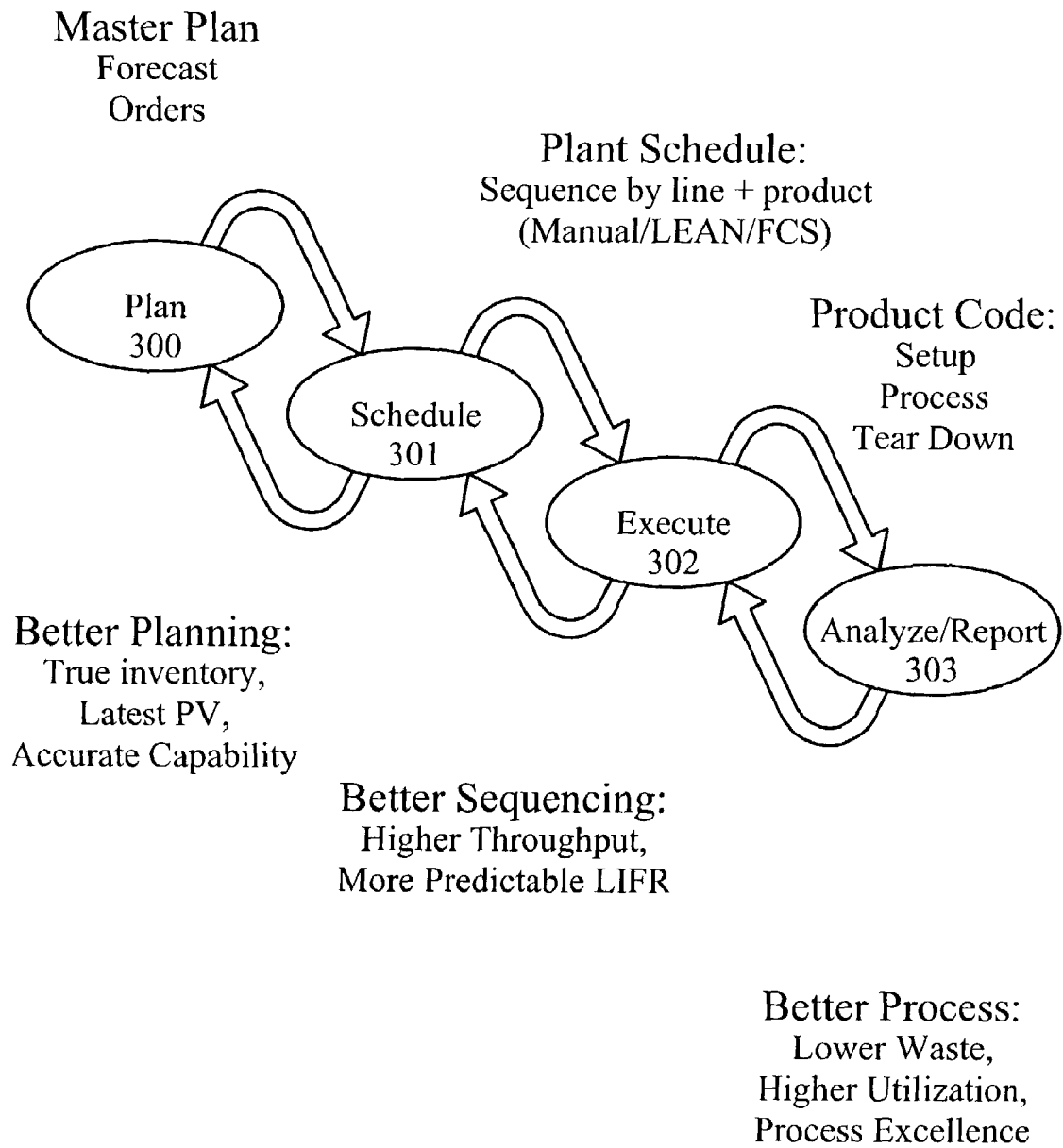
FIG. 6 is an illustration of a method of use of the invention to achieve better planning, better processing and better sequencing.

FIG. 6 illustrates the basic sequence of operations that occur with respect to manufacturing a product. These sequences are Plan 300, Schedule 301, Execute 302 and Analyze/Report 303. A business master plan of forecast orders is produced at the Plan 300 stage and then communicated to the Schedule 301 stage. At the Schedule 301 stage, a plant schedule is produced either manually or by a FCS system. Many variables need to be considered within this stage to produce a schedule that utilizes machines, materials, and manpower in an efficient manner.

Subsequently, the plant schedule is executed at the Execute 302 stage. The Execute 302 stage facilitates machine setup, processing and tear down by product code. Upon completion of the Execute 302 stage, the execution process is analyzed to surface issues that cause waste to be generated, excessive cycle times, etc. This feedback ultimately triggers an effect that produces better sequencing at the Schedule 301 stage, and better planning at the Plan 300 stage. The net effect that is achieved by this invention is that through coordination and synchronization, continuous improvement is realized at all stages of the process.

Figure 7:
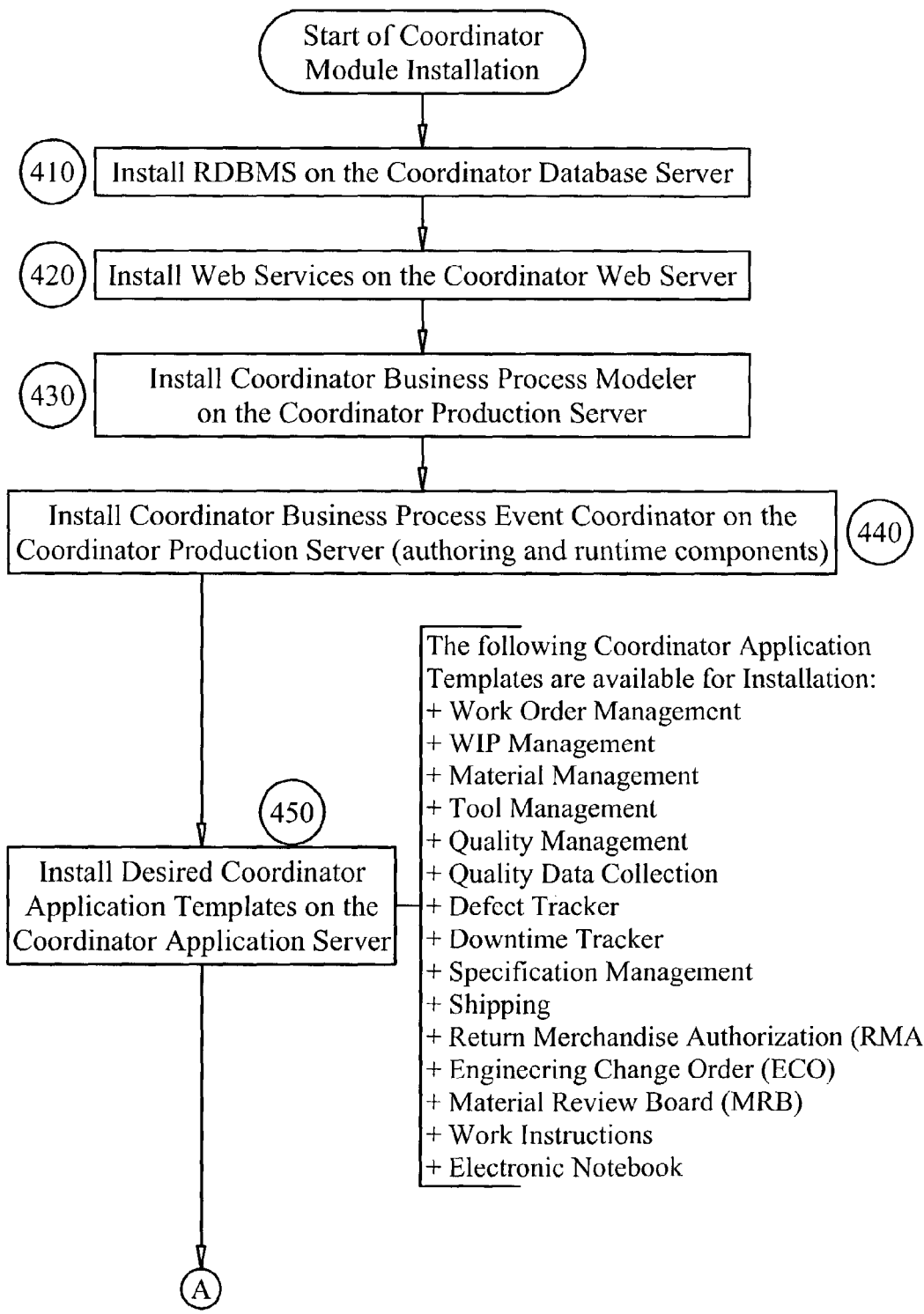
FIG. 7 is a flow chart of a process of module installation of the invention.
Figure 8:
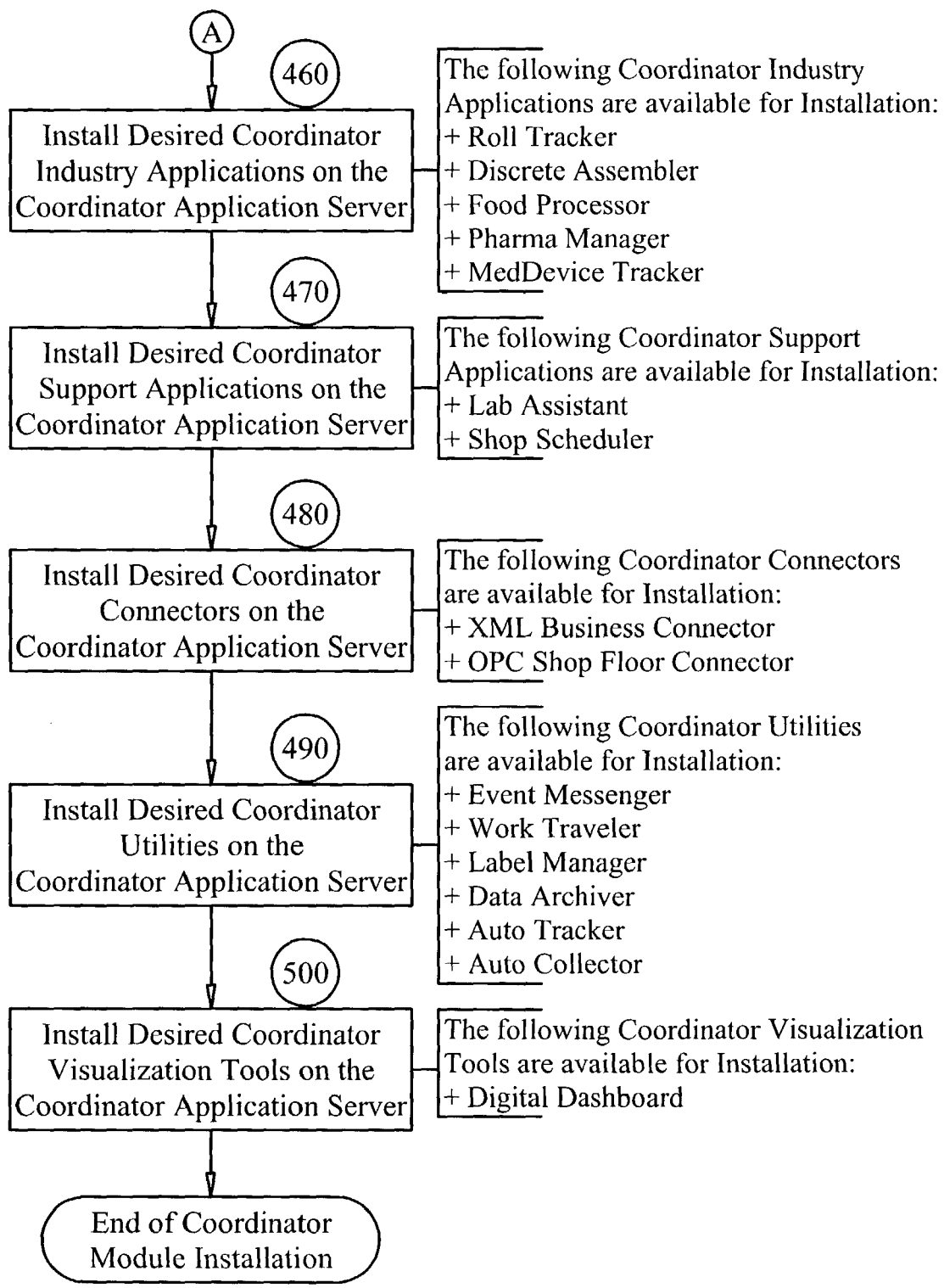
FIG. 8 is continuation of the process shown in FIG. 7.

FIGS. 7 and 8 illustrate the Coordinator Module installation of Interwave Coordinator business process modeling components, application templates, industry applications, support applications, connectors and utilities. In the beginning, as shown in FIG. 7, at step 410, Rational Database Management System (RDBMS) on the Coordinator Database Server is installed. Then, the Web Services on the Coordinator Web Server module is installed at step 420. At step 430, the Coordinator Business Process Modeler on the Coordinator Production Server is installed. Thereafter, the Coordinator Business Process Event Coordinator is installed on the Coordinator Production Server (authoring and runtime components) at step 440. Subsequently, desired Coordinator Application Templates are installed on the Coordinator Application Server at step 450. There are many available application templates that can be installed at this step to suit each individual business special needs. Those available application templates include Work Order Management, WIP Management, Inventory Management, Material Management, Tool Management, Quality Management, Quality Data Collection, Defect Tracker, Downtime Tracker, Specification Management, Receiving & Inspection module, Shipping, Return Merchandise Authorization (RMA), Engineering Change Order (ECO), Material Review Board (MRB), Work Instructions, and Electronic Notebook.

After installation of desired application templates at step 450, desired Coordinator Industry Applications are installed on the Coordinator Application Server at step 460, and desired Coordinator Support Applications are installed on the Coordinator Application Server at step 470. The available Industry Applications include Roll Tracker, Discrete assembler, Food Processor, Pharma Manager module, and Med Device Tracker module. The available Coordinator Support Applications for installation are Lab Manager, and Shop Scheduler. Referring to FIG. 8, after installation of all the desired Application Templates Applications, Support Applications, desired Coordinator Connectors are installed on the Coordinator Application Server at step 480. Those available Coordinator Connectors are XML Business Connector and OPC Shop Floor Connector. The installation process continues to step 490. At step 490, desired Coordinator Utilities are installed on the Coordinator Application Server. The available Coordinator Utilities include Auto Tracker, Auto Collector, Event Messenger, Work Traveler, Label Manager, and Data Archiver. Finally, desired Coordinator Visualization Tools are installed on the Coordinator Application Server at step 500, such as Digital Dashboard. The present invention is better described with further detailed information regarding the configurable modules. The modules have classified as Business Process Modeling, Application Template, Industry Application, Support Application, Connector, Visualization or Utility modules.

Business Process Modeling

The Business Process Modeling modules address event transaction modeling and execution, along with static process modeling. It includes two modules, the business process event coordinator and business process modeler.

Business Process Event Coordinator

The Business Process Event Coordinator (BPEC) provides the end users with the ability to graphically model and configure the manufacturing business rules required by a particular manufacturing entity. The business rules essentially describe the interaction and synchronization required between supply chain modules (ERP, APS, etc.), production support systems (LIMS, FCS, etc.), other manufacturing plants, and the factory floor. For example, how to record the machine downtime and dispose defect product. Once business rule models have been established, a runtime component of (BPEC) enforces or executes the models and rules through the runtime component/module.

Examples of business rules that would be enforced or executed by BPEC are: when a machine downtime event is detected, send a message to the Computerized Maintenance Management System to create an emergency work order to repair the machine and send a message to the Finite Capacity Scheduling System to re-schedule the others currently assigned to the machine. When a production test sample is created, send a message to the Laboratory Information management System to create a new lab sample. When a new product is being introduced to manufacturing (even if received from external system), retrieve all necessary product specifications (i.e., routes, bills of materials, etc.) from the Product Data Management System. When a work order has been put on hold by Quality, send a message to the ERP to update the status of the order to "Hold."

Business Process Modeler

The Business Process Modeler (BPM) provides the ability to model static manufacturing entities such as: departments, work centers, routes, materials, tooling, machines, locations, users, security profiles, user certifications, data collection templates, recipes, and work instructions.

Application Templates

In order to further support the collaborative scheme, a suite of highly configurable application templates have been engineered to provide basic production management functions such as work order management, WIP management, inventory management, material management, etc. The application templates are designed to be used as stand-alone components, or can be either assembled or configured or both into a cohesive solution to provide a basic foundation layer for a Collaborative Manufacturing Execution System (CMES). Once configured, these application templates provide a highly integrated factory floor information system that is essential to operating a highly efficient manufacturing operation. The application templates leverage ActiveX OCX technology to promote rapid solution configuration and deployment.

The Interwave Coordinator application templates provide the essential production management functions of the Execution layer illustrated in FIG. 9. In particular, the templates provide production dispatching, schedule execution, WIP and resource tracking, document control, data collection, resource management, quality management and process management. These functions are essential with respect to supporting a truly collaborative manufacturing model.

Figure 10:
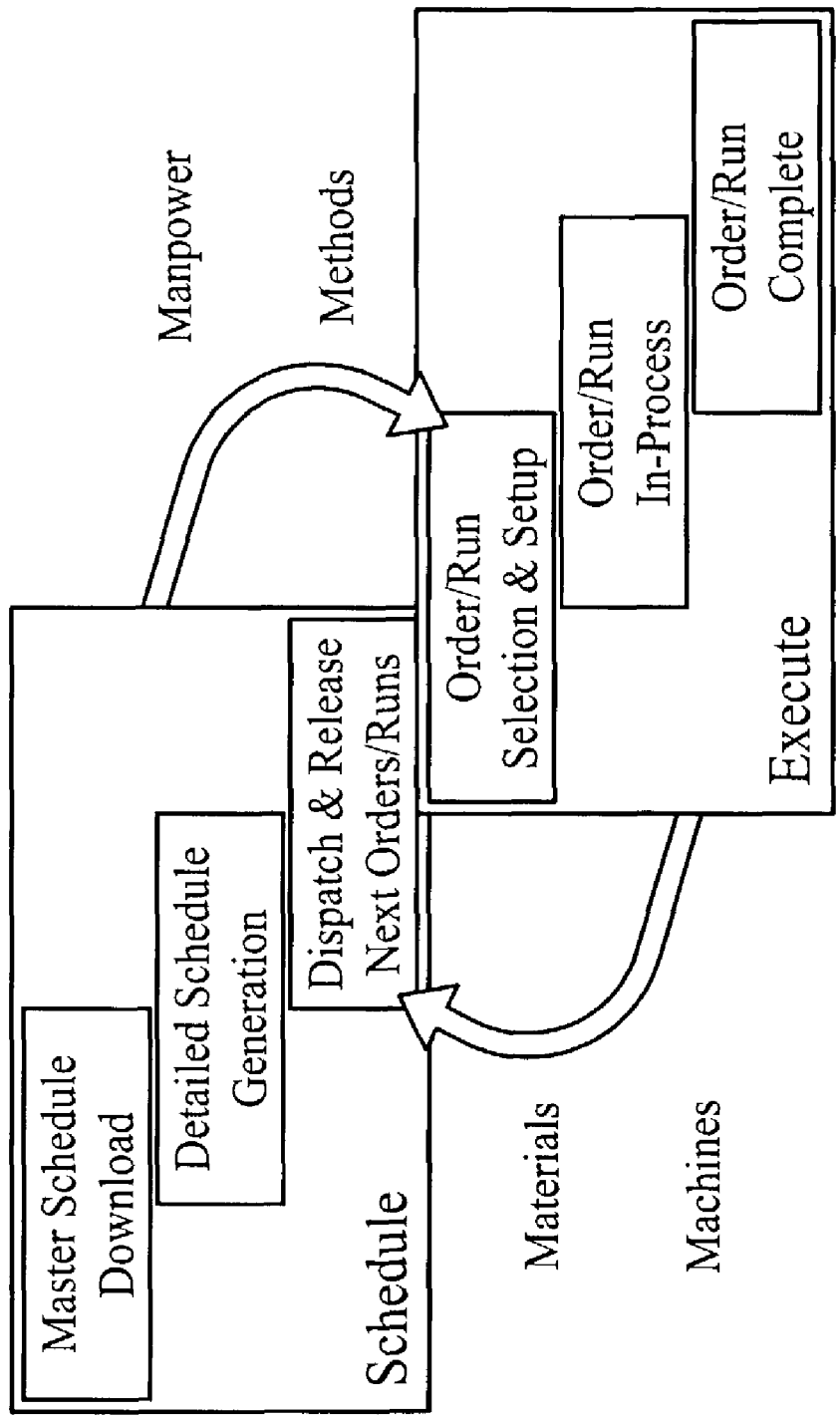
FIG. 10 is an illustration of a typical plant operations model which is supported by embodiments of the invention.
Figure 11A:
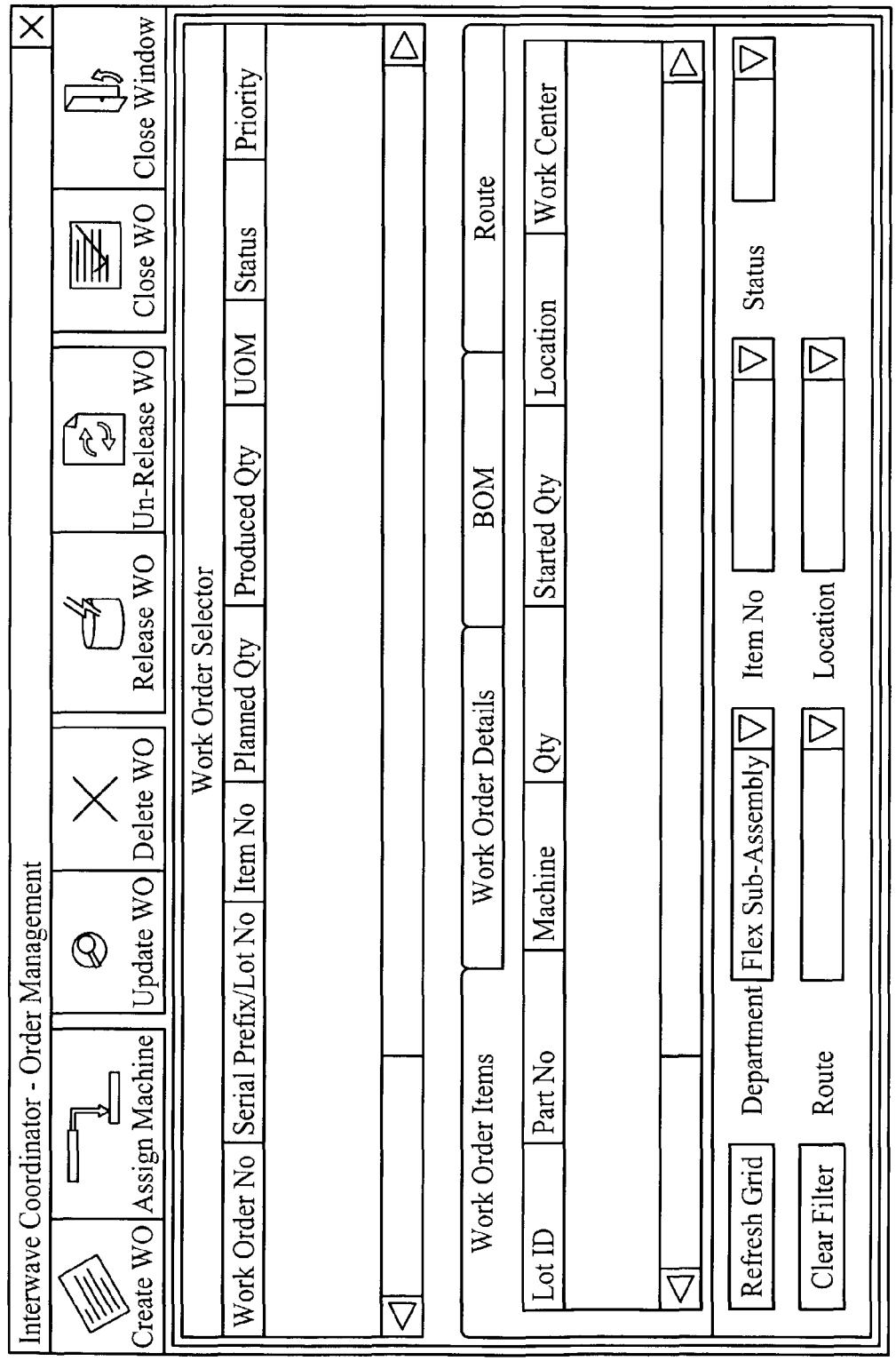
Figure 11B:
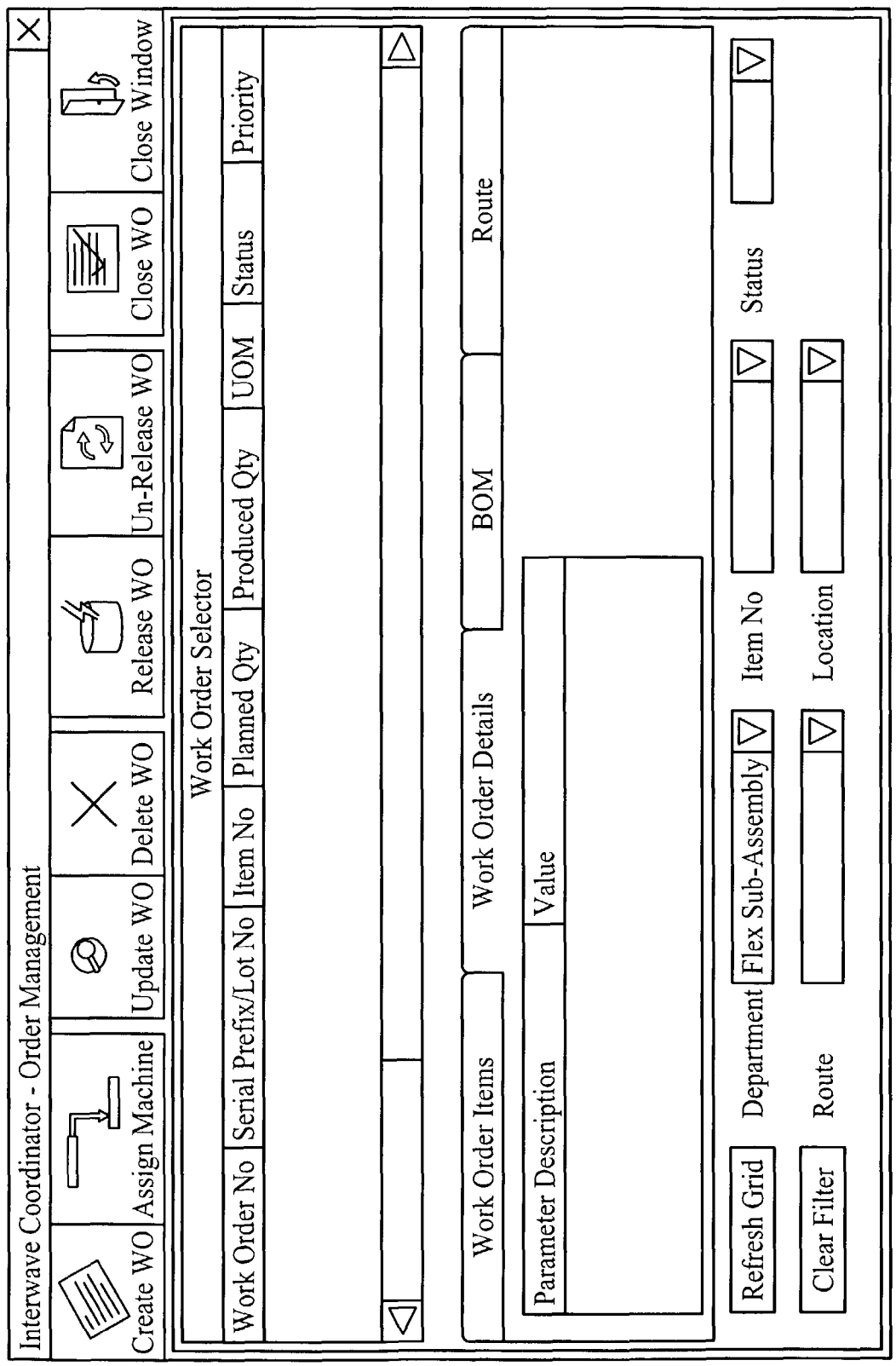

FIG. 10 illustrates a typical plant operations model. The model breaks down into Schedule and Execution phases. Within each phase, multiple steps are required to be executed in a sequential manner. The application templates have been engineered to specifically address the functionality illustrated in each of these steps. The integrated manner in which the templates have been designed promote the coordination illustrated in the FIG. 10.

Work Order Management Application Template

FIGS. 11A, 11B, 12A and 12B demonstrate the Work Order Management application template Graphical User Interface (GUI), The Work Order Management application template supports Work Order Creation, Machine Assignment, Picklist Assignment, Work Order Update, Work Order Release, and Work Order Deletion. In addition, the Work Order Management application template provides visibility with respect to the status of orders, quantity produced, required bill of material, required process routing.

Work Order Creation supports automatic creation of work orders based on the latest schedule received from the ERP/APS. It includes Bill of Materials (BOM) and routing, and also provides the ability to manually create work orders to support WAN/LAN failure, or R&D production scenarios.

Machine Assignment provides the ability to manually assign/schedule machines to work orders at specific work centers.

Picklist Assignment provides the ability to create material picklists for production work orders. It provides the ability to reserve inventory items against specific BOM items within a production work order.

Figure 12A:
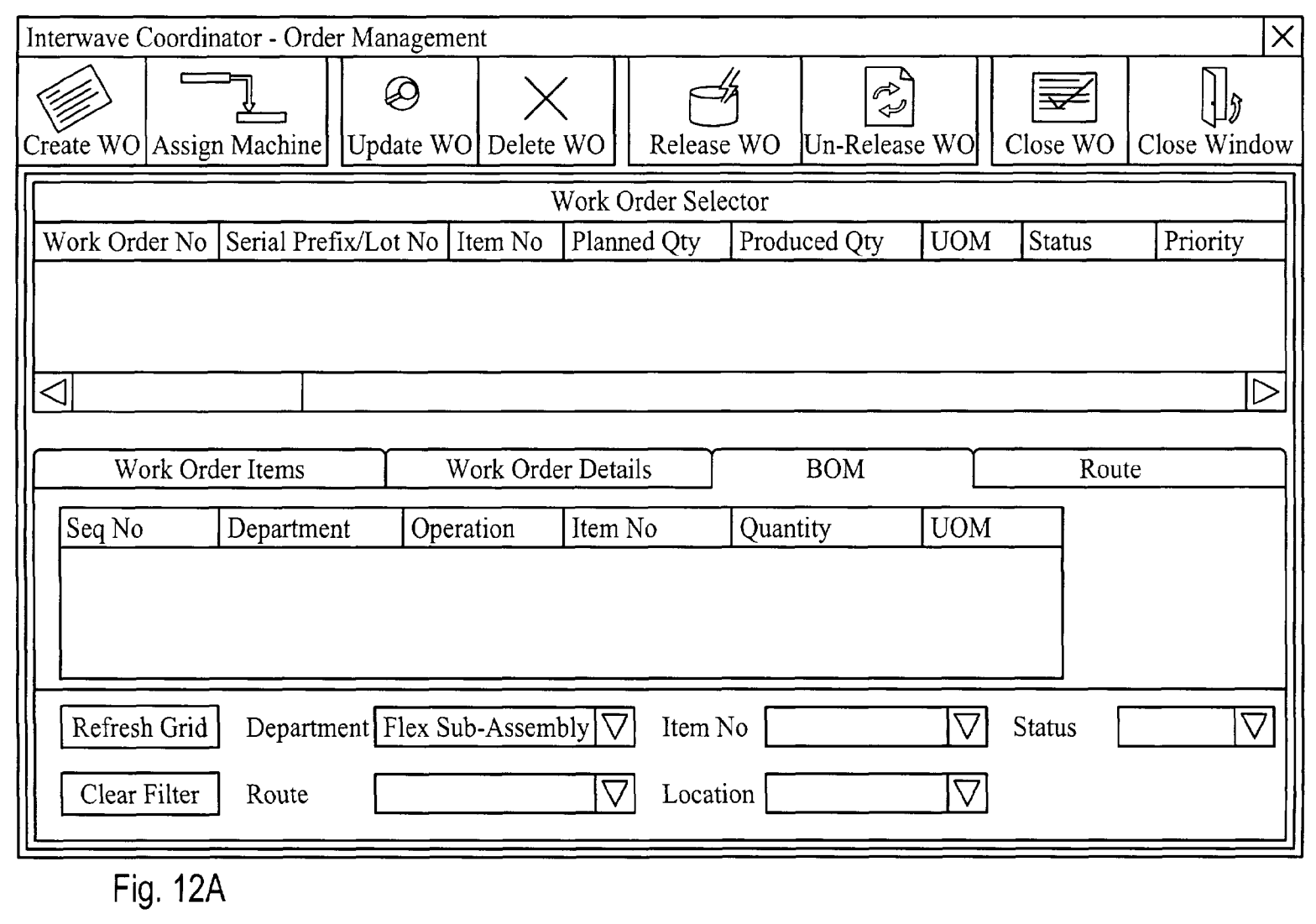
Figure 12B:

Work Order Update provides the ability to modify the quantity, priority, BOM, or routing assignment associated with existing work orders, as shown in FIGS. 12A and 12B. It also provides the ability to assign special instructions to work orders to support custom orders. Work Order Release provides the ability to dispatch work orders for production execution. It also provides the ability to suspend/hold in-process work orders. Work Order Deletion supports the automatic deletion of work orders based on the revised work order schedule received from ERP/APS. It also provides the ability to manually delete existing work orders.

WIP Management Application Template

Figure 13:
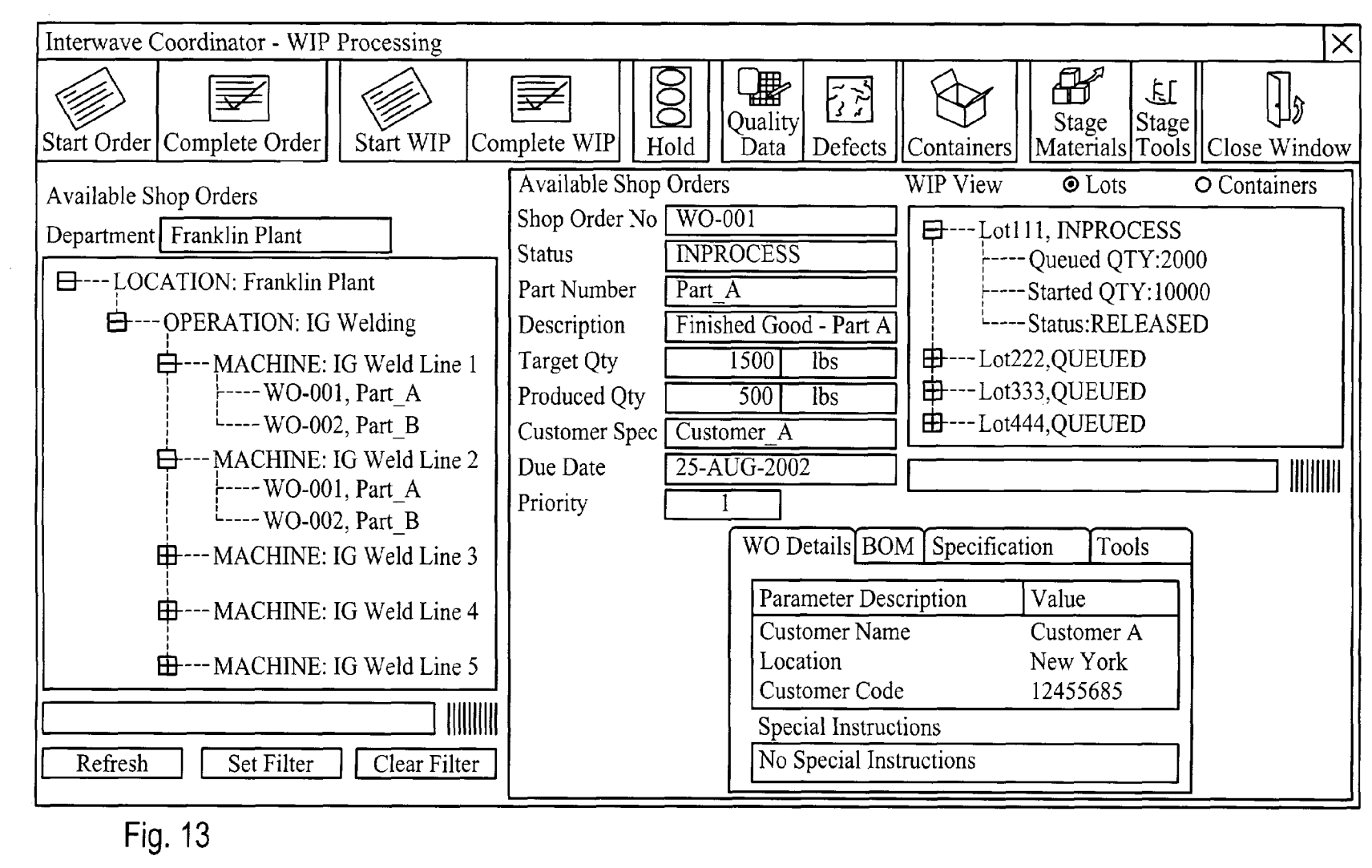

FIG. 13 demonstrates the WIP Management application template Graphical User Interface (GUI). The WIP Management application template supports Lot Create, Lot Start/Complete, and Containerization. In addition, the WIP Management application template provides visibility with respect to WIP items currently queued or in-process at a particular work center.

FIGS. 14A and 14B show the Resource Modeler functions of the ProcessStudio under Work In Progress (WIP) manager application template. The Resource Modeler models and maintains static manufacturing resources, including departments, work centers, routes, and materials. It also models and maintains resources at the plant floor and the end user parts, such as tooling, machines, locations, user security profiles, user certifications, and data collection templates and recipes, and work instruction.

Figure 15B:
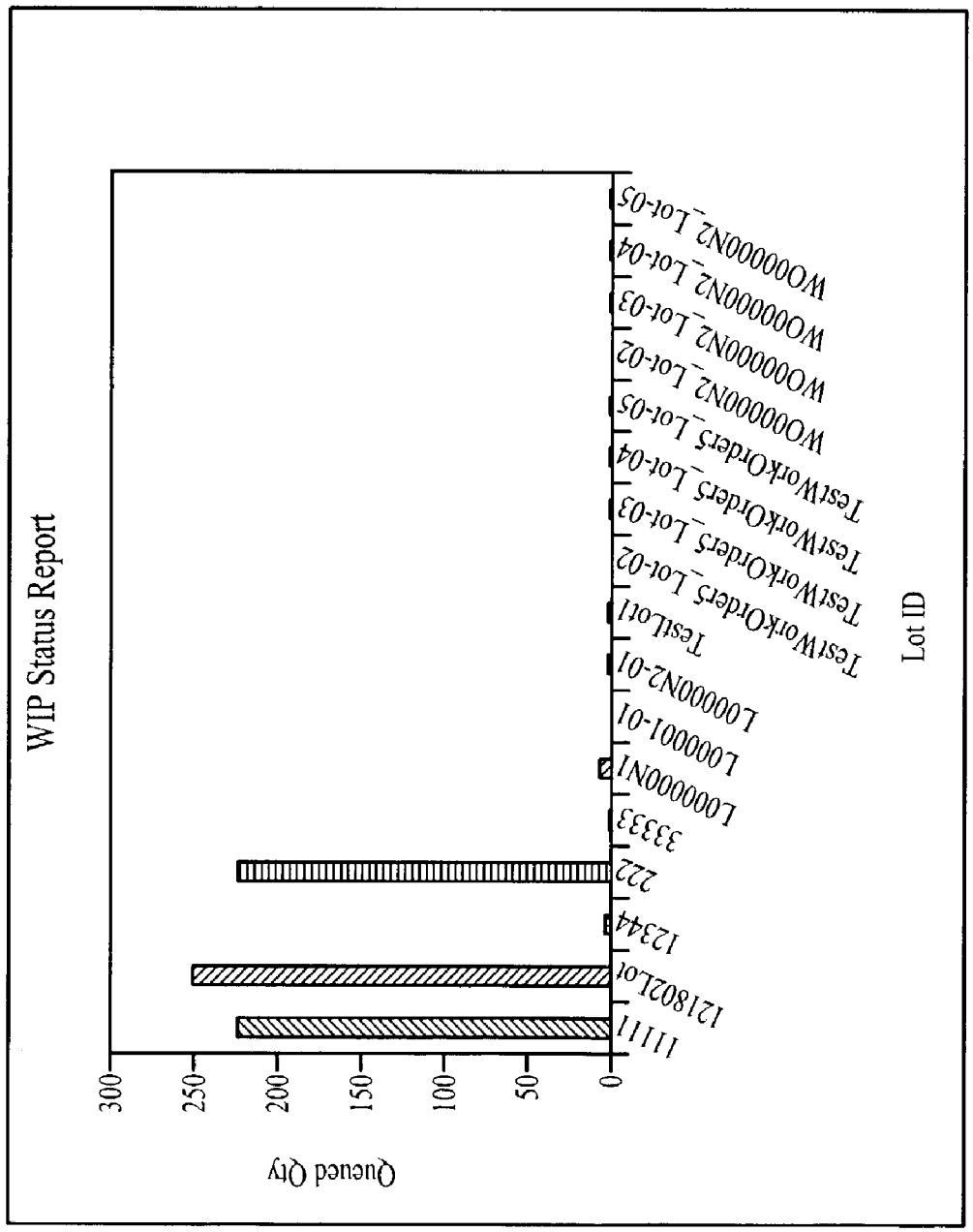
Figure 16:
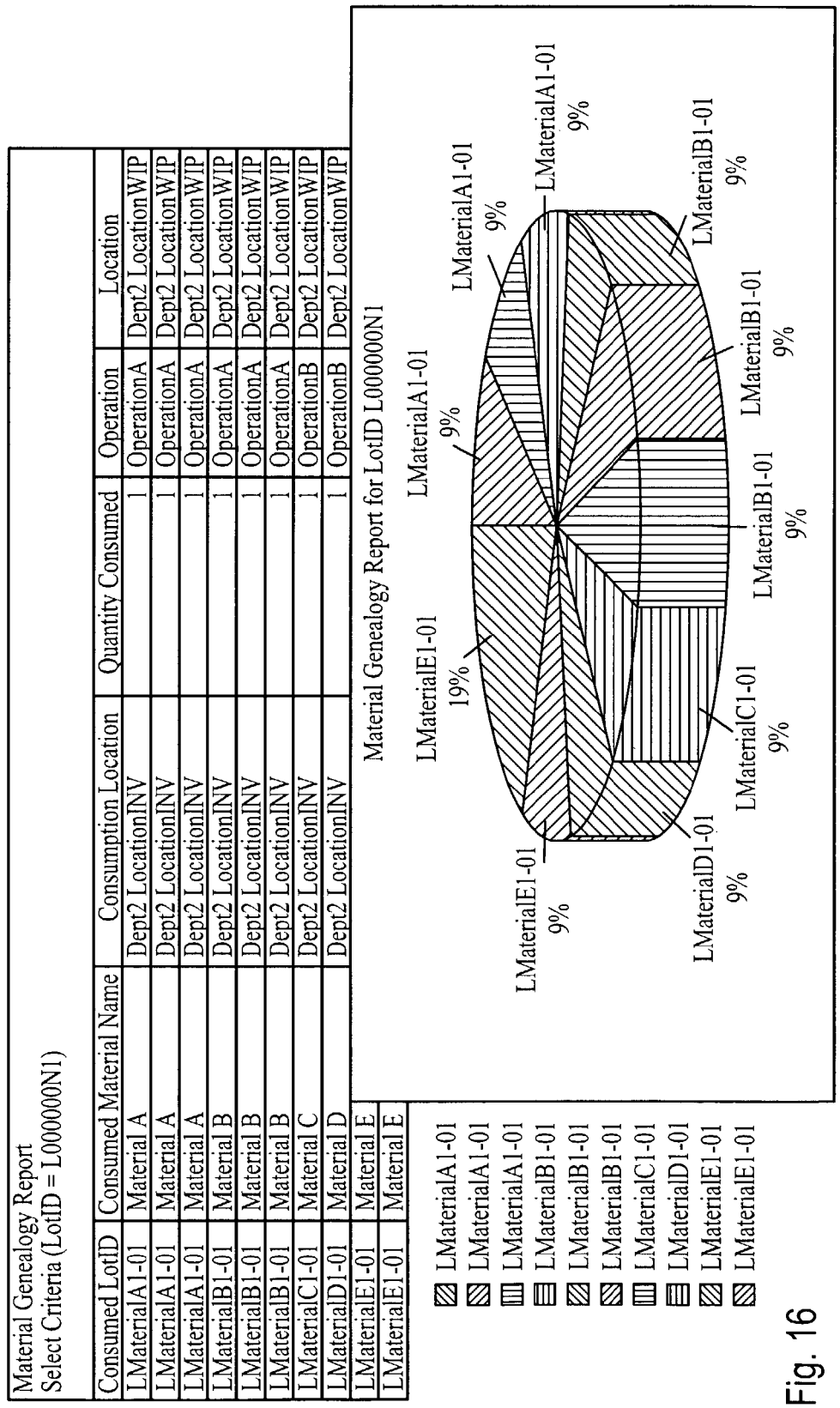
Figure 17:
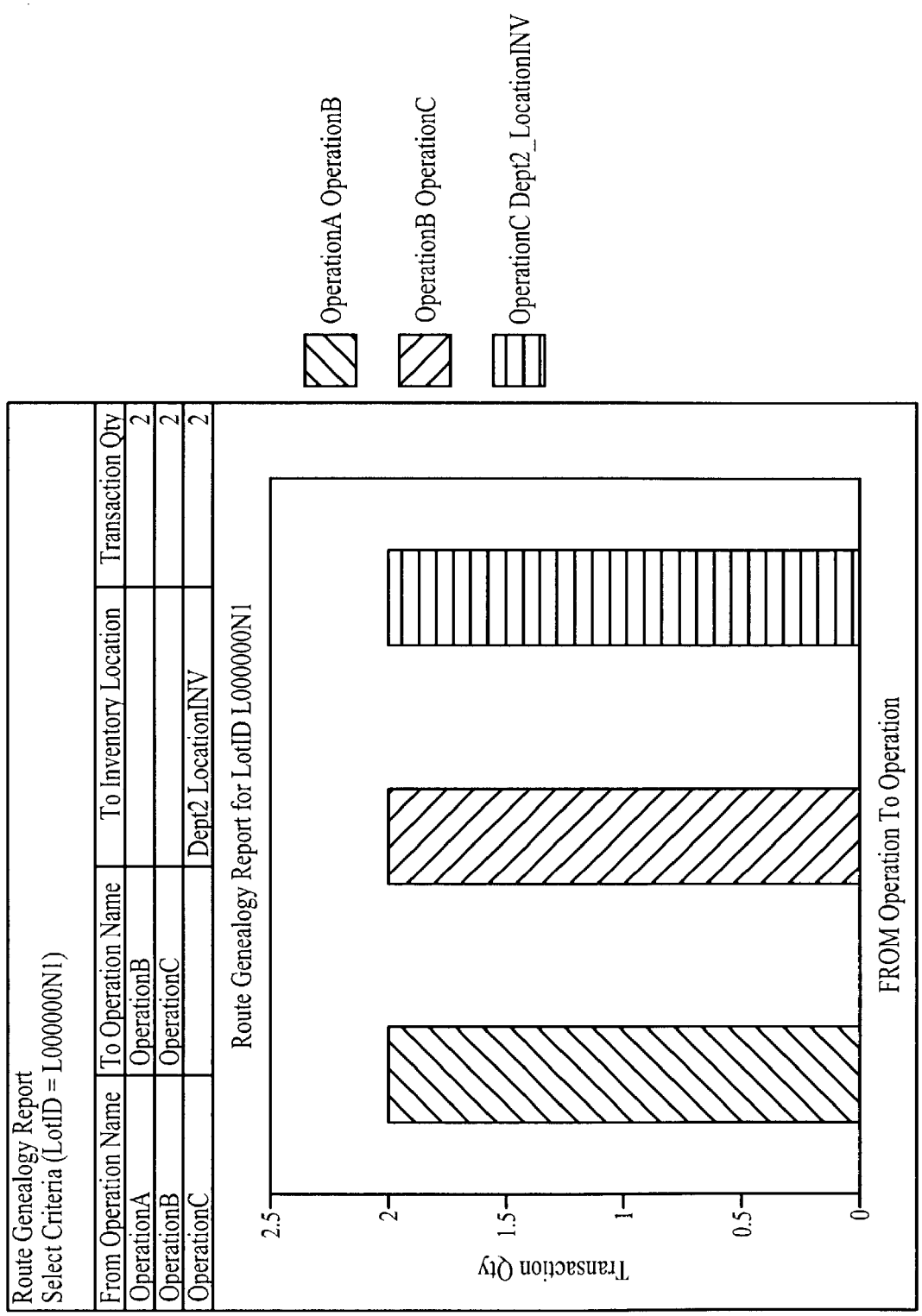
Figure 18:
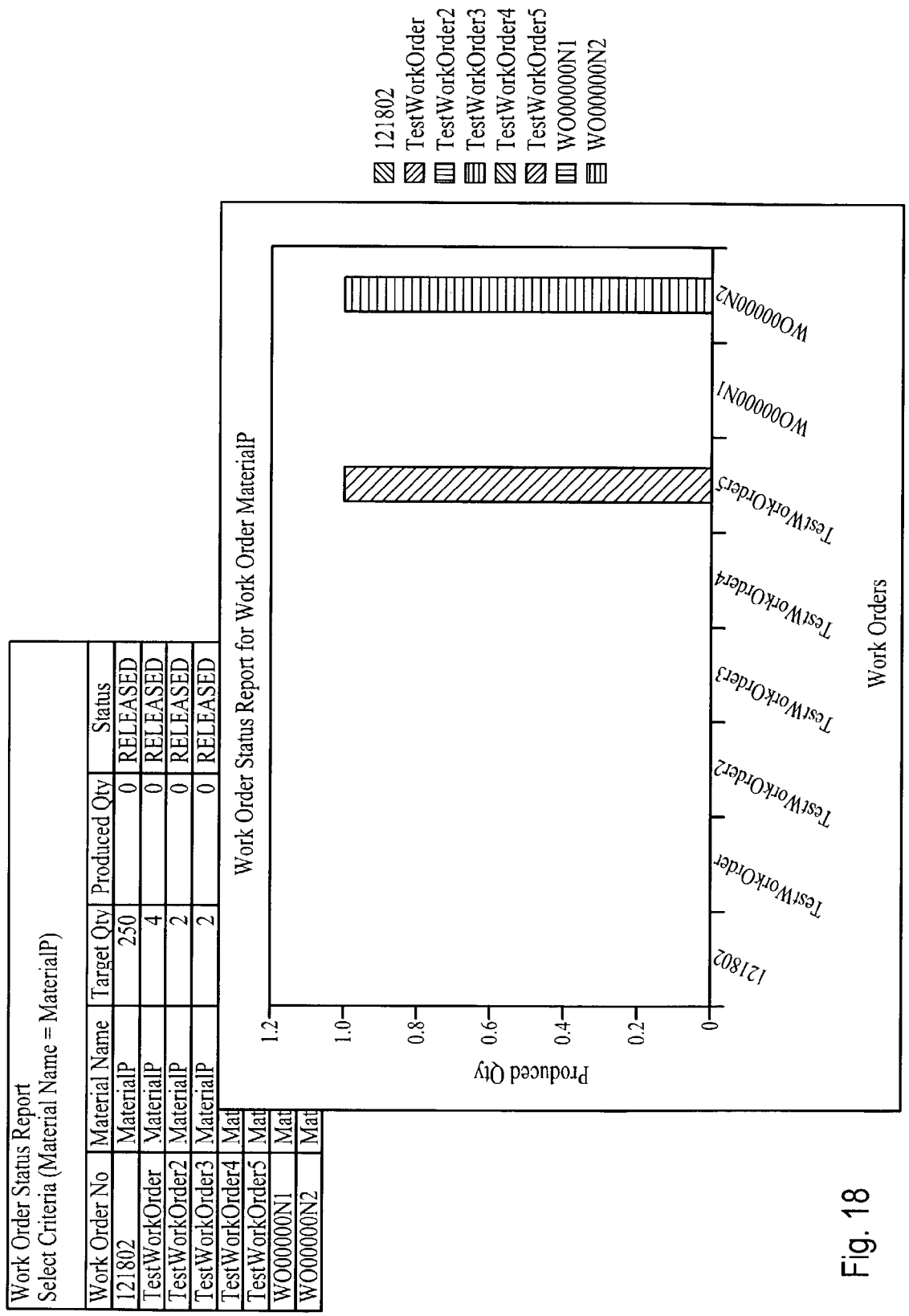
Figure 19:
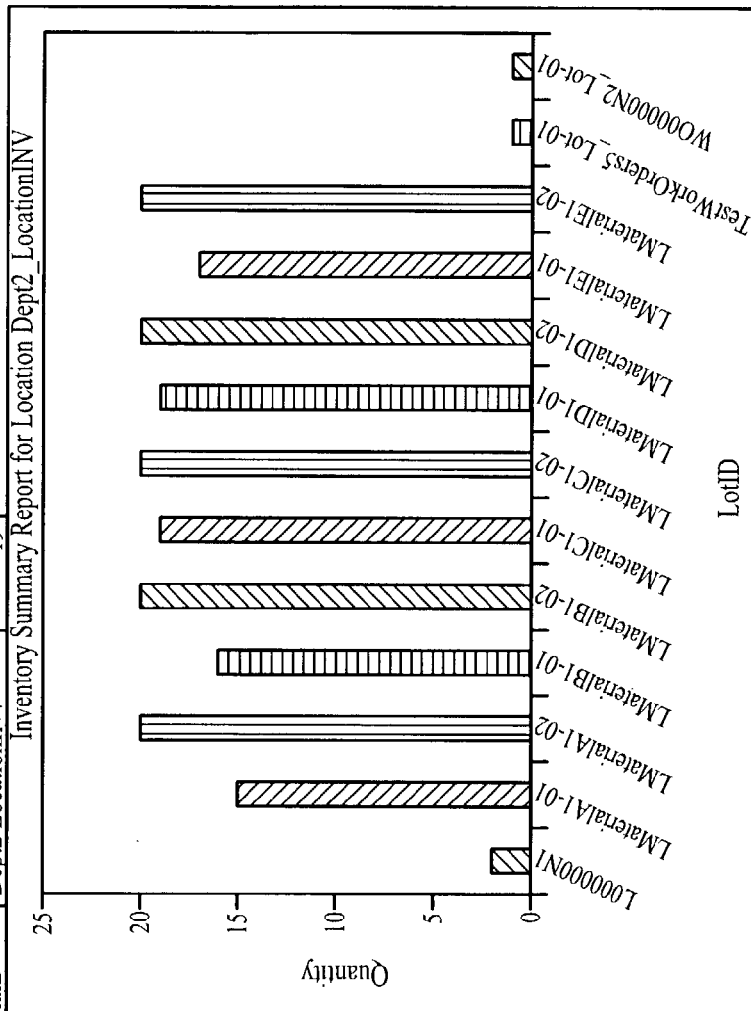
Figure 20:
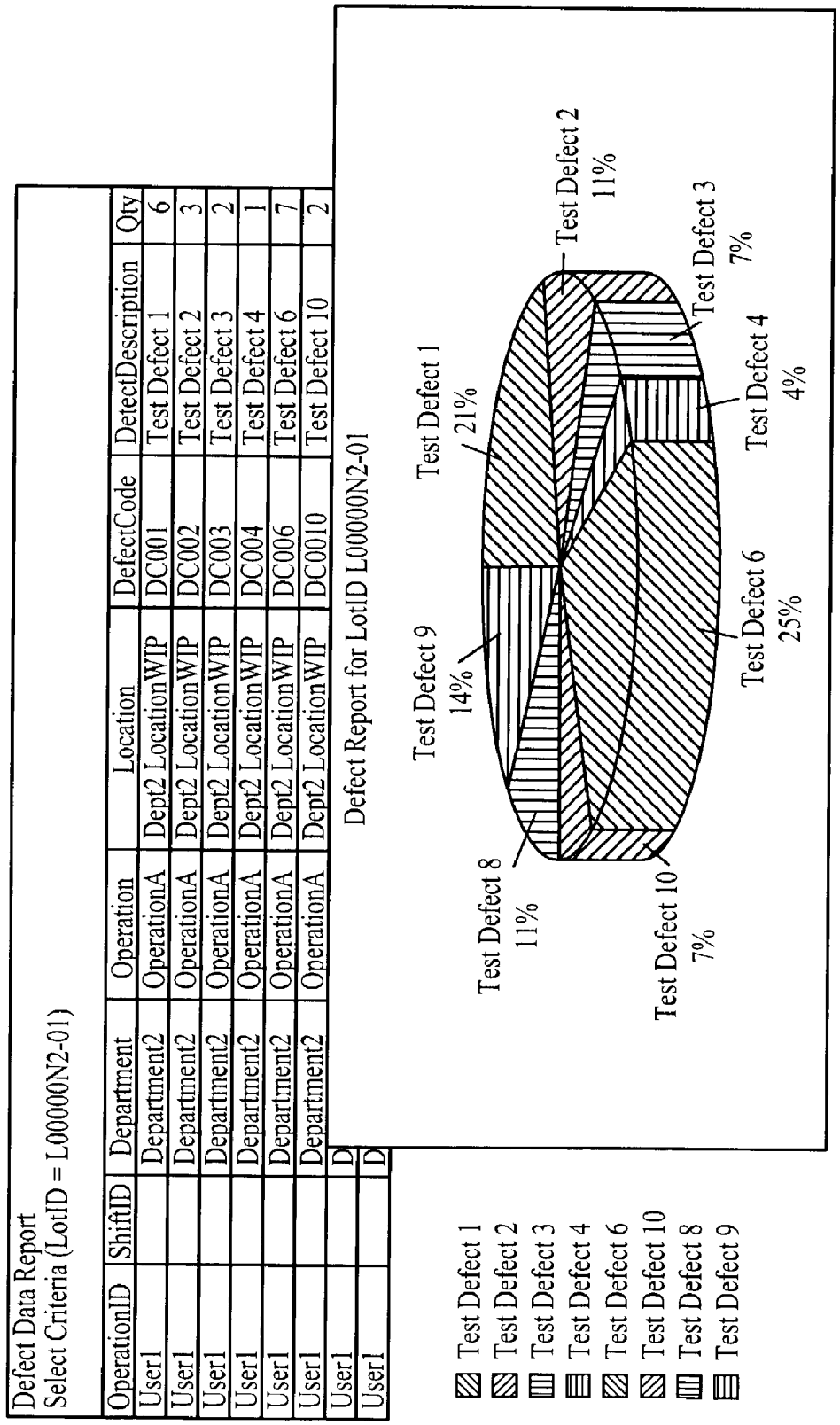
Figure 21:
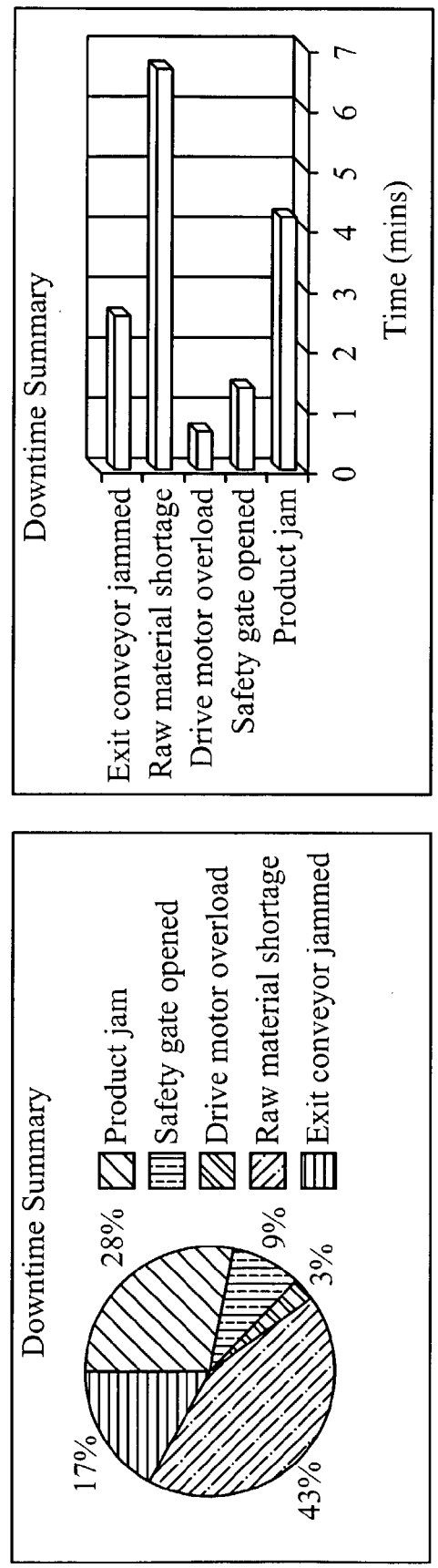

FIGS. 15A, 15B, 16 through 21 show the various reports generated by the Report Manager under Work In Progress (WIP) manager application template. This Report Manager can be utilized for various reports, including WIP Status Report, as shown in FIGS. 15A and 15B, Material Genealogy Report, as shown in FIG. 16, Route Genealogy Report, as shown in FIG. 17, Inventory Summary Report, as shown in FIG. 18, Work Order Status Report, as shown in FIG. 19, Defect Data Report, as shown in FIG. 20, and Downtime Report, as shown in FIG. 21. As discussed in previous FIGS. 9 and 10, a better work instruction will be generated based on previous performance analysis and reports when the Schedule module operates to generate instructions next time. The business decision making process is especially depending on the analysis and reports feedback to amend its master plan in the future.

If required, the Lot Create automatically creates WIP lots when production is reported at a particular work center. Lot Start/Complete provides the ability to Start and/or Complete a WIP entity at a given work center or a specific work operation. It also supports the ability to disposition WIP to scrap, rework, inventory, or next work center on route. The Lot Start/Complete further enforces data collection, material issue, and disposition requirements established for each work order. Containerization is used to provide the ability to assign WIP or Inventory items to a container in order to support bulk transaction processing.

Inventory Management Application Template

Figure 45:
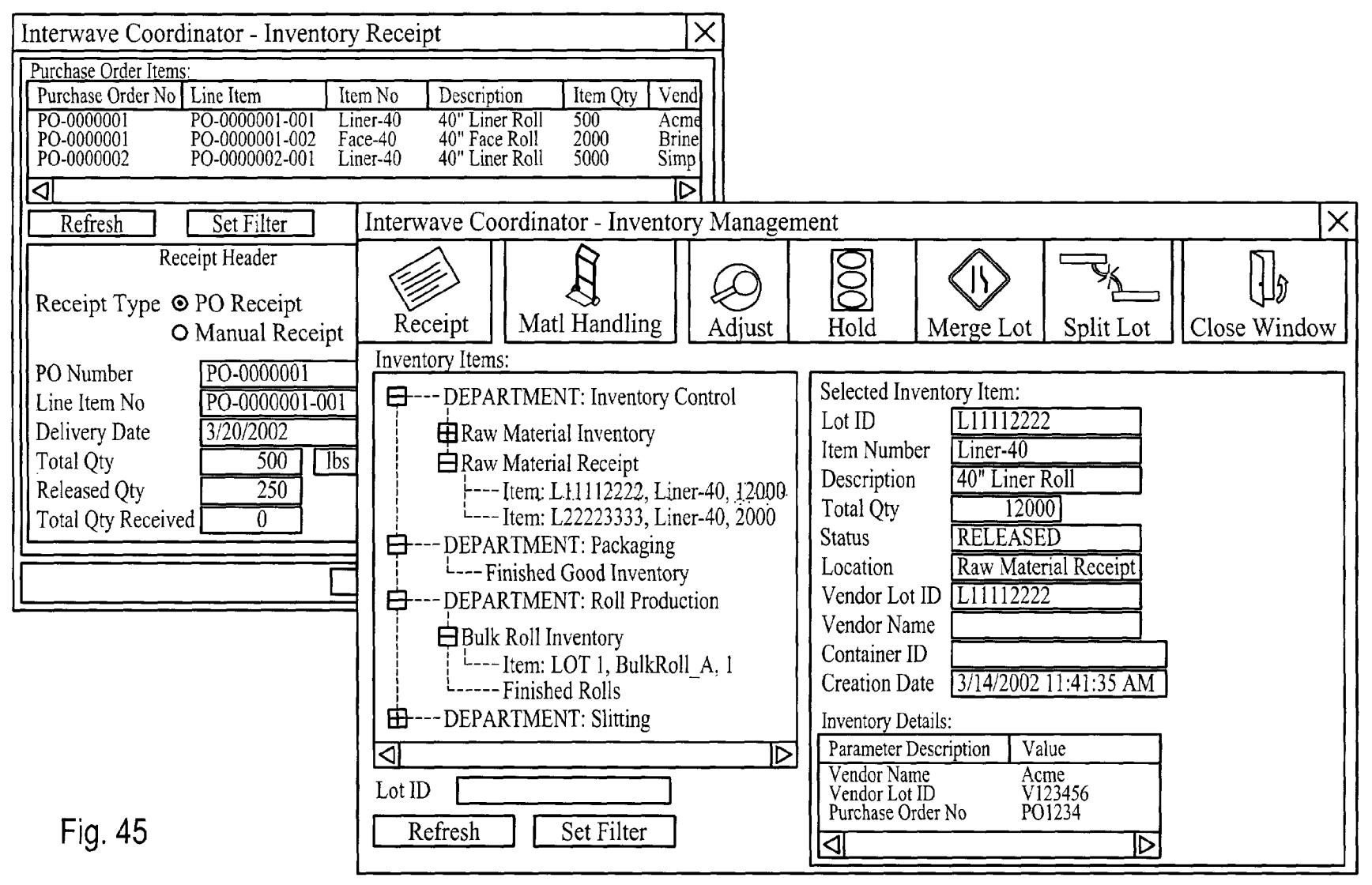

FIG. 45 demonstrates the Inventory Management application template Graphical User Interface (GUI). The Inventory Management application template supports Receiving and Inspection, Picklist Delivery, Lot Disposition/Move, Lot Split, Lot Merge, Material Re-grade, Quantity Adjustment, Tiered Storage, Containerization. In addition, the Inventory Management application template provides visibility to all items in inventory.

Receiving and Inspection provides the ability to receive and inspect incoming raw materials. Receiving and Inspection supports manual receipt or receipt against purchase orders. Picklist Delivery provides the ability to view picklists for a particular work order/work center and confirm delivery. Lot Disposition/Move provides the ability disposition/move inventory entities to different locations within the system. Lot Split provides the ability to split an inventory entity into multiple entities. The Lot Split further supports the ability to re-grade the split entity.

Lot Merge provides the ability to merge multiple inventory entities into a single entity. Material Re-grade provides the ability to re-grade an existing inventory entity to support material re-classification. Quantity Adjustment provides the ability to modify the quantity of an inventory entity to support cycle counting. Tiered Storage provides the ability to create a hierarchical inventory storage location scheme to support parent/child storage relationships. Containerization provides the ability to assign inventory items to a container to support bulk transaction processing.

Material Management Application Template

Figure 22:
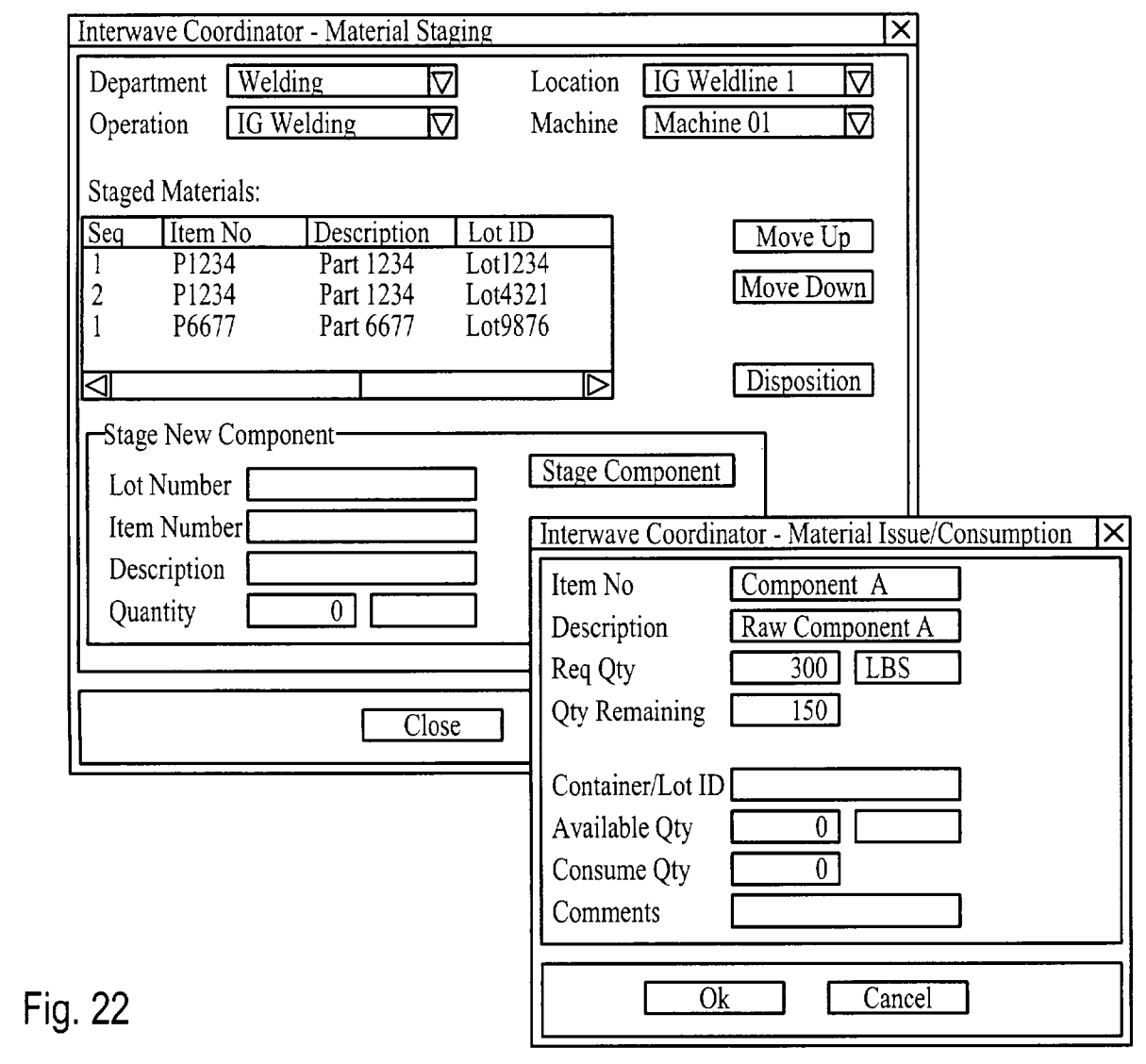

FIG. 22 demonstrates the Material Management application template Graphical User Interface (GUI). The Material Management application template supports Genealogy, BOM Enforcement, BOM Substitution, Material Staging, Automatic Consumption and Manual Consumption.

Genealogy provides full component genealogy and tracking by work center for each work order.

BOM Enforcement displays BOM requirements for a designated work center and work order. BOM Enforcement also provides validation to ensure that proper components are consumed to produce the finished good.

BOM Substitution provides the ability to define substitutes for standard items in the BOM. BOM Substitution also enforces substitute definition within the BOM Enforcement function.

Material Staging provides the ability to stage material at a given work center for automatic consumption.

Automatic Consumption provides the ability to automatically consume staged materials based upon the BOM established for a particular work order.

Manual Consumption provides the ability to manual consume material against BOM items established for a particular work order.

Tool Management Application Template

Figure 55:
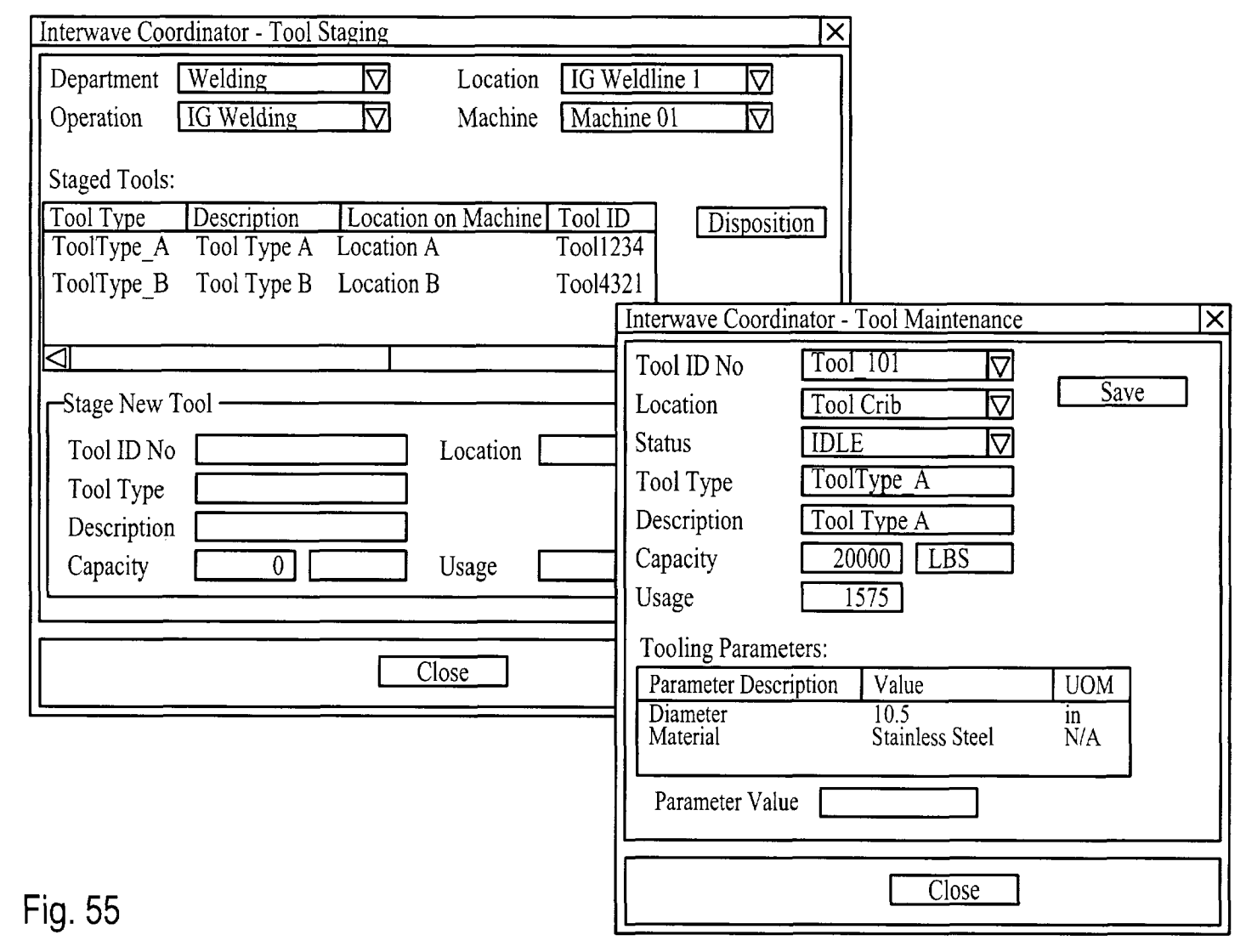

FIG. 55 demonstrates the Tool Management application template Graphical User Interface (GUI). The Tool Management application template supports Genealogy, Tool Enforcement, Tool Substitution, and Tool Maintenance.

Genealogy provides full tool genealogy and tracking by work center for each work order.

Tool Enforcement displays tooling requirements for a designated work center and work order. Tool Enforcement also provides validation to ensure that proper tools are utilized to produce the finished good.

Tool Substitution provides the ability to define substitutes for standard tooling. Tool Substitution enforces substitute definition within the Tool Enforcement function.

Tool Maintenance provides the ability to add new tools to the system, or modify the attributes of existing tools. Tool Maintenance also provides full inventory management and tracking capabilities.

Quality Management Application Template

Figure 50:
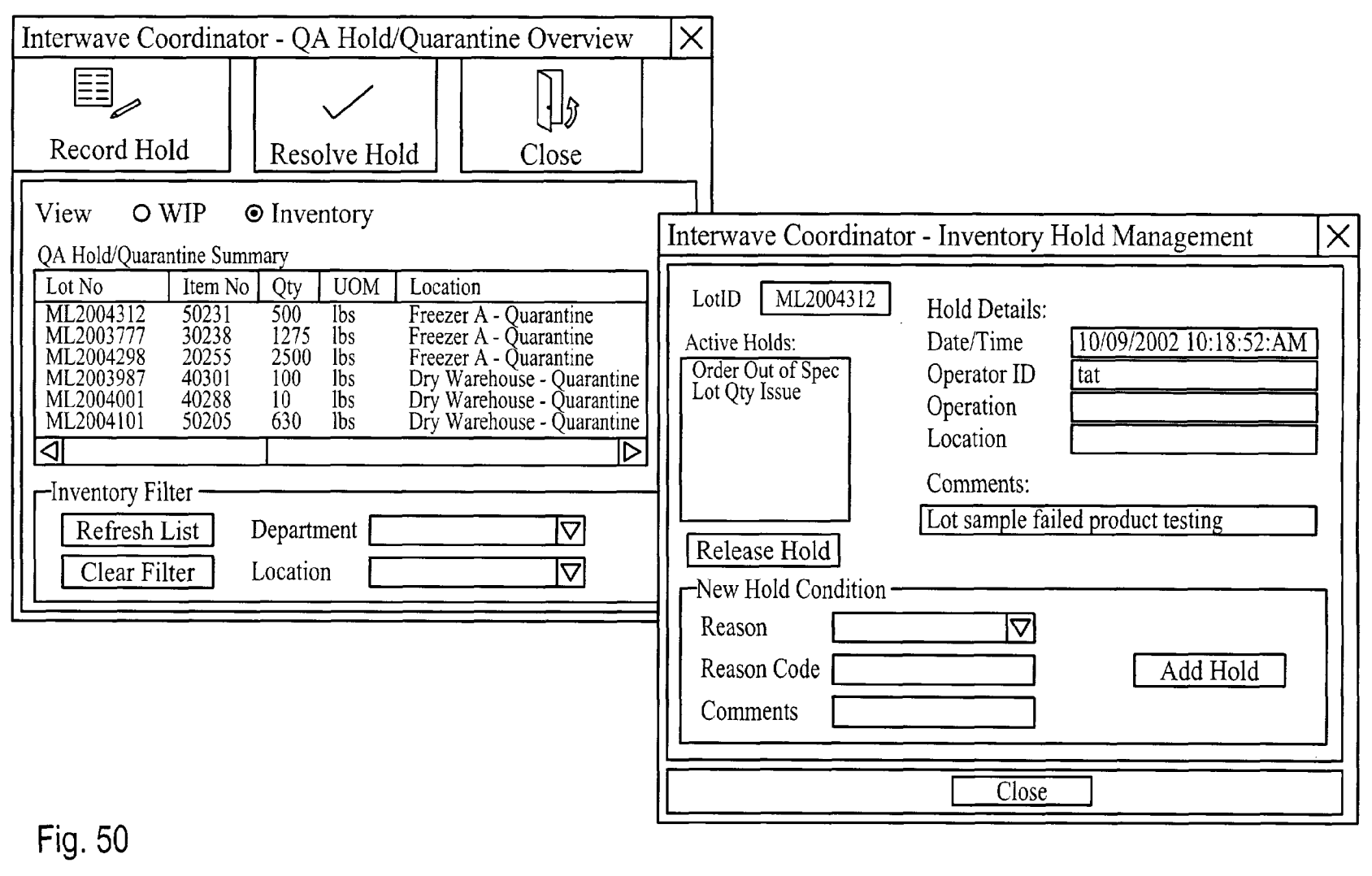

FIG. 50 demonstrates the Quality Management application template Graphical User Interface (GUI). The Quality Management application template supports Quality Hold, Hold Resolution, Quality Quarantine, and Quarantine Resolution.

Quality Hold provides the ability to issue one or more quality holds against a single WIP or Inventory entity and further implements quality holds by restricting transactional access to held entities. Hold Resolution provides the ability to resolve and release quality holds against a single WIP or Inventory entity. However, it requires selection of a resolution code from a configurable list.

Quality Quarantine provides the ability to issue one or more quarantines against a single WIP or Inventory entity, and further implements quarantines by restricting the ability to release a finished good to inventory. Quarantine Resolution provides the ability to resolve and release quarantine holds against a single WIP or Inventory entity. It also requires selection of resolution code from a configurable list.

Figure 23:
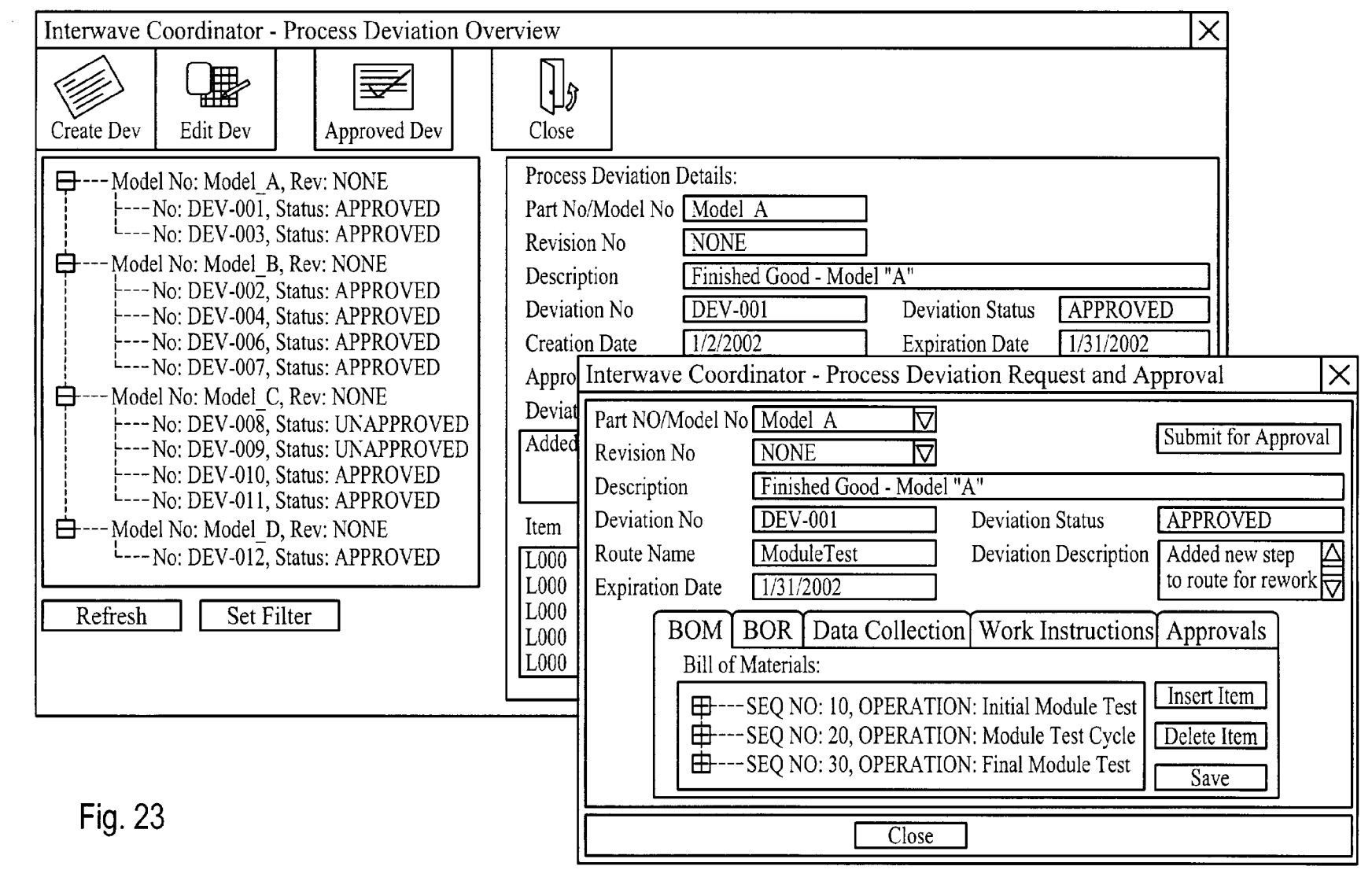

FIG. 23 demonstrates the GUIs that support Process Deviation function under Quality Manager application template. The Process Deviation module requests quality management and submits change requests for new or changed materials, products, procedures, processes, or methods to management. The Process Deviation module, once it has received instruction from the quality management, also initiates and manages the authorization process.

Quality Data Collection Application Template

FIG. 24 demonstrates the Quality Data Collection application template Graphical User Interface (GUI). The Quality Data Collection application template under Quality Manager implements data collection requirements defined for a particular work center, operation, and material. FIG. 24 shows the GUI access window of the Quality Data Collection Module user access window. This application template provides the ability to pre-populate data collection templates from OPC or XML source. Quality Data Collection application template also performs limits checks and applies quality holds when out-of-limits conditions are experienced. Furthermore, this application template allows data to be applied against a single entity (e.g., WIP or Inventory) or multiple entities (e.g., container with multiple WIP or Inventory entities).

Work Instructions and Electronic Notebook Application Template

Figure 25:
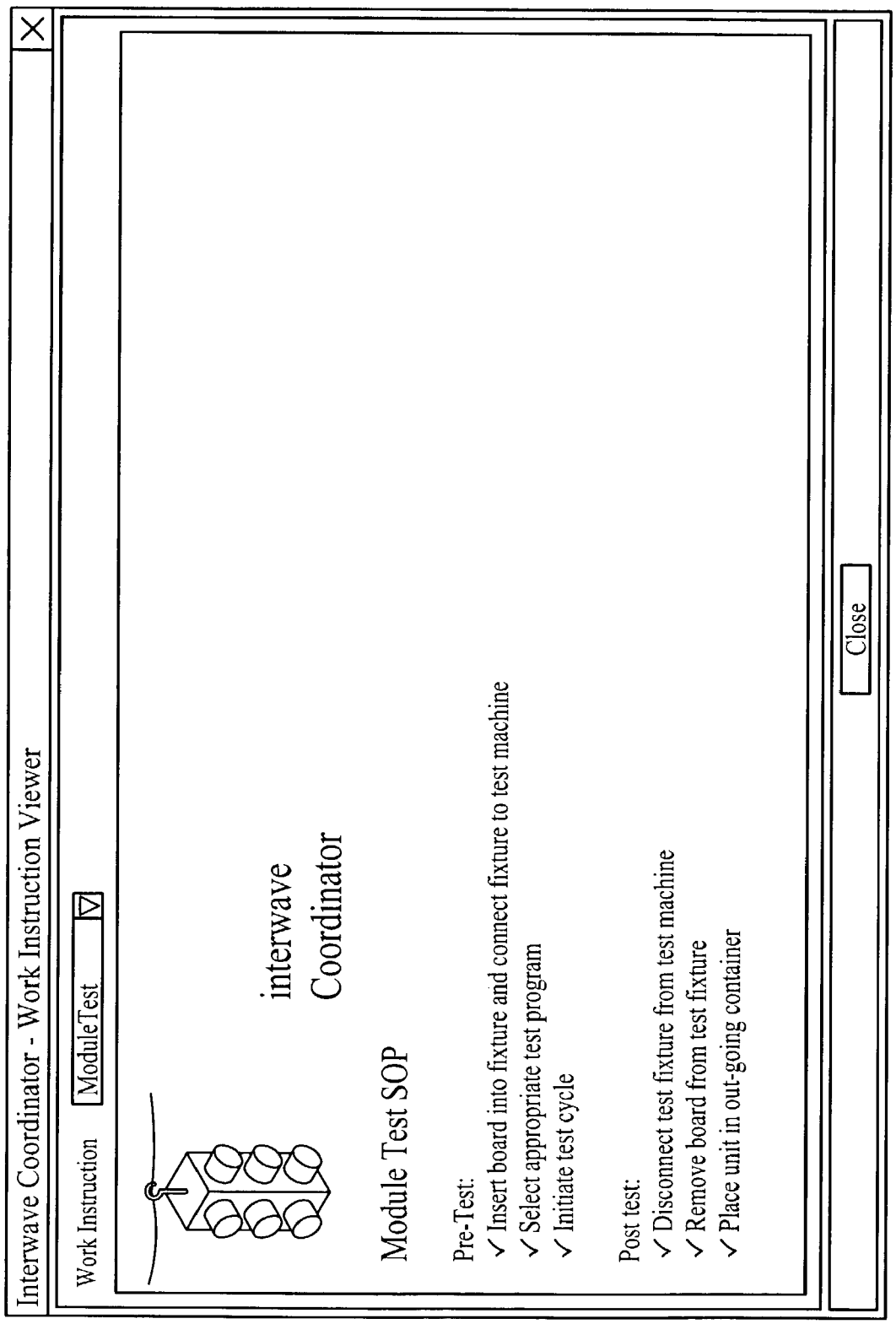
FIG. 25 is an illustration of the GUT for the Work Instructions application template.

FIG. 25 demonstrates the Work Instruction application template Graphical User Interface (GUI). The Work Instruction application template provides the ability to manually assign work instructions to work orders and/or work centers and operations. The Work Instruction Viewer provides a drop-down selection of work instruction for user to pick a particular instruction to review. Furthermore, it supports receipt of work instructions from ERP, and a means to access and display documents contained within $3^{rd}$ party Enterprise Document Management System (EDMS) systems.

Electronic Notebook Application Template

Figure 54:
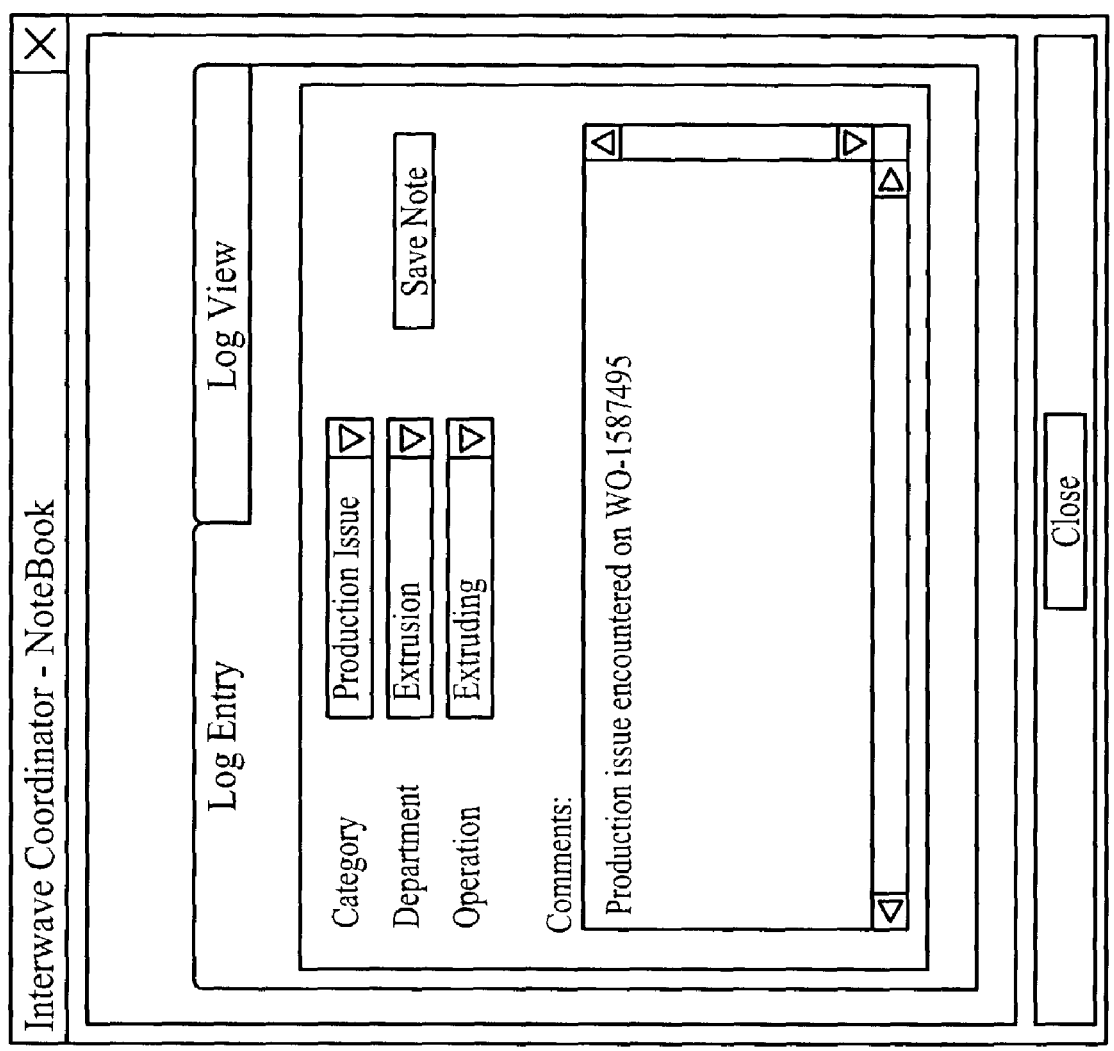
FIG. 54 is an illustration of the GUI that supports Electronic Notebook application template.

FIG. 54 demonstrates the Electronic Notebook application template Graphical User Interface (GUI). The Electronic Notebook application template provides the ability to capture and display log notes electronically. Particularly, data can be captured against pre-configured categories such as machines issues, material issues, productions issues, and shift changes, etc.

Material Review Board Application Template

The Material Review Board (MRB) application template under Quality Manager supports the features of MRB Submission and MRB Management. MRB Submission provides the ability to submit and subject semi-finished or finished goods to an evaluation prior to being processed or shipped to customers. The MRB Management provides the ability to manage the evaluation, disposition, and documentation processes associated with nonconforming or discrepant materials.

Defect or Waste Tracker Application Template

FIG. 26 demonstrates the Defect Tracker application template Graphical User Interface (GUI). The Defect Tracker application template or the Waste Tracker application template supports the defect tracker features of Defect Recording and Defect Resolution. Defect Recording provides the ability to manually capture defects against a WIP or Inventory entity. It supports automatic recording of defects from automated test equipment while Defect Resolution provides the ability to resolve defects against a single WIP or Inventory entity. The resolution transaction requires selection of resolution code from a configurable list, as shown in FIG. 26, a two-tier window used as an access of Defect or Waste Tracker application template.

Downtime Tracker Application Template

FIG. 27 demonstrates the Downtime Tracker application template supports Downtime Recording and Downtime Resolution. Downtime Recording provides the ability to manually capture downtime events against an asset. It supports automatic recording of downtime events from automated machinery or assets. Downtime Resolution, on the other hand, provides the ability to resolve downtime events against an asset, and requires selection of resolution code from a configurable list.

Specification Management Application Template

Figure 56:
FIG. 56 is an illustration of the GUIs that support Specification Management application template.

FIG. 56 demonstrates the Specification Management application template Graphical User Interface (GUI). The Specification Management application template supports Specification Definition, Specification Display and Parameter Download. Specification Definition provides the ability to define one or more specifications for a given material/item at a given work center. Specification Display provides visibility to specification parameters for a given work order at execution time. Parameter Download provides the ability to download specification data to an OPC server.

Shipping Application Template

FIG. 46 demonstrates the Shipping application template Graphical User Interface (GUI). The Shipping application template under Depot Manager supports the shipping features of Reservation, Data Collection, and Order Shipment. Reservation provides the ability to reserve product against a particular work order and/or customer order for shipment. Data Collection is designed to capture data against the shipped entities. Order Shipment is then utilized to support the ability to ship one or more Inventory entities against a customer order.

Return Merchandise Authorization Application Template

The Return Merchandise Authorization application template supports Product Return, Product Repair, and Product Shipment. Product Return receives a returned product into the system for repair. It also provides the ability to document the symptoms and problems of the returned product, then determining the disposition of the product as either repair or scrap. Product Repair supports the ability to initiate the repair process and document the repair procedures via pre-configured repair codes. Product Repair can recommend repair procedures based upon repair history. Finally, Product shipment provides the ability to ship the repaired product after all the symptom and repair procedures are well documented.

Figures 28A, 28B:
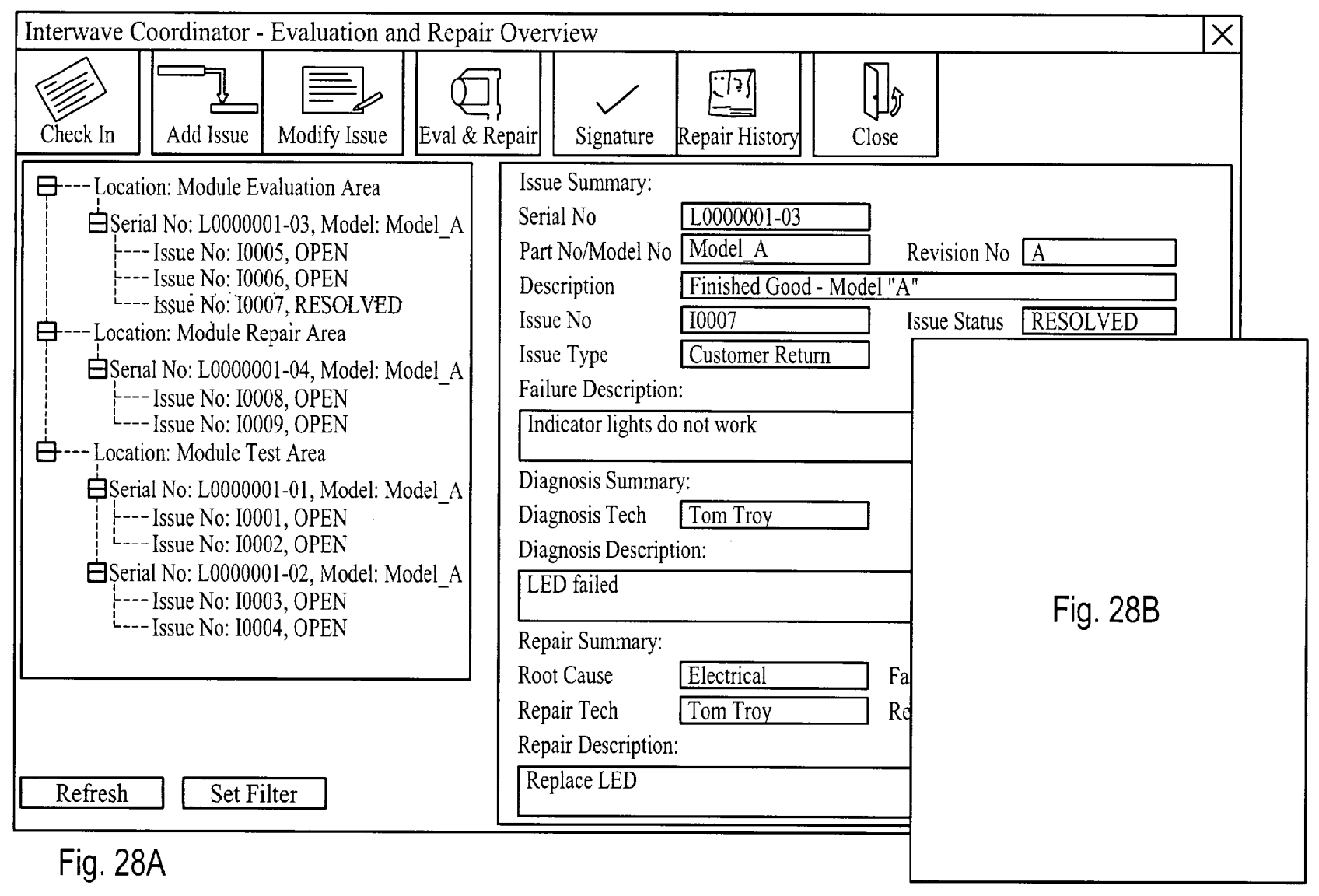

FIGS. 28A and 28B demonstrate the GUIs that support the Repair function under the Return Merchandise Authorization application template. The Repair handles product return, repair, and shipment. It receives returned product to the system for repair and documents symptoms, problems, and repair procedures via pre-configured repair codes. The Repair is able to initiate the repair process and the disposition of the product to repair or scrap. It also recommends repair procedures based upon repair history and, afterwards, ships out the repaired product.

Engineering Change Order Application Template

The Engineering Change Order (ECO) application template supports the features of Engineering Change Requests (ECR) and ECO Management. At first, ECR submits Engineering Change Requests that may suggest or recommend the possible use of new or changed materials, products, procedures, processes, or methods. Subsequently, ECO provides the ability to initiate and manage the authorization process centered around the use of new or changed materials, products, procedures, processes, or methods within a manufacturing organization.

Support Applications

The Interwave Coordinator CMES application includes support applications to further support its collaborative infrastructure. They are Lab Manager and Shop Scheduler.

Lab Manager Support Application

Lab Manager provides basic Laboratory Information Management System (LIMS) functions to assist engineers and technicians with managing lab data in a manufacturing environment. Lab Manager is a highly configurable LIMS application that supports Sample Management, Lab Test Data Collection, Lab Test Template Maintenance and Lab Instrumentation Management.

Figure 29:
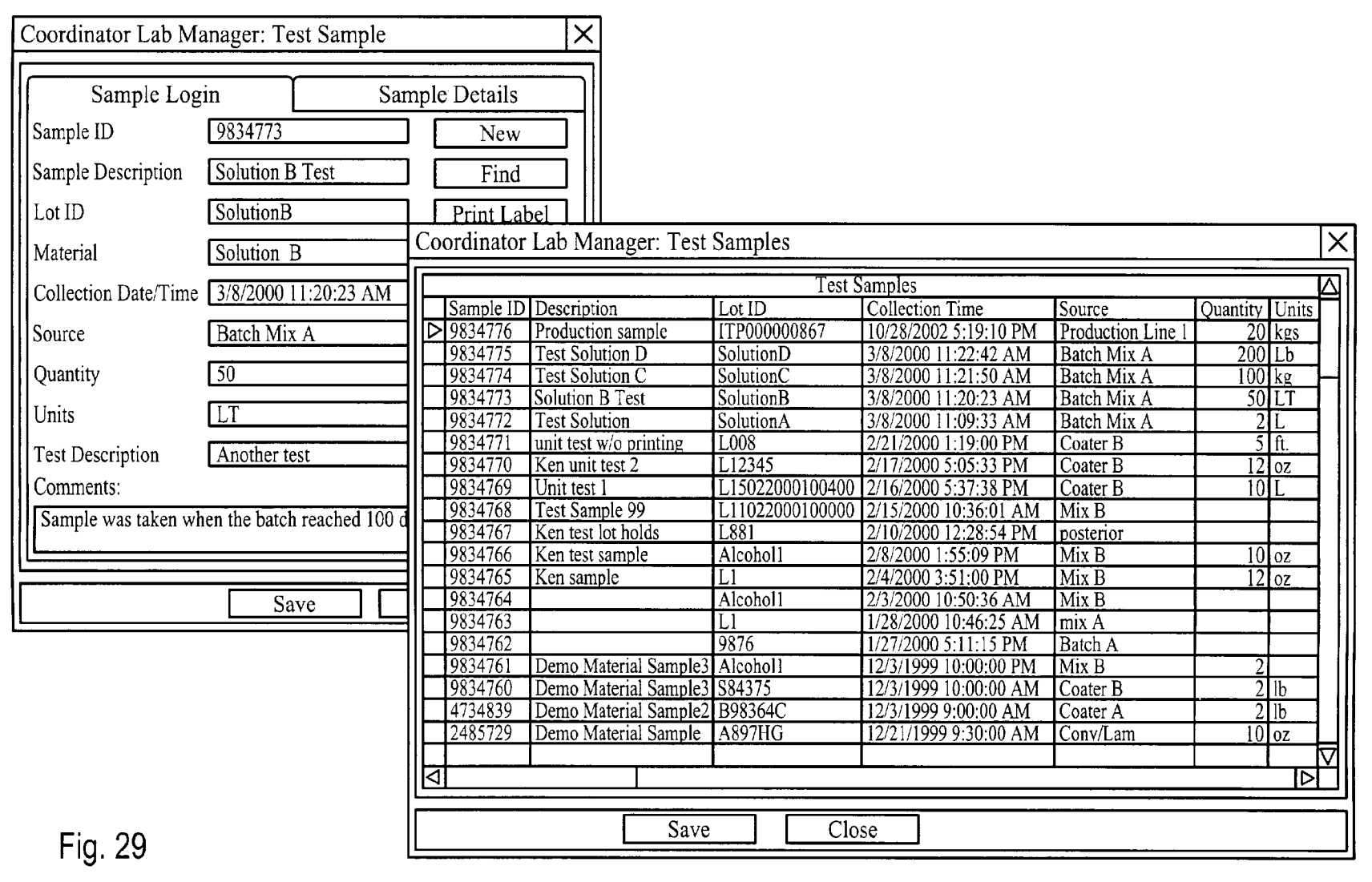

The Sample Management function provides automatic (CSV file) and manual sample logging. The manual logging manually logs in samples via a configurable template, as shown in FIG. 29. The configurable template offers multiple or single sample login process and prints out sample ID labels. It also provides visibility to samples and associated test and result data. Furthermore, it provides comprehensive audit trail and enforces a configurable electronic signature scheme, such as Performed By and Verified By.

Figure 30:
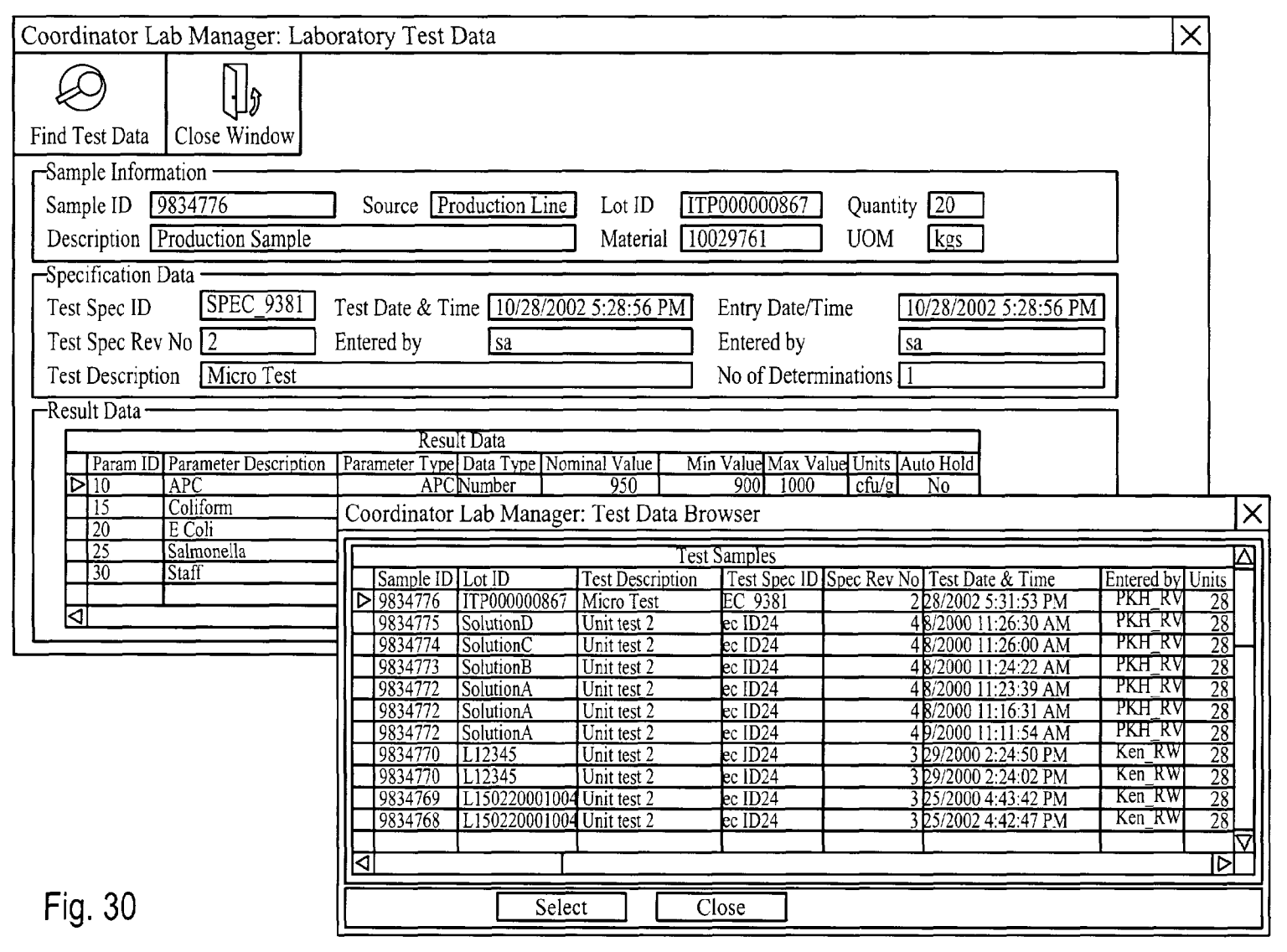

FIG. 30 shows the GUI that supports Lab Test Data Collection activities. The Lab Test Data Collection function can be easily performed manually or automatically, and displays result entry schemes through a GUI window. A browser can also be activated to allow easy review of the collected lab test data.

The Lab Test Data Collection function supports result entry against a group of samples to reduce data entry and partial result entry. It can also enforce automatic holds when specification limits have been exceeded. Repetitive entry schemes are also supported to enhance data entry capabilities. Lab Test Data Collection allows displays of specification limits and supports many types of results, such as textual, list select, or file.

Figure 31:
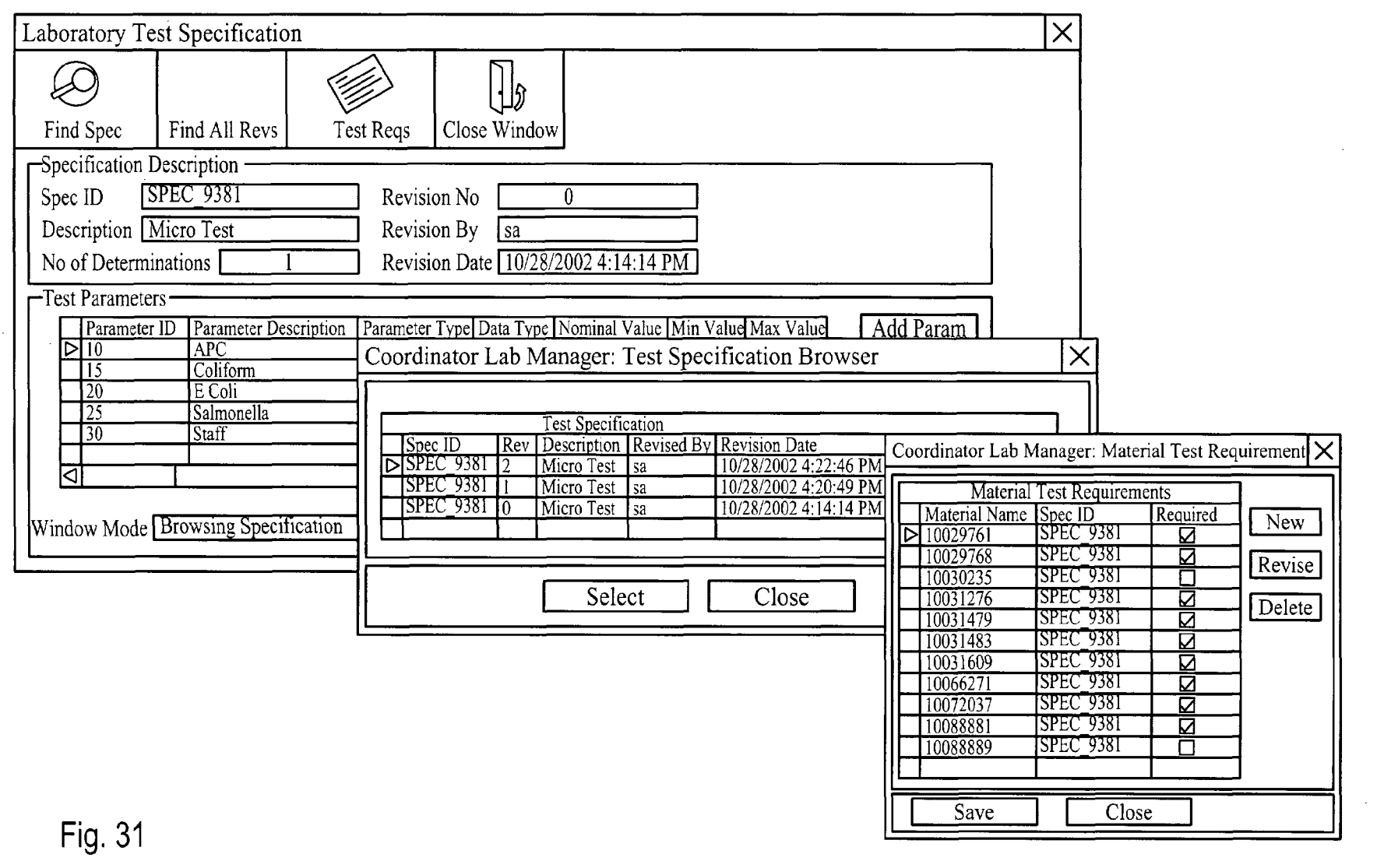

The Lab Test Template Maintenance function supports the ability to configure lab test templates on an item or item class basis, as shown in FIG. 31. It supports template versioning and enables modification of existing templates or browsing of previous revisions. Lab Test Template Maintenance further tracks changes to templates and enforces electronic signatures. Specification limits can defined on a per parameter basis with auto hold capability.

Figure 32:
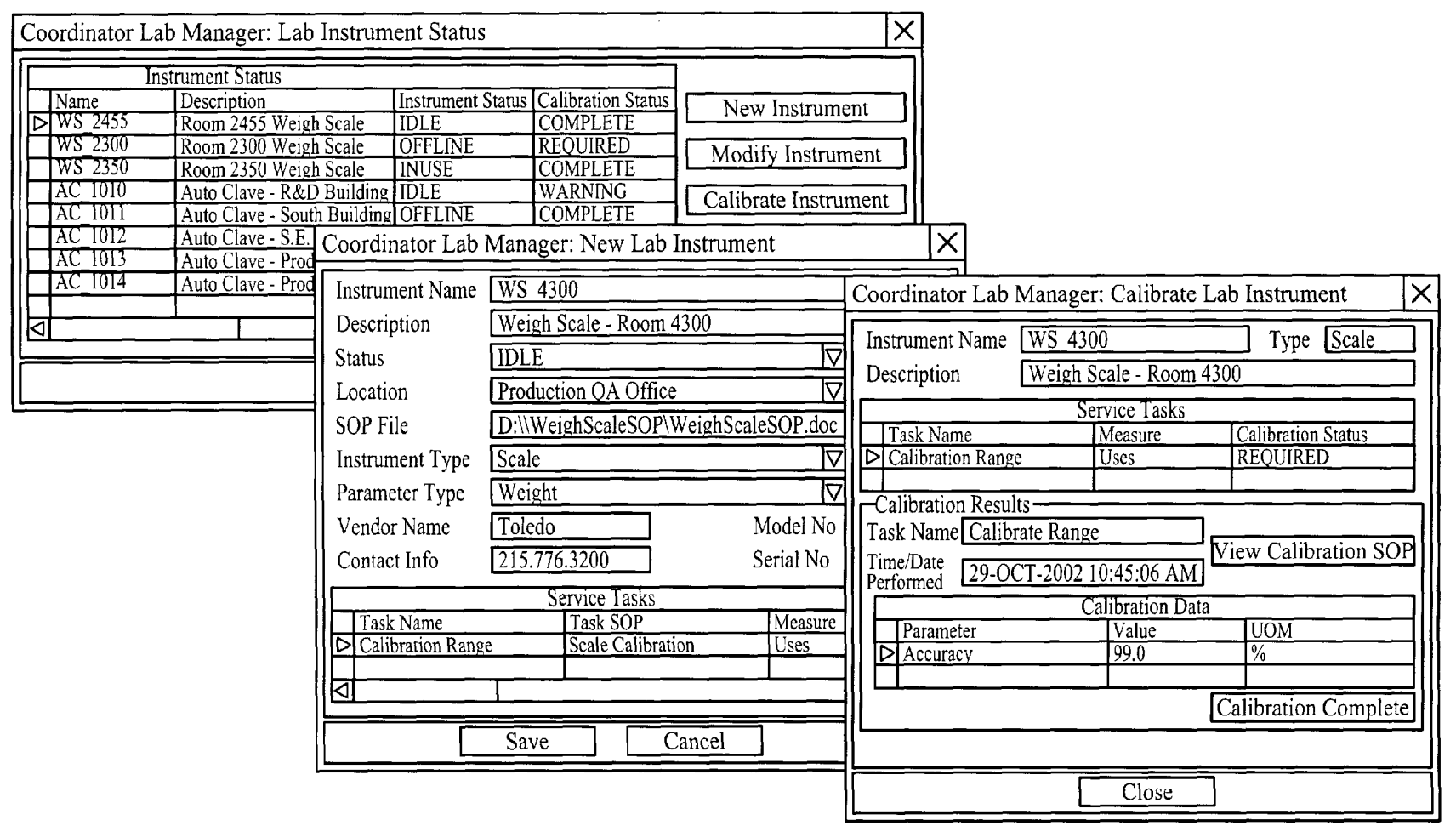

FIG. 32 shows the access windows of the Lab Instrumentation Management function within the Lab Manager support application. The Lab Instrumentation Management function provides the ability to easily define lab instruments and associated calibration schedules. Lab Instrumentation Management supports two types of calibrations, i.e., the "time" based calibration intervals and "use" based calibration intervals, and defines one or more calibration tasks for a particular instrument. Lab Instrumentation Management issues warnings whenever an instrument requires calibration or service. Finally, the Lab Instrumentation Management function records calibration results that are configurable for each instrument type and provides a comprehensive audit trail and electronic signature.

Shop Scheduler Application Template

Figure 33:
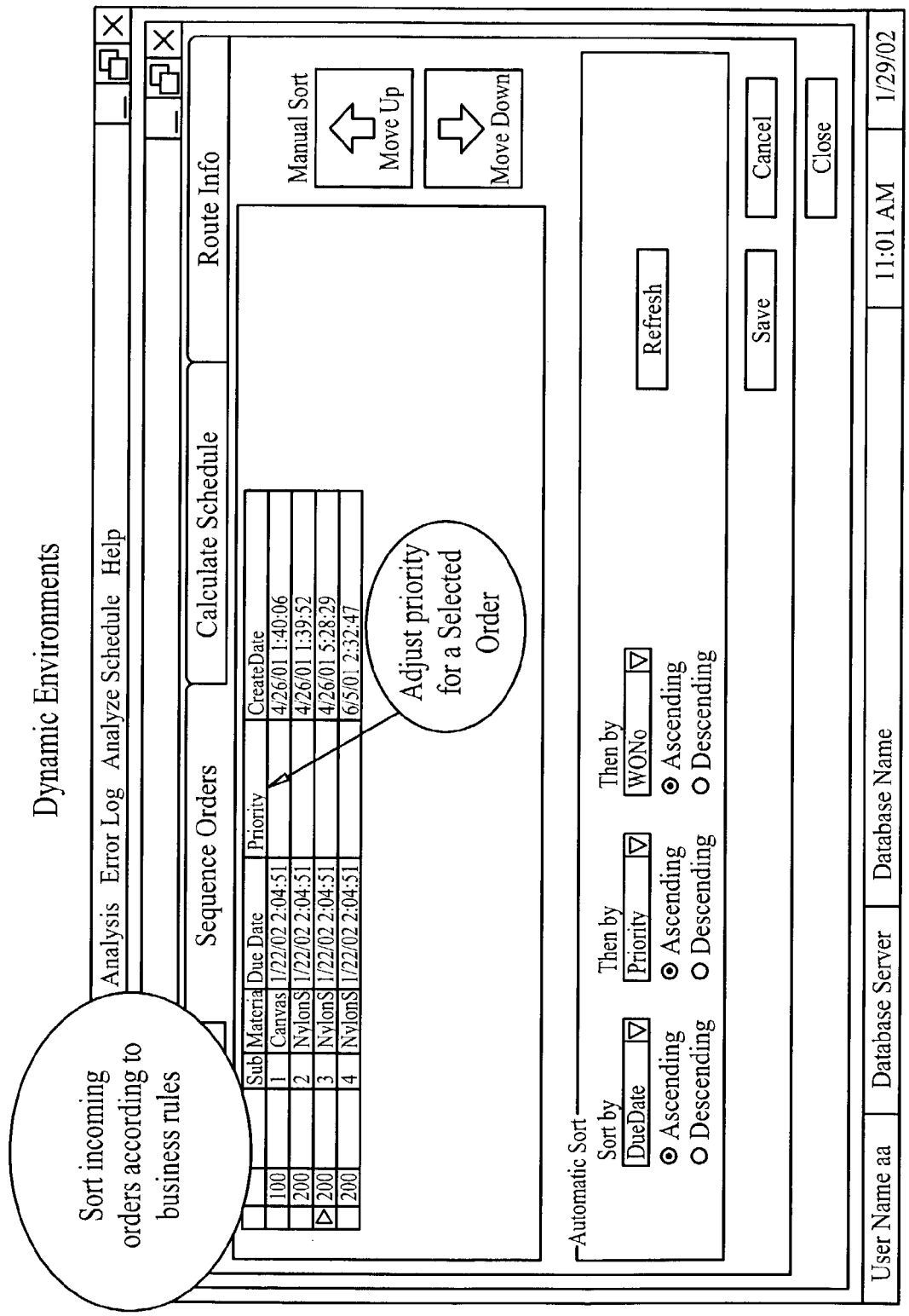
FIG. 33 is an illustration of the Dynamic Environments framework under which the Shop Scheduler support application is utilized.

The Shop Scheduler support application is ideal for finite capacity scheduling, which optimizes the efficiency of manufacturing resources, in dynamic environments. The dynamic environments, as shown in FIG. 33, are environments that focus focuses on fulfilling established work priorities, such as due date, etc. The application pro-actively schedules items in a changing environment, rather than optimizing a stable environment. Shop Scheduler supports the ability to rebuild a production schedule around changing orders, priorities, inventory, or resource availability.

Figure 34:
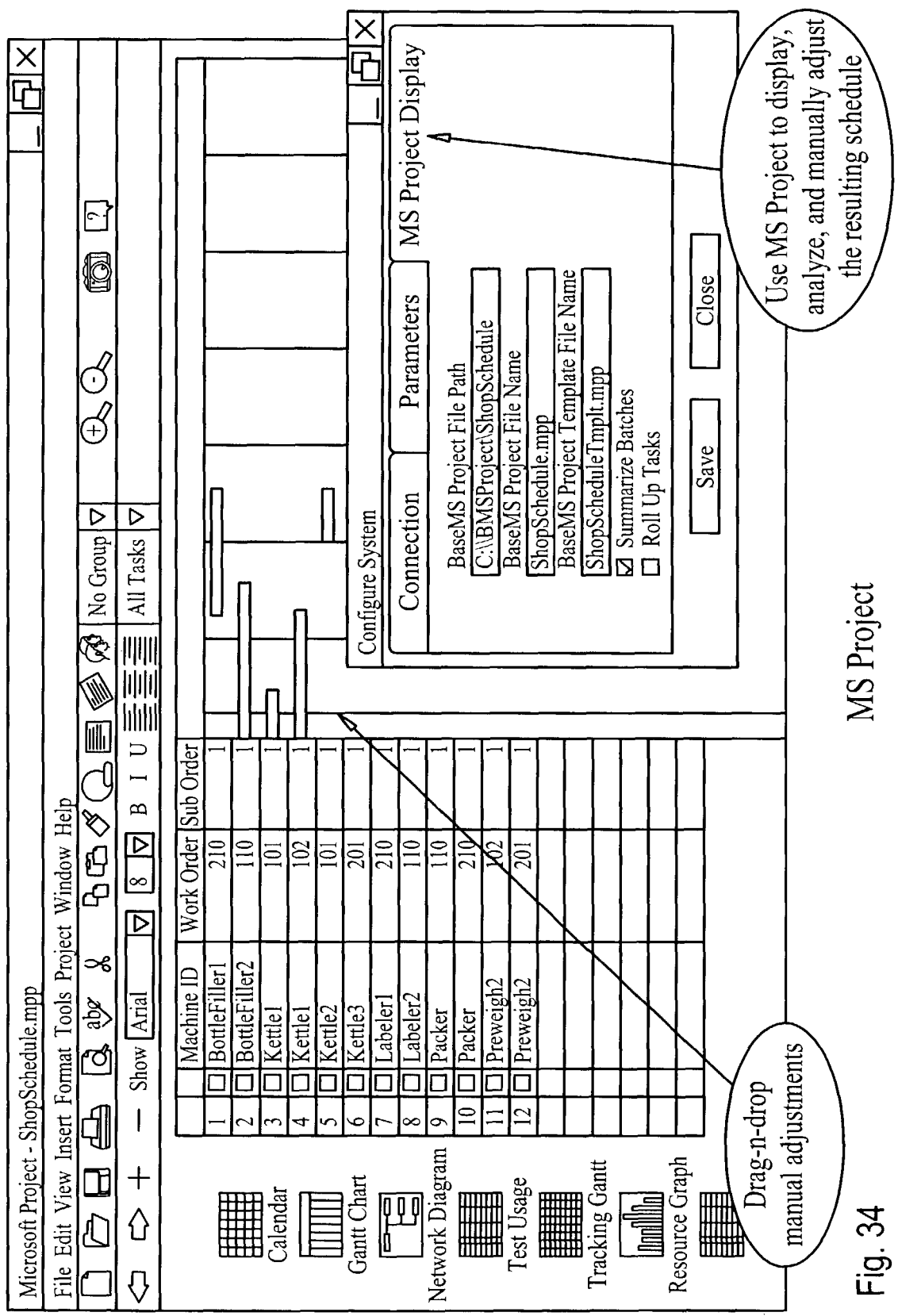
FIG. 34 is an illustration of MS Project that enables adjustment of result schedule under the Shop Scheduler application template.

The Shop Scheduler leverages the planning and scheduling capability native to Microsoft® Project, which is shown in FIG. 34. Microsoft® Project can be used to display, analyze, and manually adjust the resulting schedule. For example, the calculated schedule is displayed in MS Project, including dependencies and summarization of tasks. The Microsoft® Project displays can be manually adjusted by using the dragn-drop features. Furthermore, the Shop Scheduler is featured with an auto update function that automatically updates Shop Scheduler with the changes made within Microsoft® Project.

The Shop Scheduler is aimed to provide Finite Capacity Scheduling functions to assist manufacturers in coordinating manufacturing activities on the shop floor and generating realistic production sequences. Moreover, it enables the users to visualize the effects of schedule changes and significantly improves accuracy and timeliness of production schedule in dynamic production environment.

Furthermore, the Shop Scheduler enables enterprises to improve their ability to react to business changes rapidly. Shop Scheduler provides the feature of real-time scheduling that quickly updates schedules as changes occur on the factory floor. The visualization feature enables accurate available-to-promise delivery for customer service, and end users get to the visualize impact of, for example, inserting a "hot" order on the schedule before dispatching.

Figure 35:
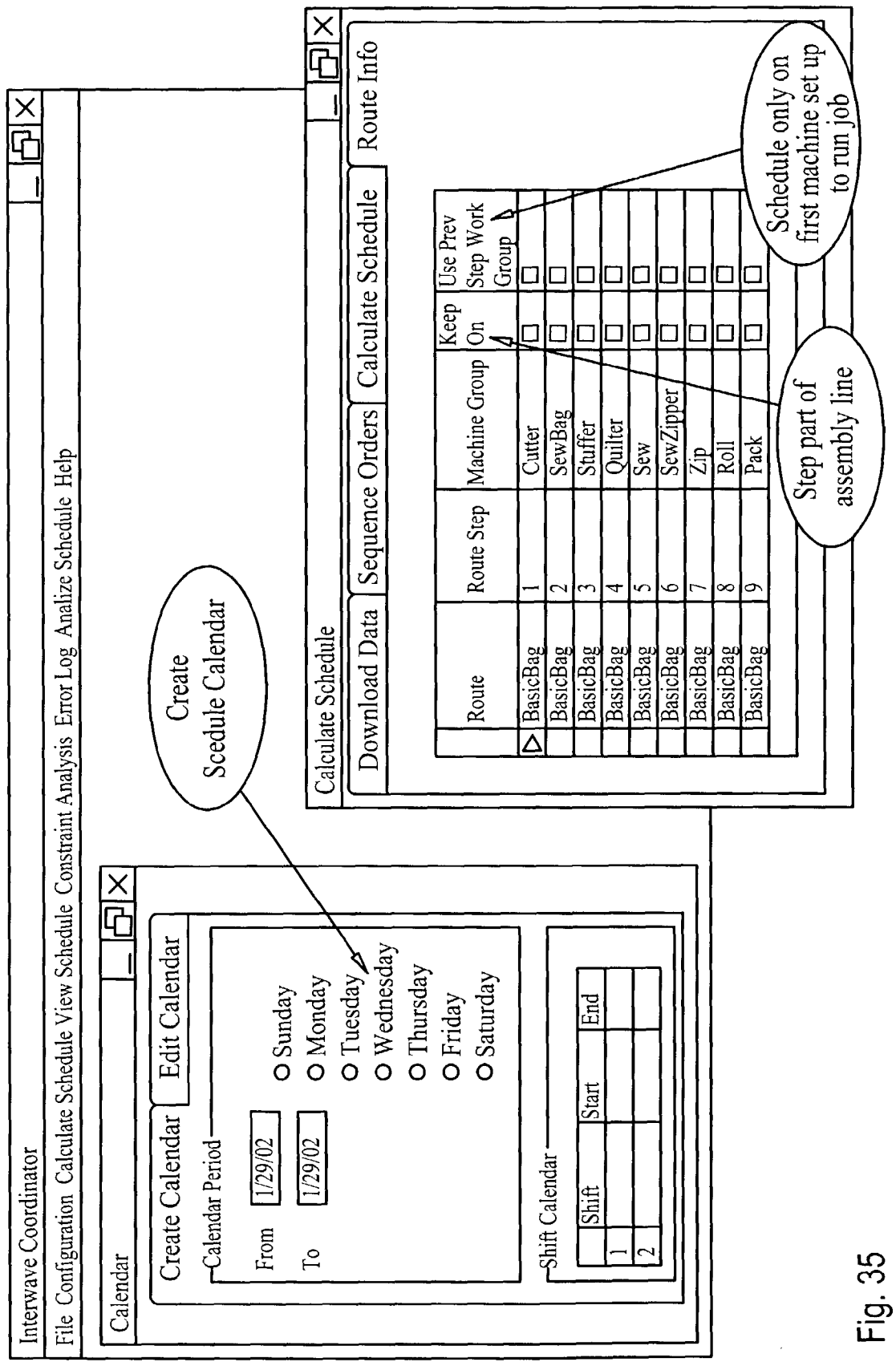
FIG. 35 is an illustration of a GUI for the Shop Scheduler support application.

In FIG. 35, a flexible and easy way to use the Shop Scheduler is demonstrated by two GUI panels. One panel shows an intuitive user interface that does not require complex synchronization, scripts or functions to create a Schedule Calendar. The second panel shows user-defined prioritization rules in scheduling a particular machine for a job. Besides machines and assembly lines, tools and inventory can be addressed by Shop Schedule. With respect to tool configuration, whether to utilize the tools, and whether to assign a machine, or what assignment to which machine need to be scheduled. With respect to inventory configuration, whether to use inventory, and whether to delay start based on inventory or even the availability dependency all need to be scheduled. The scheduling granularity can be work orders, batches, individual items, or mixed granularity.

Figure 36:
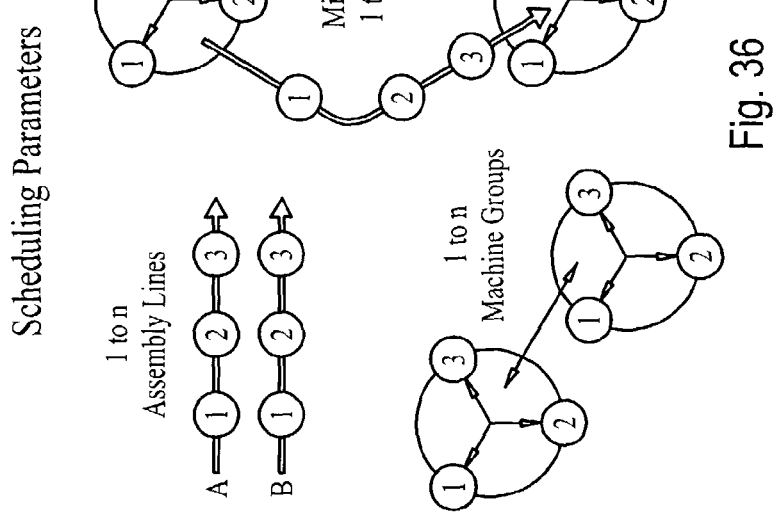
FIG. 36 is a diagram showing the assembly lines parameters and machine groups parameters for scheduling.

FIG. 36 illustrates the scheduling parameters that are addressed by the Shop Scheduler. There can be up to n assembly lines and n machine groups available to the Shop Scheduler for scheduling work orders. Furthermore, the Shop Scheduler can address n number of dependencies between machine groups and assembly lines.

The Shop Scheduler functions as a pure scheduling engine and retrieves required input constraint information from external systems to eliminate the need of maintaining redundant data within the application. The data import and export routines are customizable to support a variety of external system interfaces.

Figure 37:
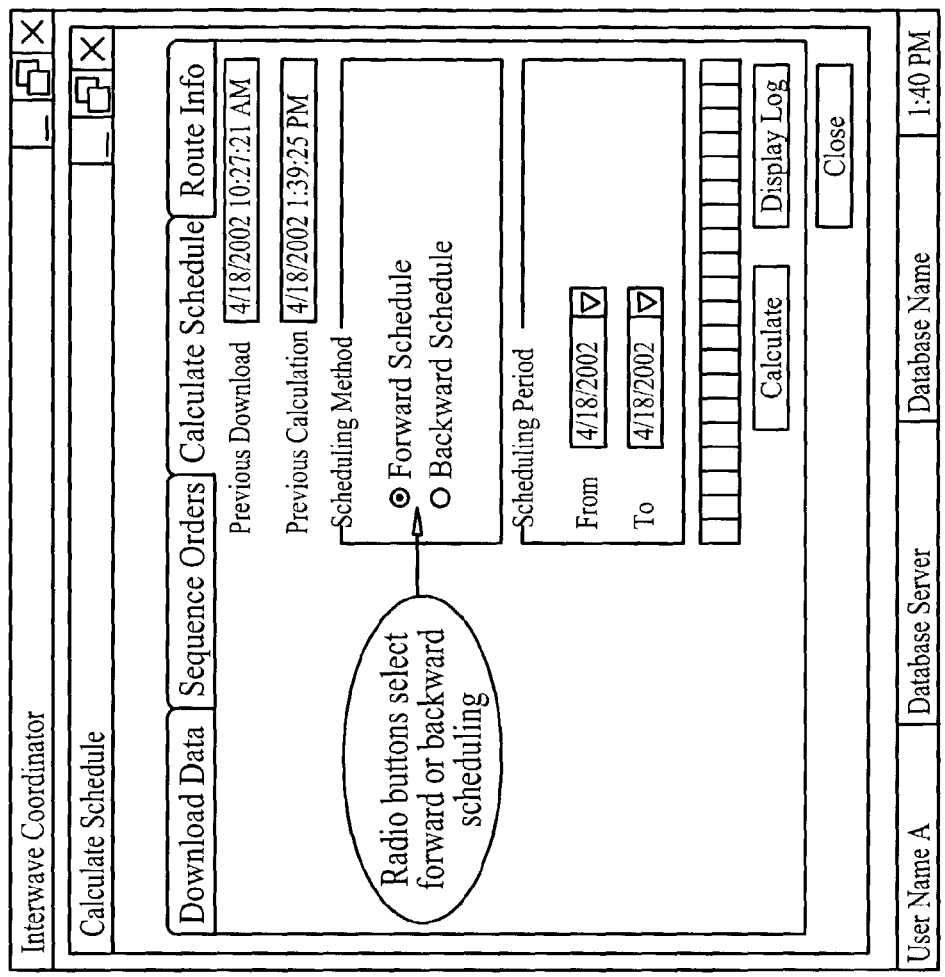
FIG. 37 is an illustration of a Scheduling Engine of Shop Scheduler support application.

The scheduling engine of Shop Scheduler is illustrated in FIG. 37. As shown in FIG. 36, the scheduling engine has many user friendly GUI features for easy access, such as drop-down menu and radio buttons. The radio buttons selection facilitates forward or backward job-step scheduling and drop-down menu specifies the schedule period. It can also coordinate dependant orders by using existing or planned inventory, and incorporate changeover times and yield constraints as well.

Figure 38:
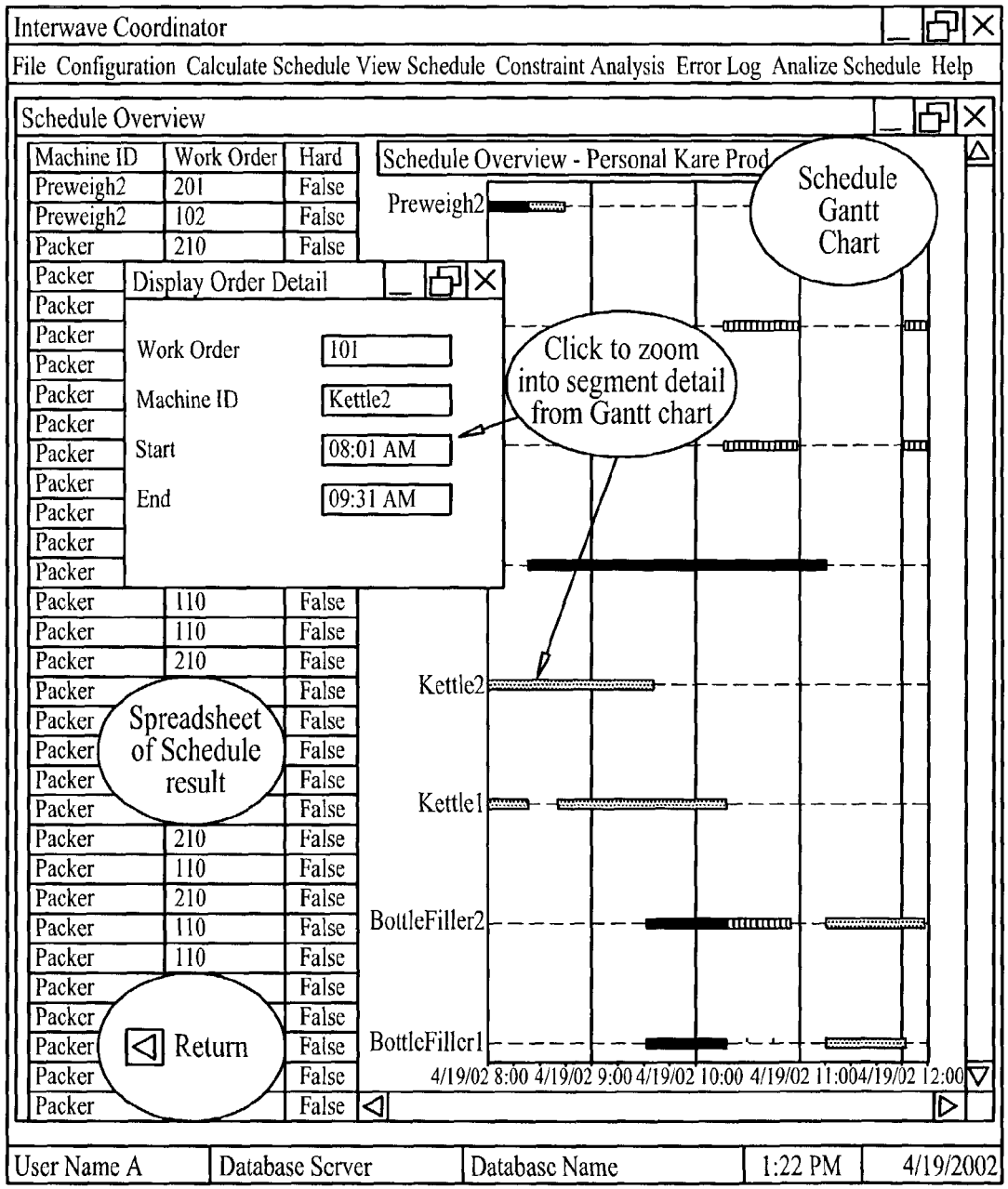
FIG. 38 is an illustration of a Schedule GANTT Chart report.
Figure 39:
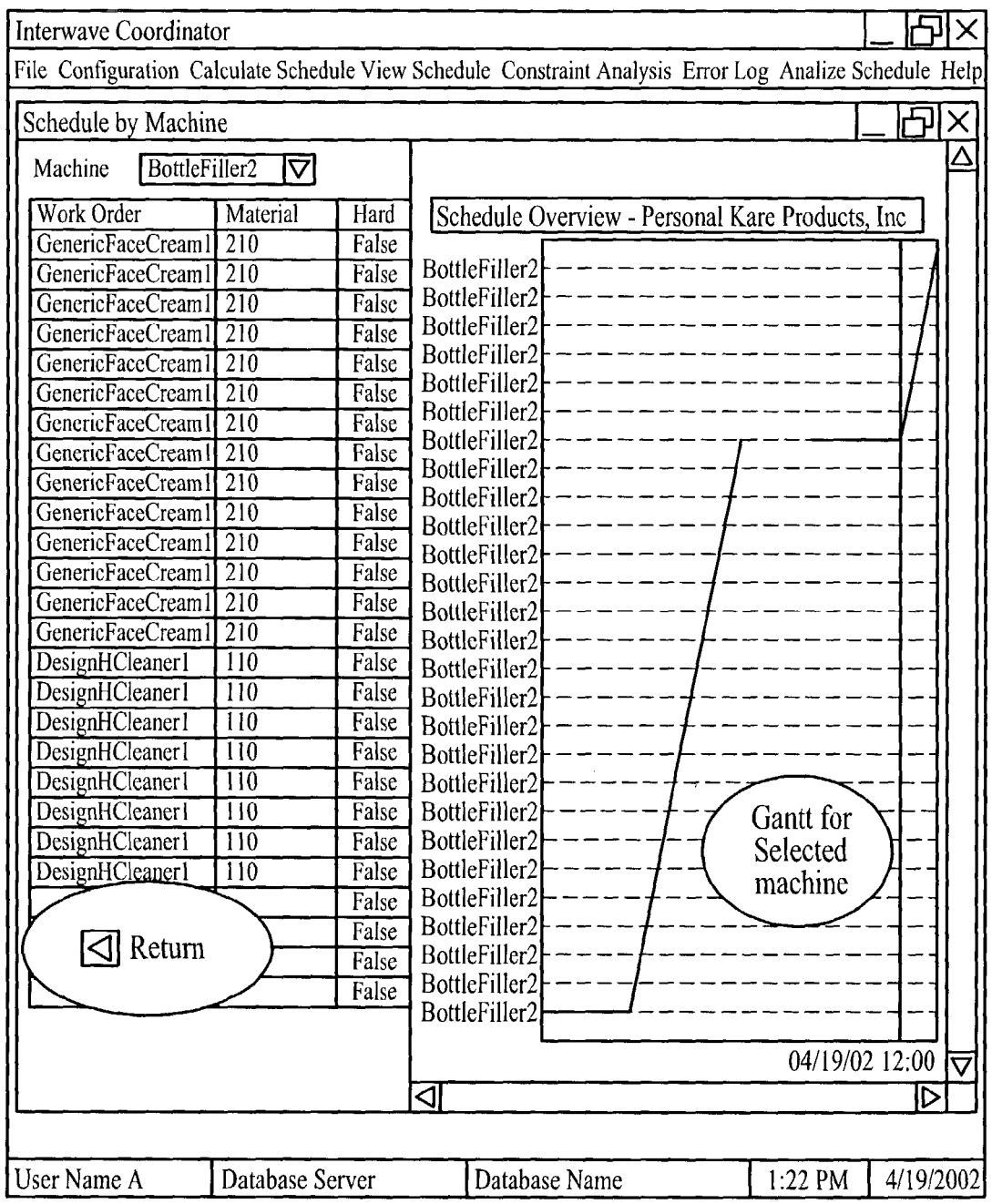
FIG. 39 is an illustration of a GANTT report for a selected machine.
Figure 40:
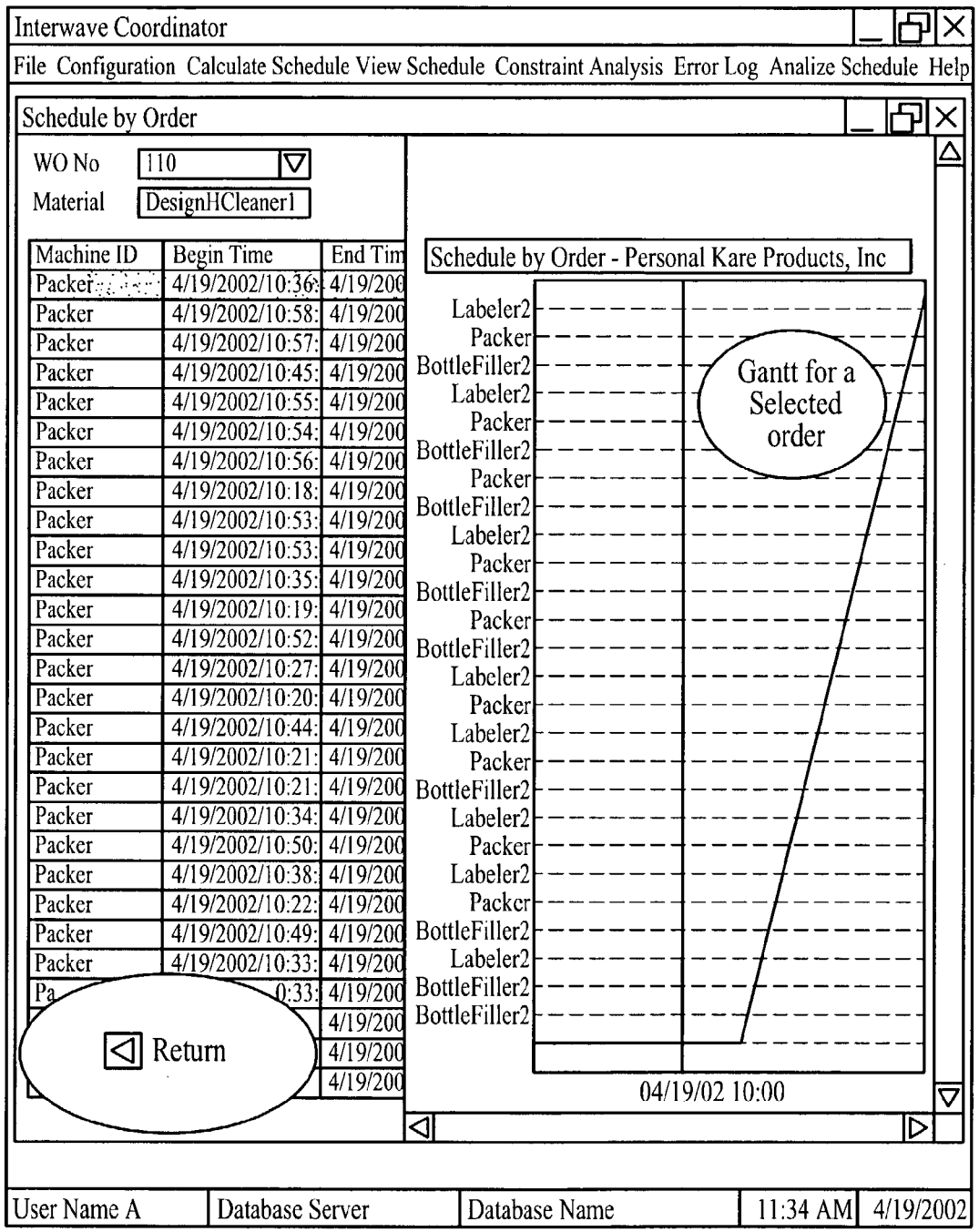
FIG. 40 is an illustration of a GANTT report for a selected work order.
Figure 41:
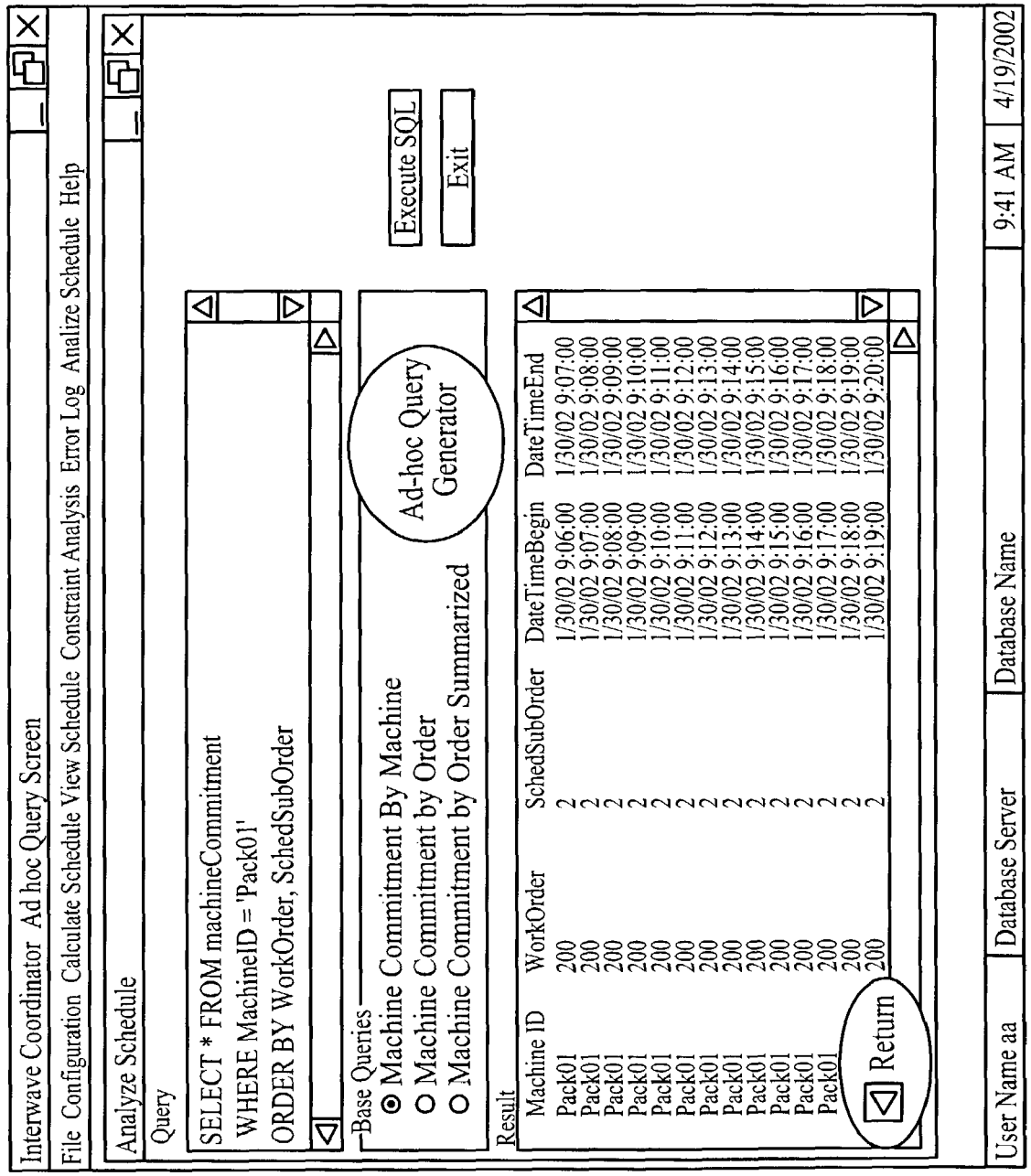
FIG. 41 is an illustration of an ad-hoc Query Generator.

Shop Scheduler also includes many standard or custom displays and report capabilities, as shown in FIGS. 38-42. FIG. 38 shows a total schedule GANTT chart display with detailed order input window and a spreadsheet display of resultant schedule. FIG. 39 shows a machine GANTT display with a overview of machine schedule and a particularly selected machine. FIG. 40 shows a order GANTT display with a overview of order and a particularly selected order. FIG. 41 shows an Ad-hoc Query Generator with a query input window and a result display window. FIG. 42 shows a Web-enabled view of the schedule dispatch report, which can be easily transformed into a Schedule GANTT display via IE 5+ browser.

Industry Applications

The Interwave Coordinator CMES application includes industry applications to accelerate time-to-deployment and leverage industry best practices and standards. The industry applications utilize and extend the basic functionality in the universal application templates to address the unique information requirements of a particular manufacturing industry. The specific industry applications claimed by this invention are Roll Tracker, Discrete Assembler, Pharma Manager, Med-Device Tracker and Food Processor.

Roll Tracker Industry Application

The Roll Track industry application provides basic roll tracking functions for manufacturers in the roll goods industry. Roll Tracker is also a highly configurable MES application that supports the capability to coordinate the track the many to one, and one to many production scenarios typical in the roll goods industry.

Specifically, Slit Optimization is included to accommodate unique industry requirements with respect to slitting production items. Slit Optimization applies order cut requirements and calculates allocation for order set up. It also enables fast execution, which significantly reduces time when the number of orders and widths increase. Slit Optimization further supports use of "overage" to improve optimization results and integrates work order output with external scheduling systems.

Discrete Assembler Industry Application

The Discrete assembler industry application provides discrete assembling and tracking functions to customers in the discrete manufacturing sector. Discrete Assembler is a highly configurable MES application that supports component tracking and validation features necessary in the assembly of a discrete product.

Electronics Box Builder Industry Application

Electronics Box Builder industry application provides basic assembly and test functions for manufacturers in the electronics industry that relies heavily on contract equipment manufacturers for board assemblies and components.

Surface Mount Technology (SMT) Assembler Industry Application

SMT Assembler industry application provides surface mount component placement and printed circuit board tracking/testing functions for manufacturers in the electronics industry printed circuit board manufacturing.

High-speed Data Acquisition is particularly included to accommodate unique industry requirements. Specifically, there are two features involved in High-speed Data Acquisition, they are AutoTracker and AutoCollector. AutoTracker is designed for highly-automated production lines to track electronic components through highly-automated work centers. AutoTracker is configurable for work center tracking stations. Further, AutoTracker recognizes bar code ID and is able to register each process step in MES. AutoTracker also recognize out-of-sequence production and is able to do bi-directional feedback to control layer.

AutoCollector supports product genealogy and is designed for automatic collection of quality data from installed test stations. Furthermore, AutoCollector provides the ability to configure collection frequency and times, such as data source.

Semiconductor Assembler Industry Application

Semiconductor Assembler Industry Application provides basic wafer tracking and data collection for manufacturers in the semiconductor industry. The present invention, a CMES application, can improve the production work flow a great deal.

Pharma Manager Industry Application

The Pharma Manager industry application provides recipe/specification management, batch execution, on-line data collection and genealogy for pre-weigh and dispensing operations under Food and Drug Administration (FDA) control. Further, Pharma Manager implements all its functionalities in compliance with 21 CFR Part 11 security, and electronic record management guidelines.

MedDevice Tracker Industry Application

The MedDevice Tracker industry application provides basic tracking, genealogy, quality management and data collection functions for manufacturers in the medical device industry under FDA control. Further, MedDevice Tracker implements all its functionalities in compliance with 21 CFR Part 11 security, and electronic record management guidelines.

Food Processor Industry Application

The Food Processor industry application provides basic tracking, genealogy and quality control of inventory and product in the regulated food industry. Moreover, Food Processor industry application implements its functions in accordance with the United States Department of Agriculture (USDA) and Hazards Analysis and Critical Control Points (HACCP) standards.

Food Processor is utilized to track waste against production orders for both individual components and finished goods. It also increases WIP visibility and control with on-line KPI's and embedded reporting. Food Processor is able to configure and enforce electronic signature schemes and improve the flexibility of the production process. The Food Processor industry application further includes a plurality of food processing features, such as Formulation, Production and Packaging, QA Product Evaluation, QA Product Test, QA Environmental Test, QA Product Retention, QA Checklist, and HACCP Enforcement.

Figure 43:
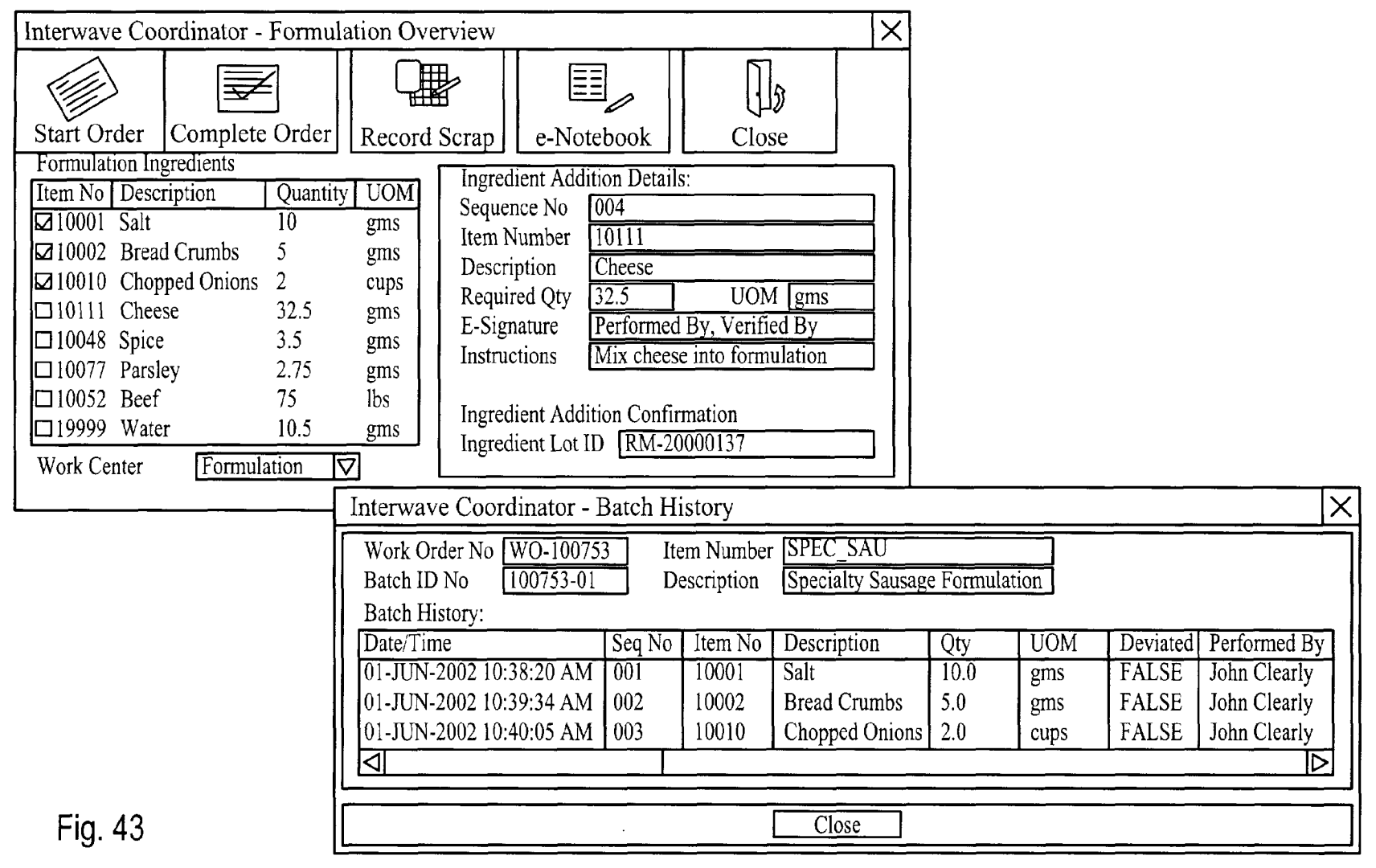

FIG. 43 shows the Formulation overview and Batch History of the Food Processor. The overview panel of Formulation displays formulation ingredients and required amount, and records execution of formula, such as the quantity, ingredient lot number, operator, date, time, etc. The overview panel also supports and tracks deviations, i.e., additions and modifications, to production formula. Furthermore, the panels enforce a configurable electronic signature scheme. All the entries and deviations are recorded as part of the Batch History.

Particularly, Formulation supports containerization, which is production of multiple batches or containers against a single production order. It also tracks scrap produced against production order, such as ingredients and/or finished product. Further, Formulation displays formulation step and order specific instructions and current batch history for each production order.

Figure 44:
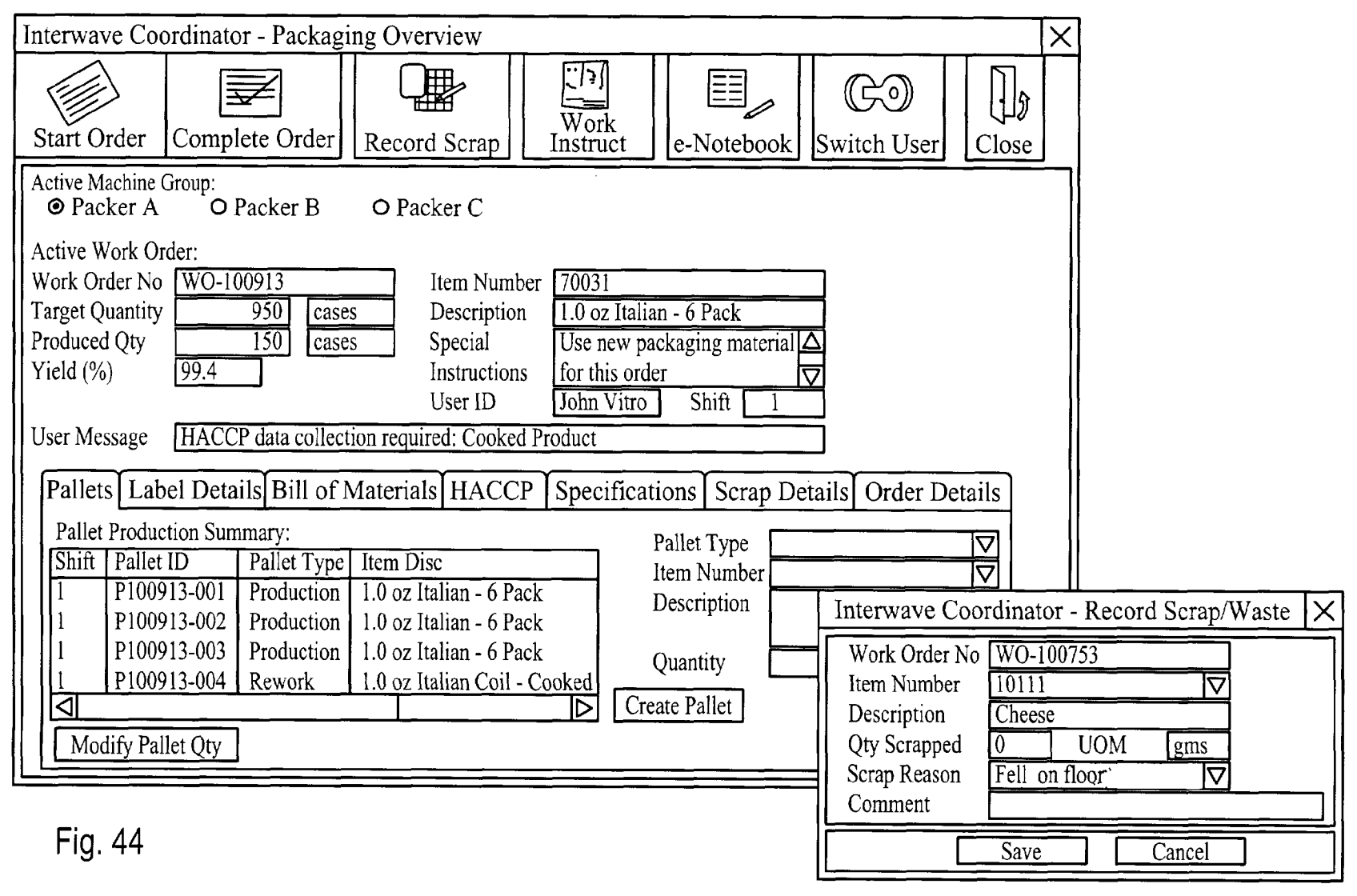

FIG. 44 shows the Production and Packaging function within Food Processor industry application. The Production and Packaging monitors one or more work centers (or "machine groups") from the same GUI panel. It supports palletized and non-palletized production reporting. The Production and Packaging tracks scrap produced against the production order, components of either finished or unfinished product, and tracks complete production and consumption genealogy.

The Production and Packaging GUI displays label printing requirements, label format, product specifications, product recipes, and performance information, i.e., target vs. produced quantity and yield. Moreover, the Production and Packaging GUI displays and enforces bill of material requirements and HACCP data collection requirements.

Figure 47:
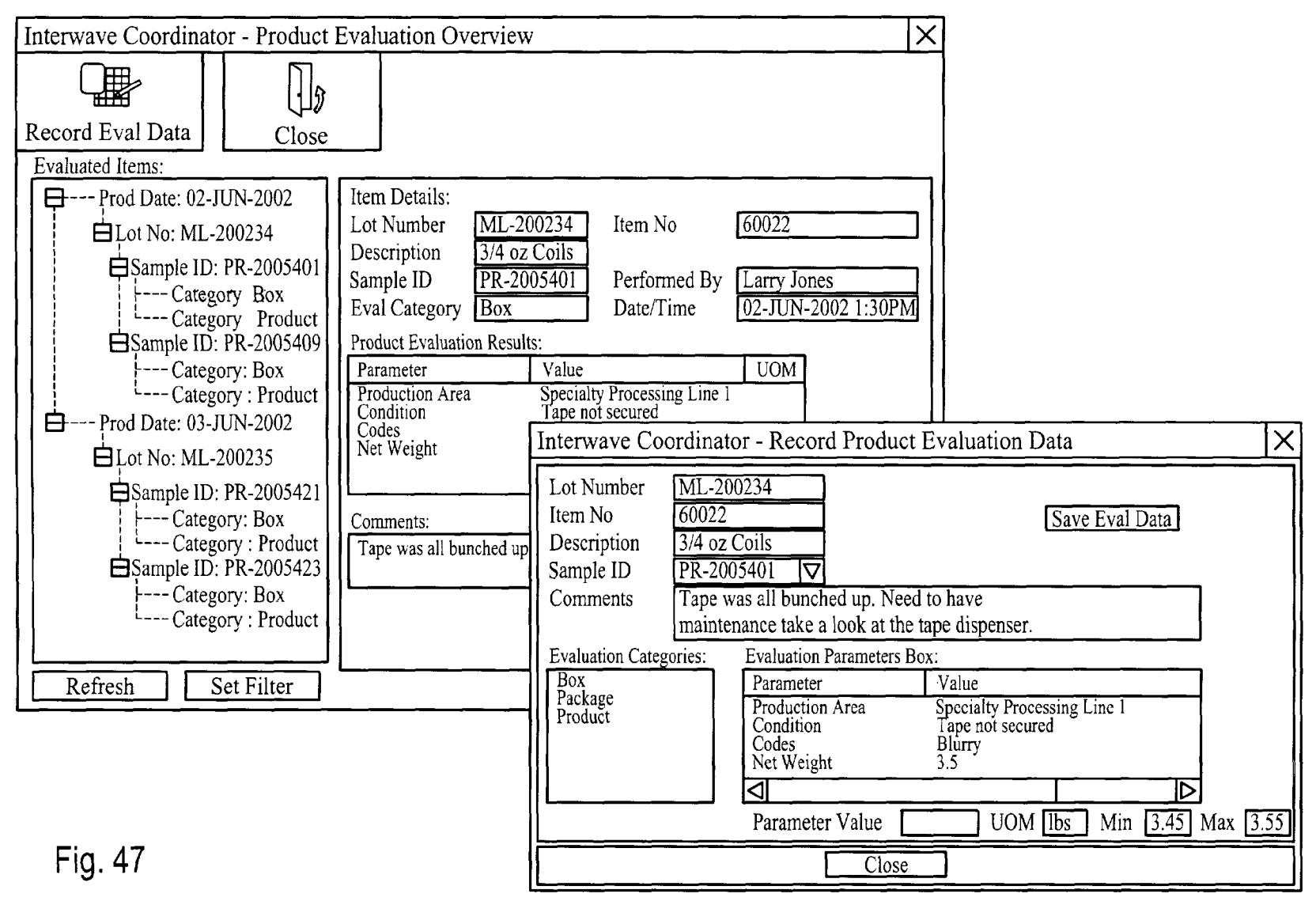

The QA Lab Product Evaluation function within Food Processor industry application is shown in FIG. 47. The GUI panel provides the ability to configuring product evaluation specifications on a production item basis, and further, define one or more evaluation specifications for a production item. The panel is also capable of enforcing a configurable electronic signature scheme. Moreover, the GUI panel is able to link evaluation data to a plurality of production lots and enter evaluation data against multiple samples for a particular production lot.

Figure 48:
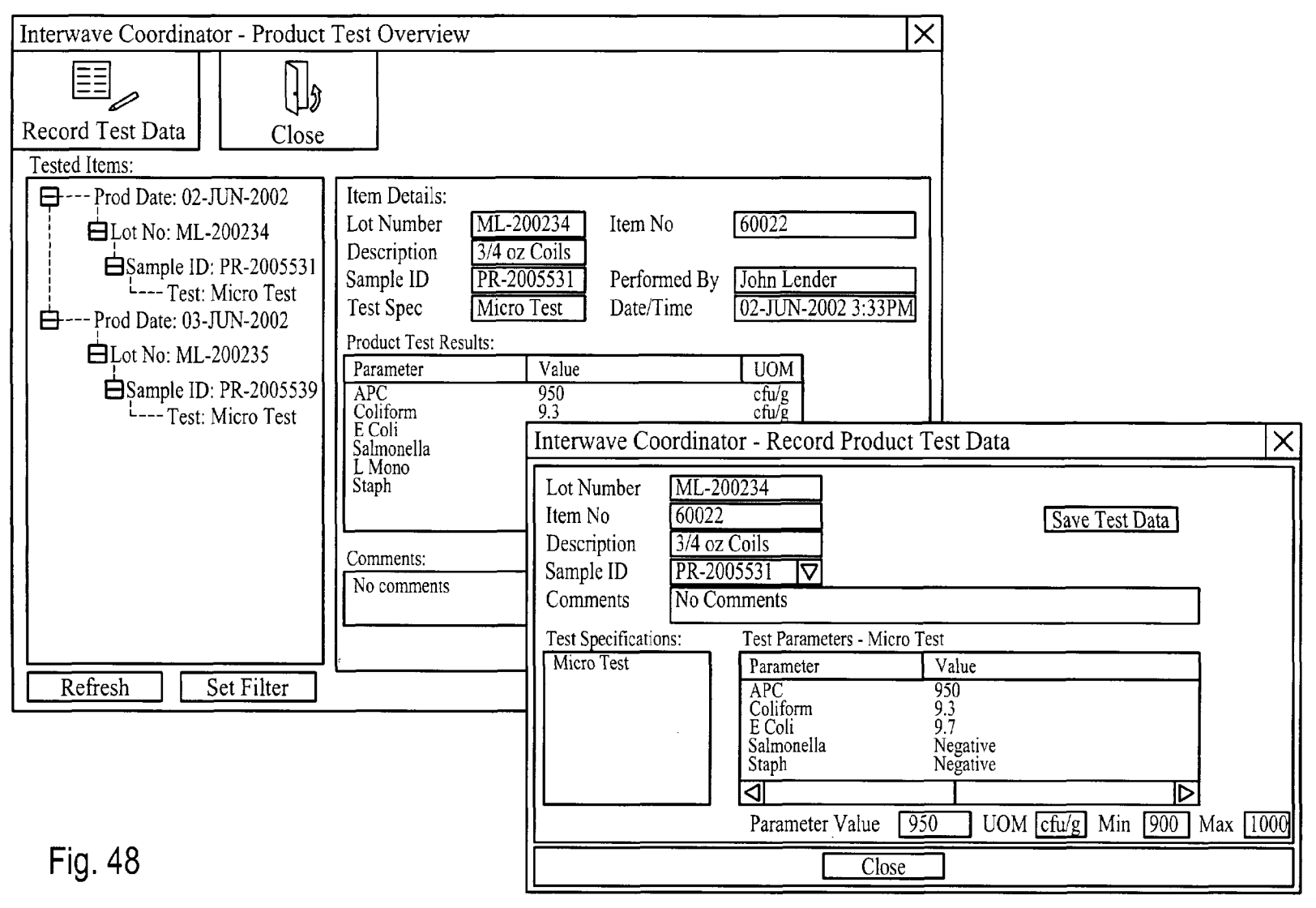

The QA Lab Product Test function within the Food Processor industry application is shown in FIG. 48. The GUI panel supports the ability to enter test data against multiple samples for a particular production lot and define minimum and maximum values for each parameter within a test specification. The end users can easily configure product test specifications on a production item basis and define one or more test specifications for a production item through the GUI panel. The panel further links test data to production lots and enforces a configurable electronic signature scheme.

Figure 49:
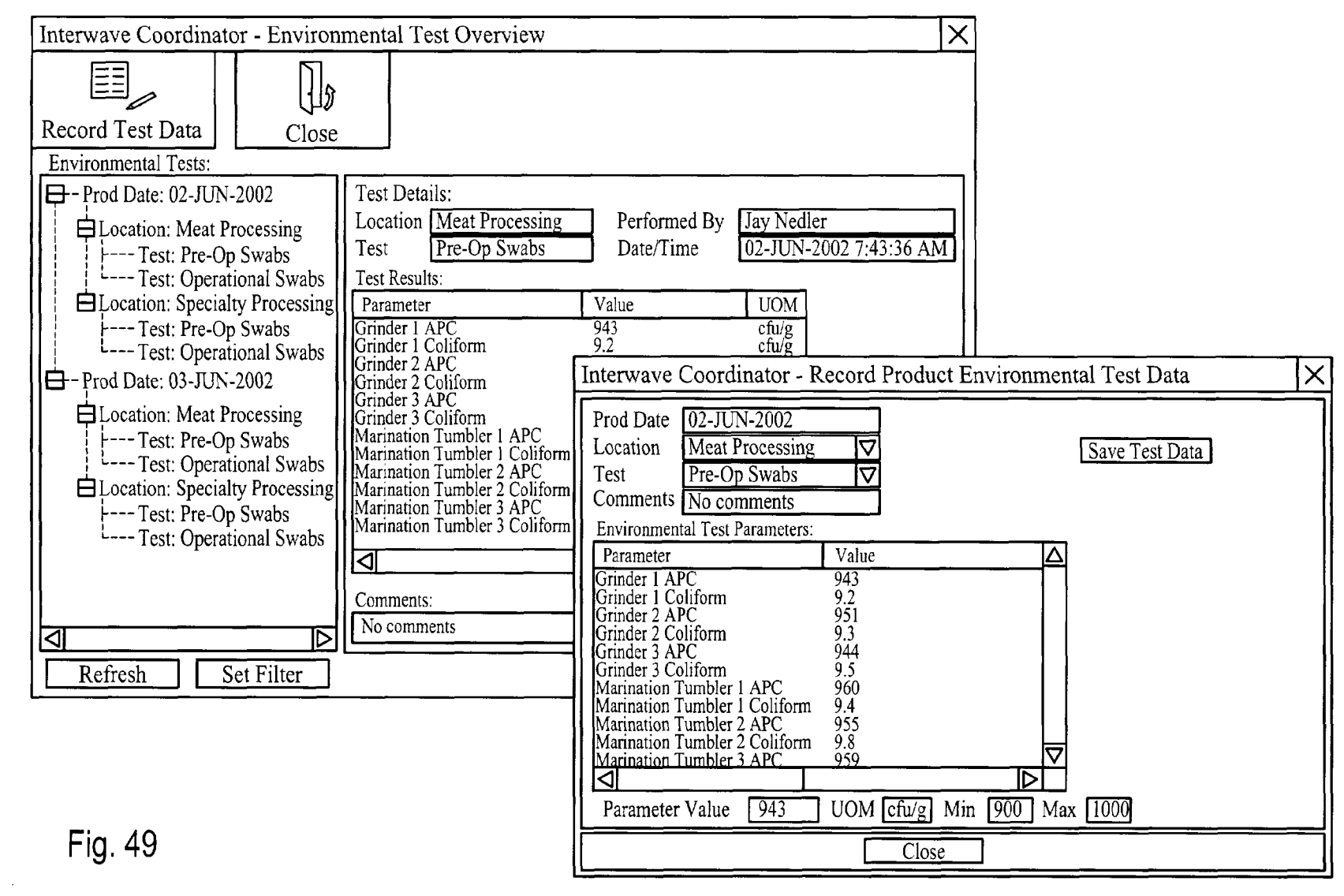

The QA Lab Environmental Test function within the Food Processor industry application is shown in FIG. 49. The GUI panel provides the ability to configure environmental test specifications on a location basis and define one or more test specifications for a location. It is also capable of defining minimum and maximum values for each test specification parameter and enforces a configurable electronic signature scheme.

The QA Hold Management function within the Food Processor is shown in FIG. 50. The QA Hold Management is used to issue multiple holds against a production entity and for issuing individual releases. The QA Hold Management is able to prevents raw materials from being consumed with a status of HOLD and prevents production entities from being shipped with the status of HOLD. Further from being able to capture hold and release reason codes, the QA Hold Management is able to enforce configurable electronic signature under Performed By and Verified By scheme.

Figure 51:
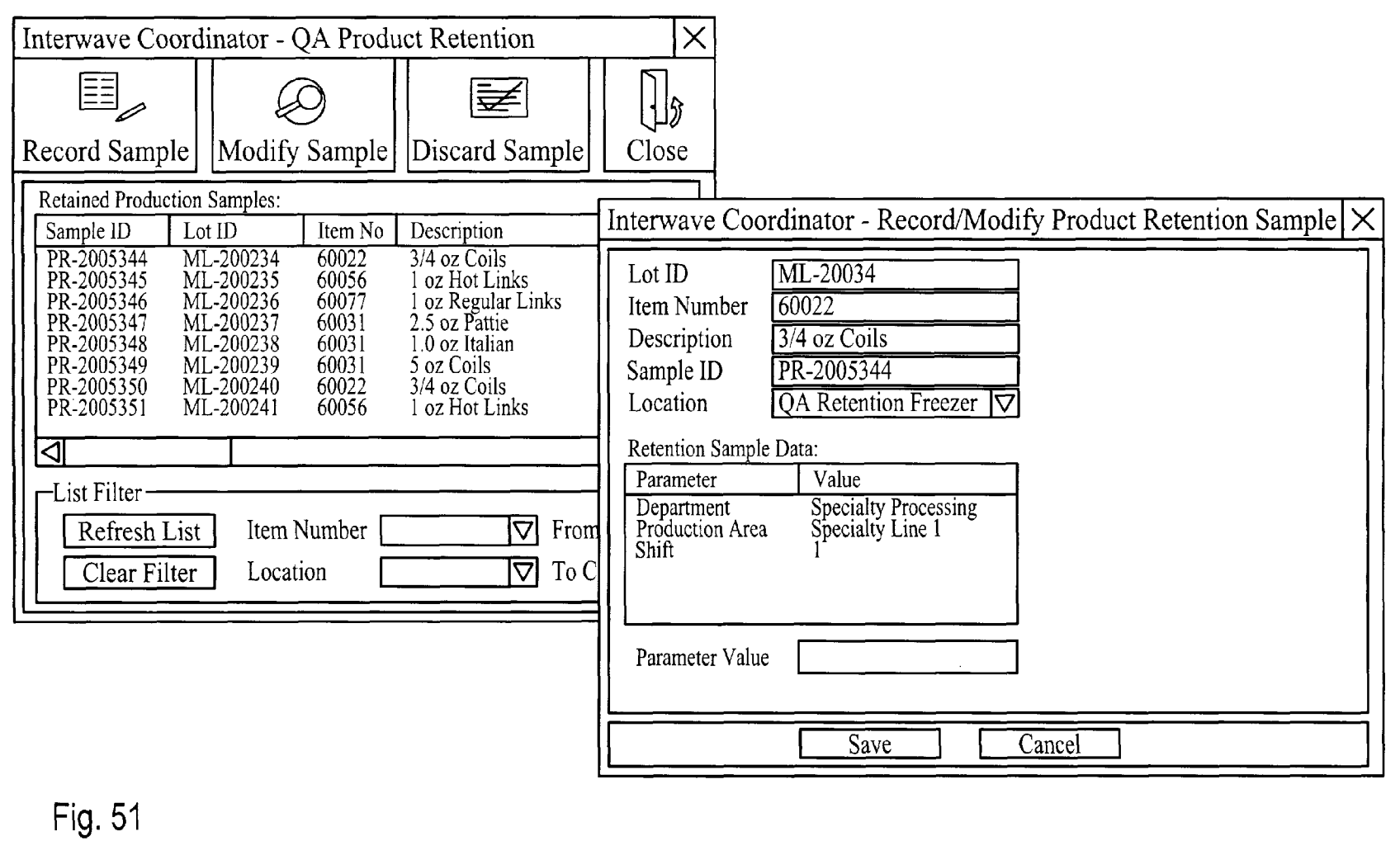

The QA Product Retention function within Food Processor is shown in FIG. 51. The GUI panel provides the ability to enter product retention samples and associated data, disposition samples to other locations within the system, and discard retained samples that have exceeded the required retention window. Furthermore, the QA Production Retention function links retention samples to production lots for genealogy and product recall purposes. As other GUI panels discussed above, the QA Product Retention function enforces a configurable electronic signature scheme.

Figure 52:
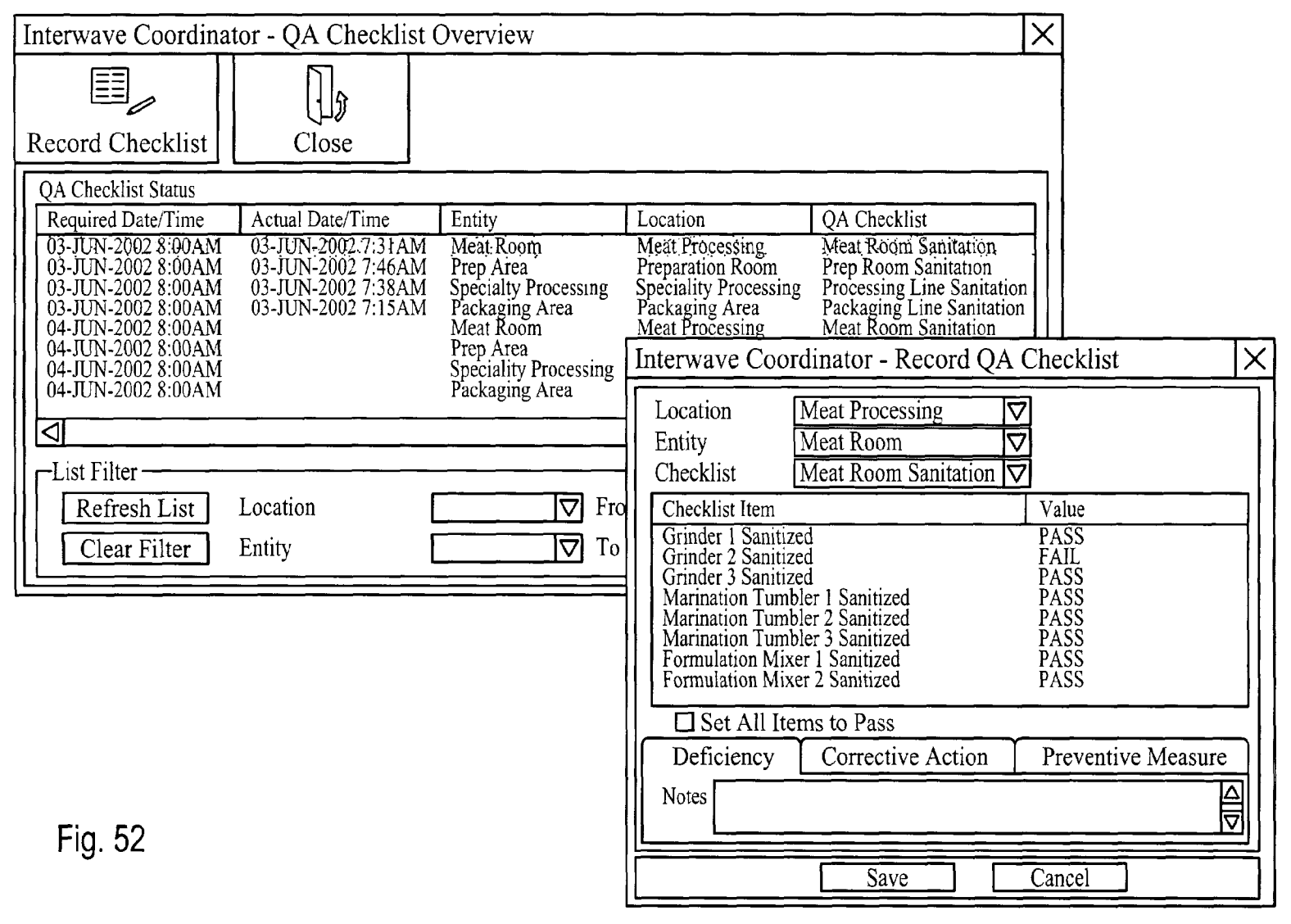

The QA Checklist function within Food Processor is used to define an execution schedule for each checklist, and to log a deficiency and corrective action, and preventive measure for each item in a checklist. The QA Checklist displays required and actual execution date and time for each checklist, as shown in FIG. 52, and enforces a configurable electronic signature scheme.

Figure 53:
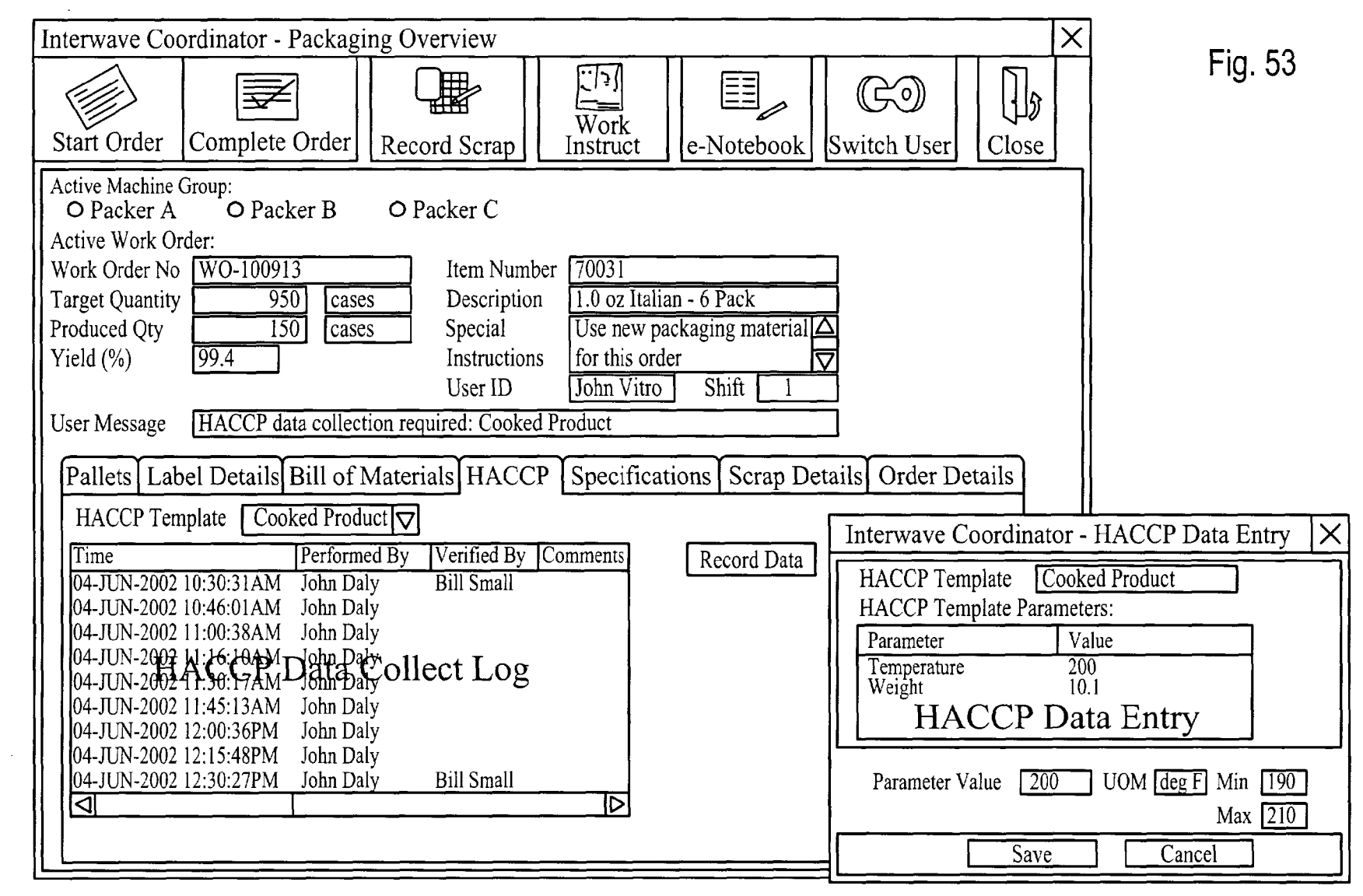

In FIG. 53, a HACCP Data Entry window and a HACCP Data Collection Log window of the HACCP Enforcement functions within Food Processor are shown. Both quantity and time based HACCP data collection schemes are enforceable by the HACCP Enforcement function. Data is collected through the configurable data collection templates. Further, it supports full audit trail of data collection activities, and displays the history of HACCP data collection activities for a particular work order.

Connectors

The Interwave Coordinator CMES application includes two connector modules to provide a standardized mechanism to interface with the business system and plant floor automation systems. These connectors are the XML Business System Connector and the OPC Shop Floor Connector.

XML Business Connector Module

The XML Business Connector module provides connectivity to supply chain modules/business systems such as ERP, APS, PDM, etc. It provides a standard mechanism (XML schema) for receiving work orders, bill of materials (BOM), bill of routes (BOR), and tooling. Additionally, the XML Business Connector provides a standard mechanism (XML schema) for reporting material consumptions/issues, scrap and production associated with a work center.

Ole for Process Control (OPC) Shop Floor Connector Module

The OPC Shop Floor Connector module provides connectivity to the shop floor control automation systems via an OPC connection. It also provides a standard mechanism for downloading machine setup/recipe information, or work order specification information from the production management layer to the shop floor automation system. Furthermore, the shop floor automation system sends alerts and events to the production management layer via the OPC Shop Floor Connector module.

Visualization

The Digital Dashboard module is a visualization module included in the Interwave Coordinator CMES application. It provides visibility into the performance of the manufacturing enterprise. The Digital Dashboard module enables the configuration of a personalized performance dashboard view on an individual user basis.

FIGS. 15A, 15B and 16 through 21 show the various reports generated by the Digital Dashboard module. These include the WIP Status Report, as shown in FIGS. 15A and 15B, the Material Genealogy Report, as shown in FIG. 16, the Route Genealogy Report, as shown in FIG. 17, the Inventory Summary Report, as shown in FIG. 18, the Work Order Status Report, as shown in FIG. 19, the Defect Data Report, as shown in FIG. 20, and the Down time Report, as shown in FIG. 21.

Utilities

The Interwave Coordinator CMES application includes six utility modules to perform standard utility type functions. These are Event Messenger, Work Traveler, Label Manager, Data Archiver, Auto Tracker and Auto Collector. Each of these modules has strengthened the performance of the CMES disclosed in the present invention.

Event Messenger Module

Event Messenger module provides the ability of sending e-mail or text based pager messages to users based upon production events or upset conditions that affects the manufacturing production. It is also able to configure user groups and associate event messages with user groups.

Work Traveler Module

Work Traveler module supports the ability to define the content of the traveler from pre-configured option lists (i.e., BOM, routing, work instructions, etc). Work Traveler specifies the text displayed in the header and footer of the traveler, and further assigns work traveler definitions to products or classes of products. Furthermore, Work Traveler prints travelers on demand or automatically at the start or completion of a process step/operation. Work Traveler is also able to store travelers in a central location to reduce maintenance and deployment costs.

Label Manager Module

Label Manager module supports the ability to define the content of a label from pre-configured option lists (i.e., BOM, routing, work instructions, etc.). Label Manager assigns label definitions to products or classes of products, and further prints labels on demand or automatically based upon an event (i.e., the start or completion of a work order). Finally, Label Manager store labels in a central location to reduce maintenance and deployment costs.

Data Archiver Module

Data Archiver module provides the ability to configure an archiving scheme for the production database to increase system performance. Further, Data Archiver supports the ability of archiving data to a data warehouse and deleting information from the production database.

Auto Tracker Module

Auto Tracker module provides the ability to track WIP items through highly automated work centers via barcode technology. Furthermore, it supports the ability to create and configure tracking stations, and attach specific tracking attributes. Finally, Auto Tracker sends alerts and events to the shop floor automation system to annunciate upset conditions and events that occur in the production management layer.

Auto Collector Module

Auto Collector module provides the ability to automatically collect quality data from test machines against a particular production entity. Furthermore, it supports the ability to define collection scenarios such as collection frequency and data source.

While the invention has been particularly shown and described with reference to a preferred embodiment or a specifically designed template, it will be understood by those skilled in the art that various changes in form and detail may be made therein without departing from the spirit and scope of the invention.

What is claimed is:

1. A computer-readable medium having instructions stored thereon that, when executed by a processor, cause a computer to carry out computer-implemented acts for controlling manufacturing process and product flow, the acts comprising:
   interfacing with a plurality of external coordination and synchronization entities at a business level through a first graphical user interface;
   coordinating and synchronizing the external coordination and synchronization entities at the business level through a business processing modeling module, wherein the business processing modeling module facilitates to graphically configure a manufacturing business rule, and to model static manufacturing entities;
   interfacing with a plurality of internal coordination and synchronization entities at a manufacturing level through a second graphical user interface;
   coordinating and synchronizing the internal coordination and synchronization entities at the manufacturing level through a communication connector module; and
   integrating in real time said external entities and said internal entities.

2. The computer-readable medium of claim 1, wherein said first and second graphical user interfaces are customizable to a plurality of market segments.

3. The computer-readable medium of claim 2, wherein said external coordination and synchronization entities include at least one of an Enterprise Resource Planning (ERP) module, a Product Life Cycle Management (PLM) module, a Product Data Management (PDM) module, a Supply Chain Management (SCM) module, a Customer Relations Management (CRM) module, or an Advanced Planning and Scheduling (APS) module.

4. The computer-readable medium of claim 2, wherein said internal coordination and synchronization entities include at least on of a Work Order Management (WOM) application template, a Material Management application template, a Tool Management application template, a Quality Management application template, a Quality Data Collection application template, a Defect Tracker application template, a Downtime Tracker application template, a Specification Management application template, a Shipping application template, a Return Merchandise Authorization (RMA) application template, a Engineering Change Order (ECO) application template, a Material Review Board (MRB) application template, a Work Instructions application template, or an Electronic Notebook application template.

5. The computer-readable medium of claim 1, wherein said first graphical user interface interfaces to said business level with a Web-based technology.

6. The computer-readable medium of claim 5, wherein said Web-based technology includes at least one of Extensible Markup Language (XML) or Ole for Process Control (OPC).

7. The computer-readable medium of claim 1, wherein said second graphical user interface interfaces to said manufacturing level with an open standard technology.

8. The computer-computer readable medium of claim 7, wherein said open standard technology includes at least one of an Application Programming Interface (API) or an Ole Process Control (OPC) Shop Floor Connector.

9. The computer-readable medium of claim 1, wherein said real time integration is implemented through at least one of an intranet or the Internet.

10. The computer-readable medium of claim 1 further comprises a visualization module, wherein said visualization module provides visualization of manufacturing performance.

11. The computer-readable medium of claim 1, wherein said visualization module provides visualization of manufacturing performance by analyzing and reporting Key Performance Indicators (KPIs) and Overall Equipment Efficiency (OEE).

12. The computer-readable medium of claim 11, wherein said visualization module provides standard or ad-hoc reporting capability through Microsoft® Excel.

13. The computer-readable medium of claim 1, wherein said second graphical user interface further comprises a Work In Progress (WIP) Management template which models and maintains static manufacturing resources.

14. The computer-readable medium of claim 13, wherein said Work In Progress Management template further comprises a Report Manager capable of generating textual, numerical, and graphical reports.

15. The computer-readable medium of claim 1, wherein said second graphical user interface further comprises an Inventory Management template, which provides the ability to receive and inspect raw materials, purchase orders and confirm delivery.

16. The computer-readable medium of claim 15, wherein said Inventory Management template further provides the ability to merge multiple inventory entities into a single entity.

17. The computer-readable medium of claim 16, wherein said Inventory Management template further provides visualization to all items in inventory.

18. The computer-readable medium of claim 1, wherein said second graphical user interface further comprises a Shop Scheduler template which based at least one of a change in orders, a change in priorities, a change in inventory or a change in a resource availability rebuilds a production schedule.

19. The computer-readable medium of claim 18, wherein said Shop Scheduler template further comprises a GANTT chart display with a detailed order input window and a spreadsheet display of resultant schedule.

20. The computer-readable medium of claim 19, wherein said Shop Scheduler template further comprises a schedule dispatch report which can be transformed into a GANTT display via a Web browser.

21. The computer-readable medium of claim 20, wherein said Shop Scheduler template further comprises an audit trail and enforces a configurable electronic signature scheme.

22. The computer-readable medium of claim 1, wherein said second graphical user interface further comprises a Lab Manager template which assists engineers and technicians with managing laboratory data in a manufacturing environment.

23. The computer-readable medium of claim 22, wherein said Lab Manager template further comprises an audit trail and enforces a configurable electronic signature scheme.

24. The computer-readable medium of claim 1, wherein said computer program product is a Manufacturing Execution System (MES).

25. The computer-readable medium of claim 1, wherein said computer program product is a Collaborative Manufacturing Execution System (CMES).

* * * * *